(12) United States Patent
Yanazume et al.

(10) Patent No.: US 8,462,370 B2
(45) Date of Patent: Jun. 11, 2013

(54) IMAGE PROCESSING APPARATUS AND APPLICATION EXECUTING METHOD

(75) Inventors: Shinsuke Yanazume, Kanagawa (JP); Takeshi Denda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1041 days.

(21) Appl. No.: 12/236,770

(22) Filed: Sep. 24, 2008

(65) Prior Publication Data

US 2009/0109471 A1 Apr. 30, 2009

(30) Foreign Application Priority Data

Oct. 30, 2007 (JP) ................................ 2007-282454
Apr. 18, 2008 (JP) ................................ 2008-109515

(51) Int. Cl.
*G06F 15/00* (2006.01)
*G06K 1/00* (2006.01)

(52) U.S. Cl.
USPC ............................ 358/1.15; 358/1.9; 358/1.13

(58) Field of Classification Search
USPC ............................................... 358/1.15, 1.14
See application file for complete search history.

(56) References Cited

U.S. PATENT DOCUMENTS

2007/0258098 A1* 11/2007 Matsushima .................. 358/1.1

FOREIGN PATENT DOCUMENTS

| JP | 2003-84941 | 3/2003 |
|---|---|---|
| JP | 2004-243588 | 9/2004 |
| JP | 3679349 | 5/2005 |
| JP | 2005-176159 | 6/2005 |
| JP | 2005-217825 | 8/2005 |
| JP | 2007-325251 | 12/2007 |

OTHER PUBLICATIONS

Office Action issued Jan. 24, 2012 in Japanese Patent Application No. 2008-109515.

* cited by examiner

*Primary Examiner* — Thierry Pham
(74) *Attorney, Agent, or Firm* — Oblon, Spivak, McClelland, Maier & Neustadt, L.L.P.

(57) ABSTRACT

An image forming apparatus simplifies function customization or expansion, and enables accurate reproduction of conditions attached to a stored document without causing a strong dependency among individual components when the stored document is reutilized. The image processing apparatus includes a first filter that controls a data input process, and a second filter that controls a data output process, the first filter and the second filter constructing an application. A setting condition is set for each of the first filter and the second filter. In response to an instruction to register a stored document, a condition ID that is assigned to the setting condition is acquired. The condition ID and the image data are stored in a database in association with one another.

12 Claims, 45 Drawing Sheets

FIG.6

| FUNCTION | FILTER COMBINATION |
|---|---|
| COPY | READ + (DOC. PROCESS +) PRINT |
| PRINTER | PC DOC. RECEPTION + DOC. TRANSFORM + PRINT |
| SCAN TO EMAIL | READ + MAIL TRANSMISSION |
| FAX TRANSMISSION | READ + FAX TRANSMISSION |
| FAX RECEPTION | FAX RECEPTION + PRINT |
| STORE IN DOCUMENT BOX | READ + STORED DOC. REGISTRATION |
| PRINT DOCUMENT BOX | READ STORED DOC. + PRINT |

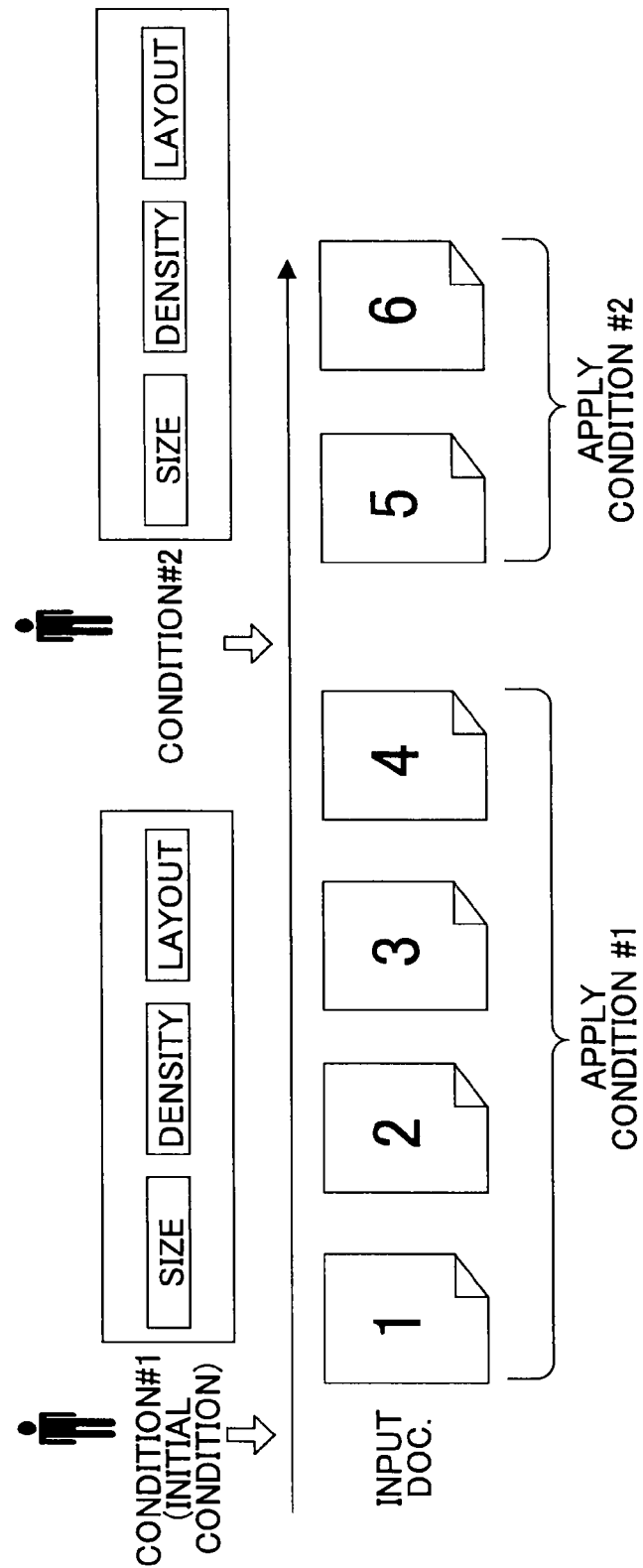

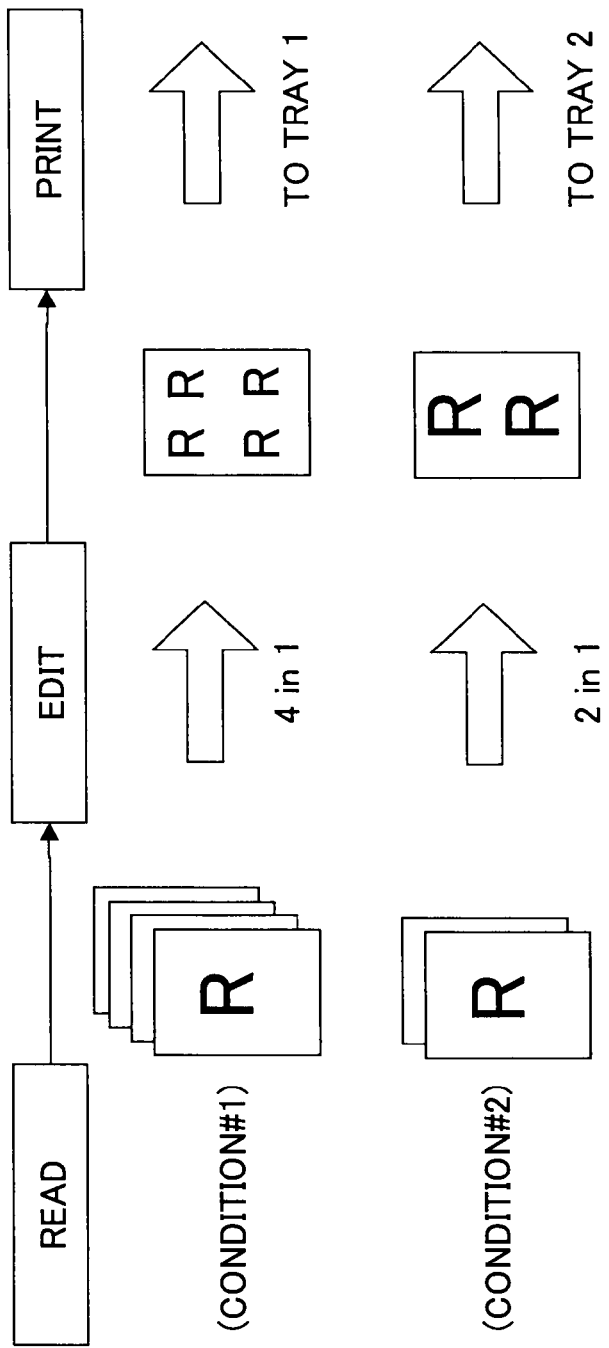

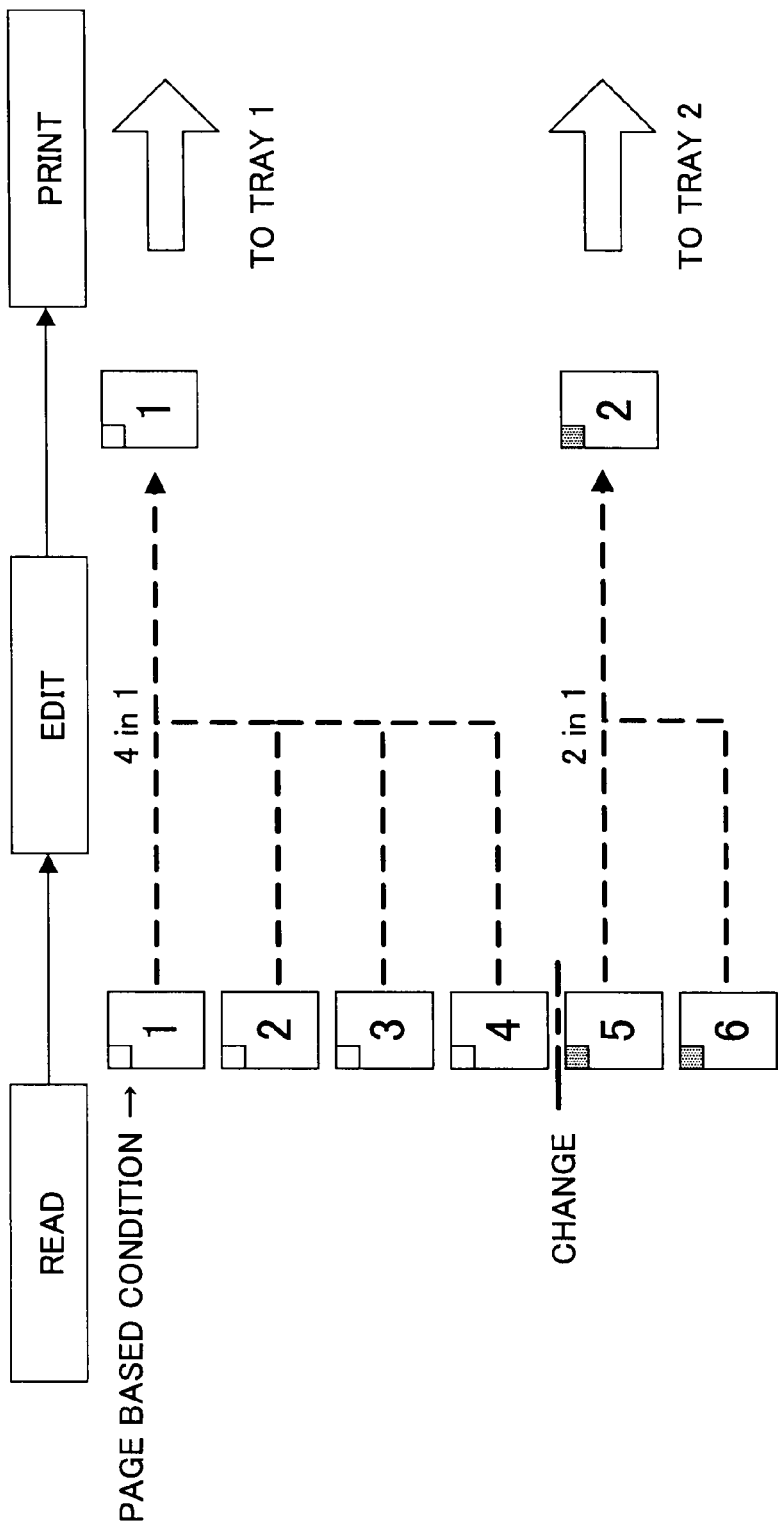

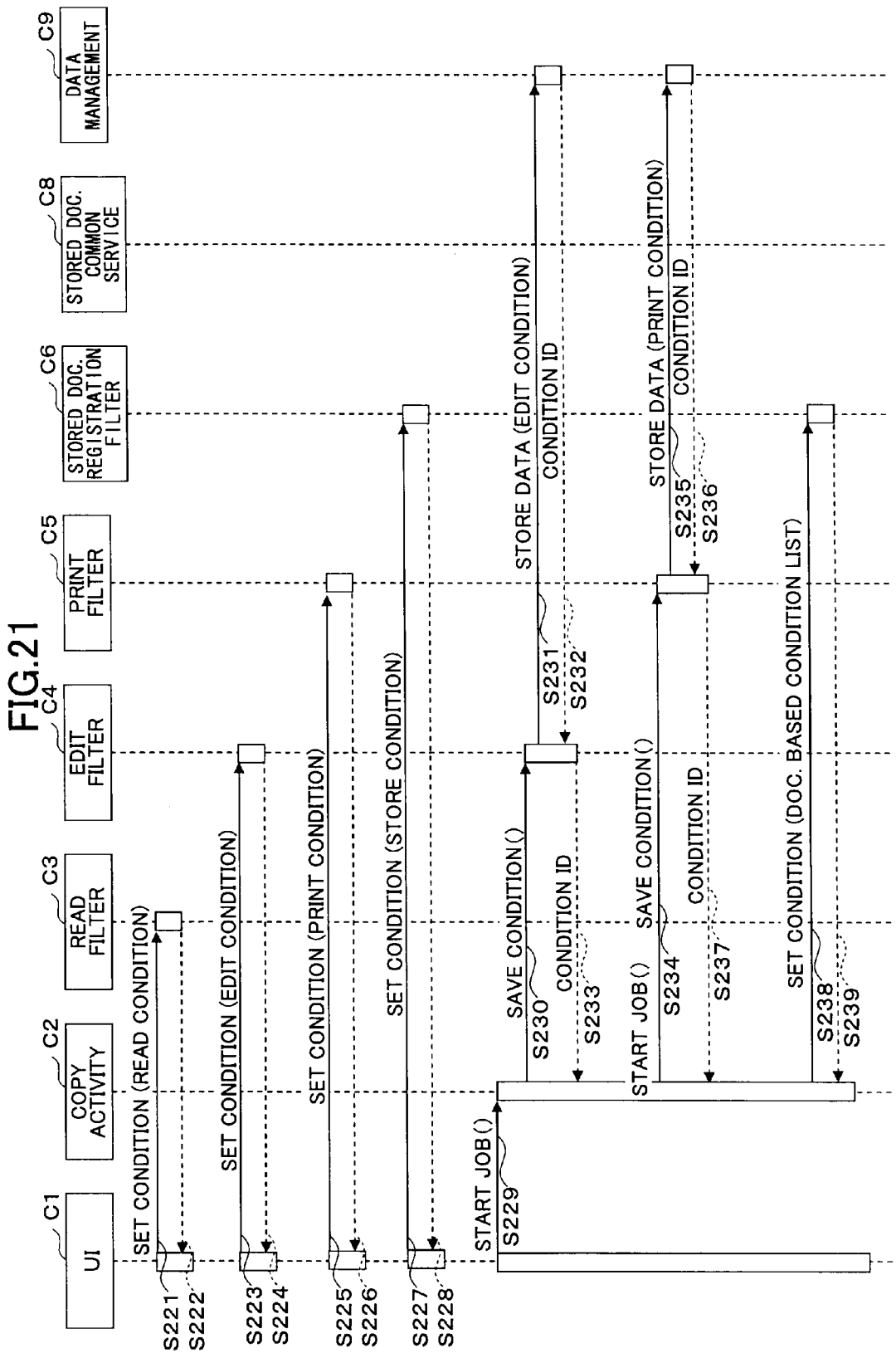

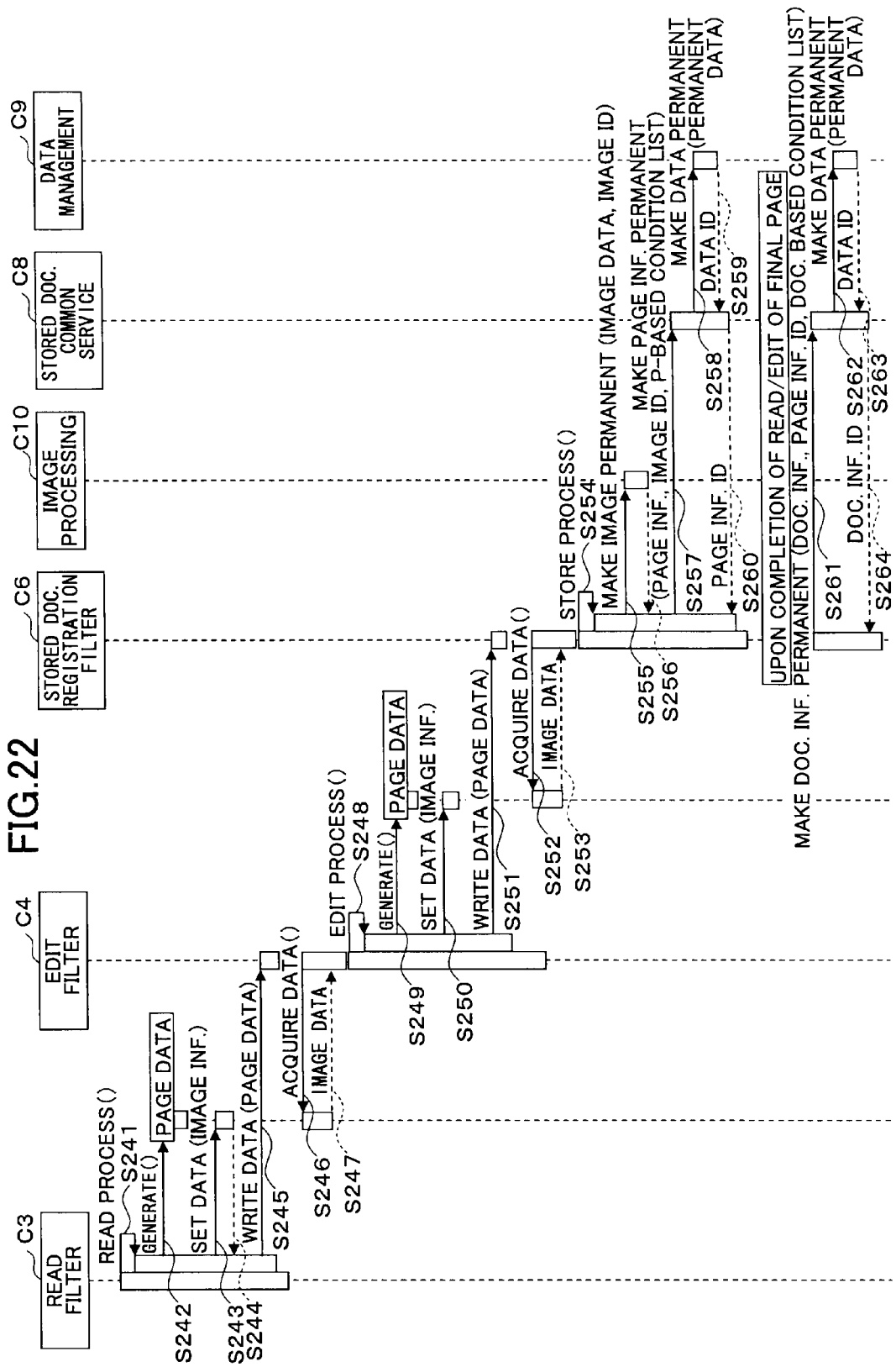

FIG.27A

DOC. LIST

SEARCH CONDITION:

[                    ]

[ SEARCH ]

DOC. LIST

| No   DOC. NAME | PAGES | SIZE |
|---|---|---|
| 001 : DOC. A | 3 | A4 |
| 002 : DOC. B | 1 | A4 |
| 003 : DOC. C | 1 | A4 |
| 004 : DOC. D | 4 | A3 |
| 005 : DOC. E | 1 | A3 |
| 006 : DOC. F | 3 | A4 |
| 007 : DOC. G | 3 | A4 |

[ OK ]

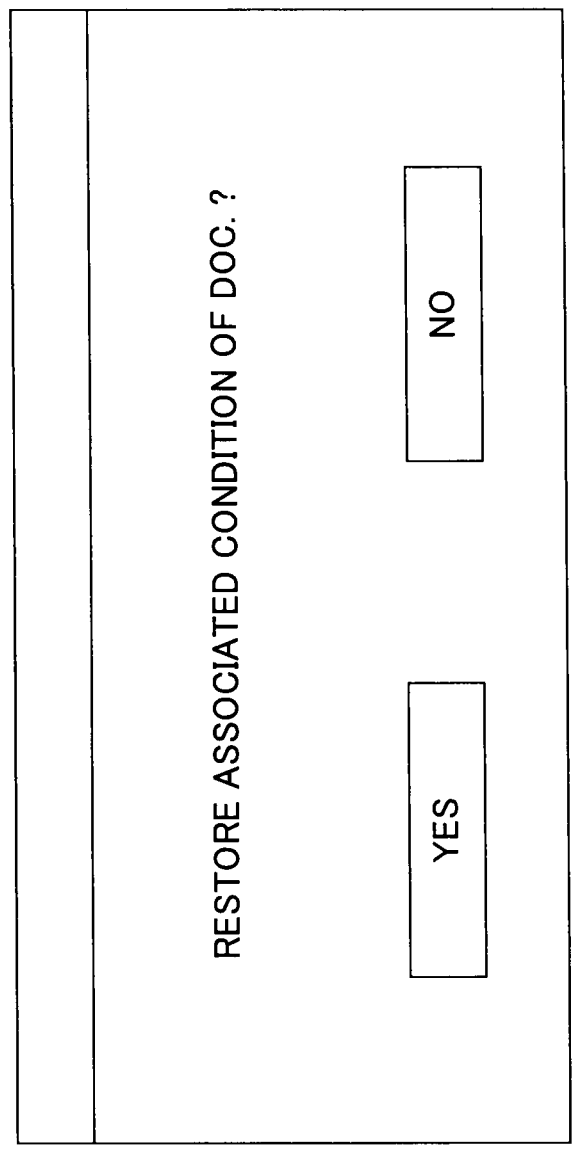

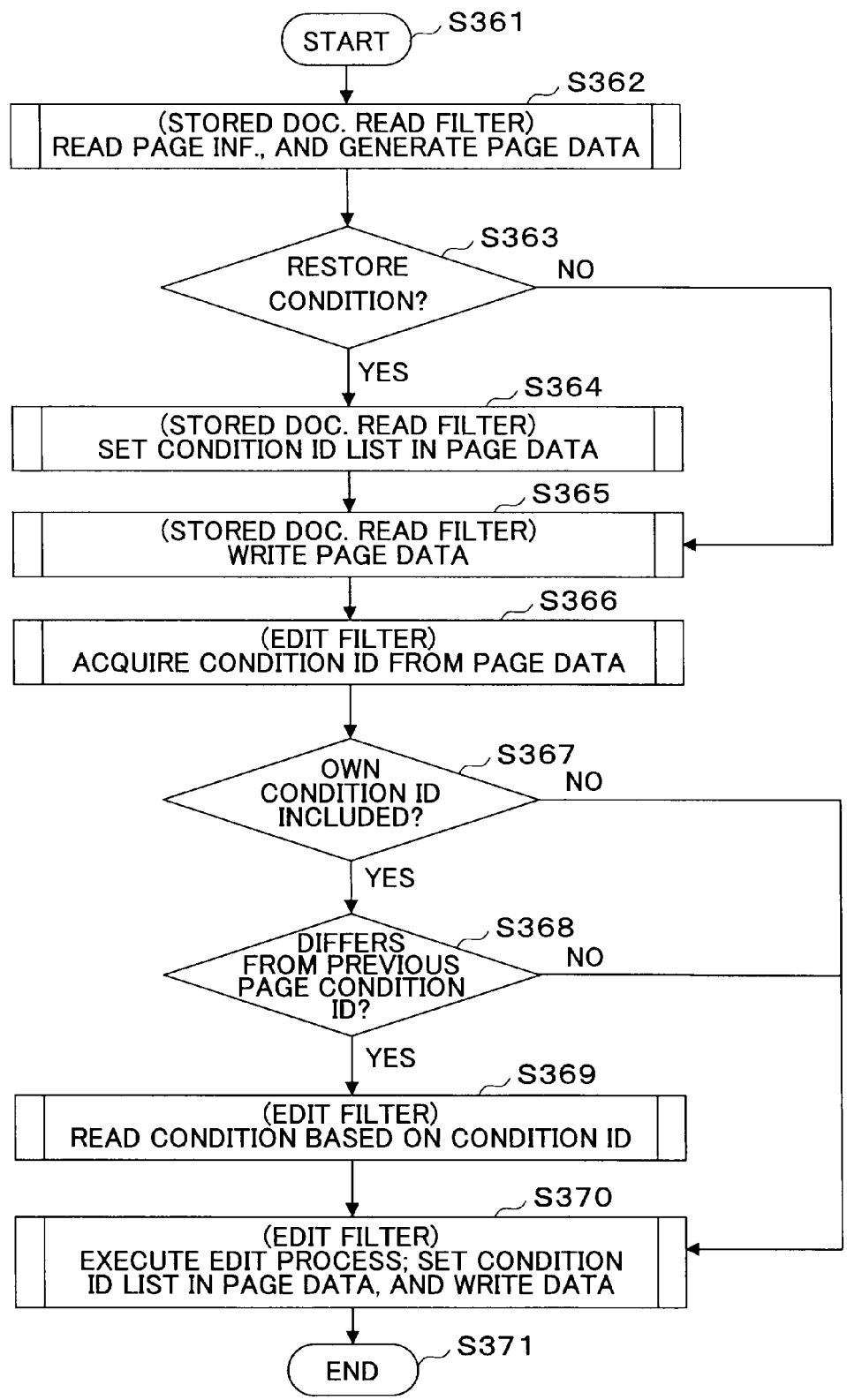

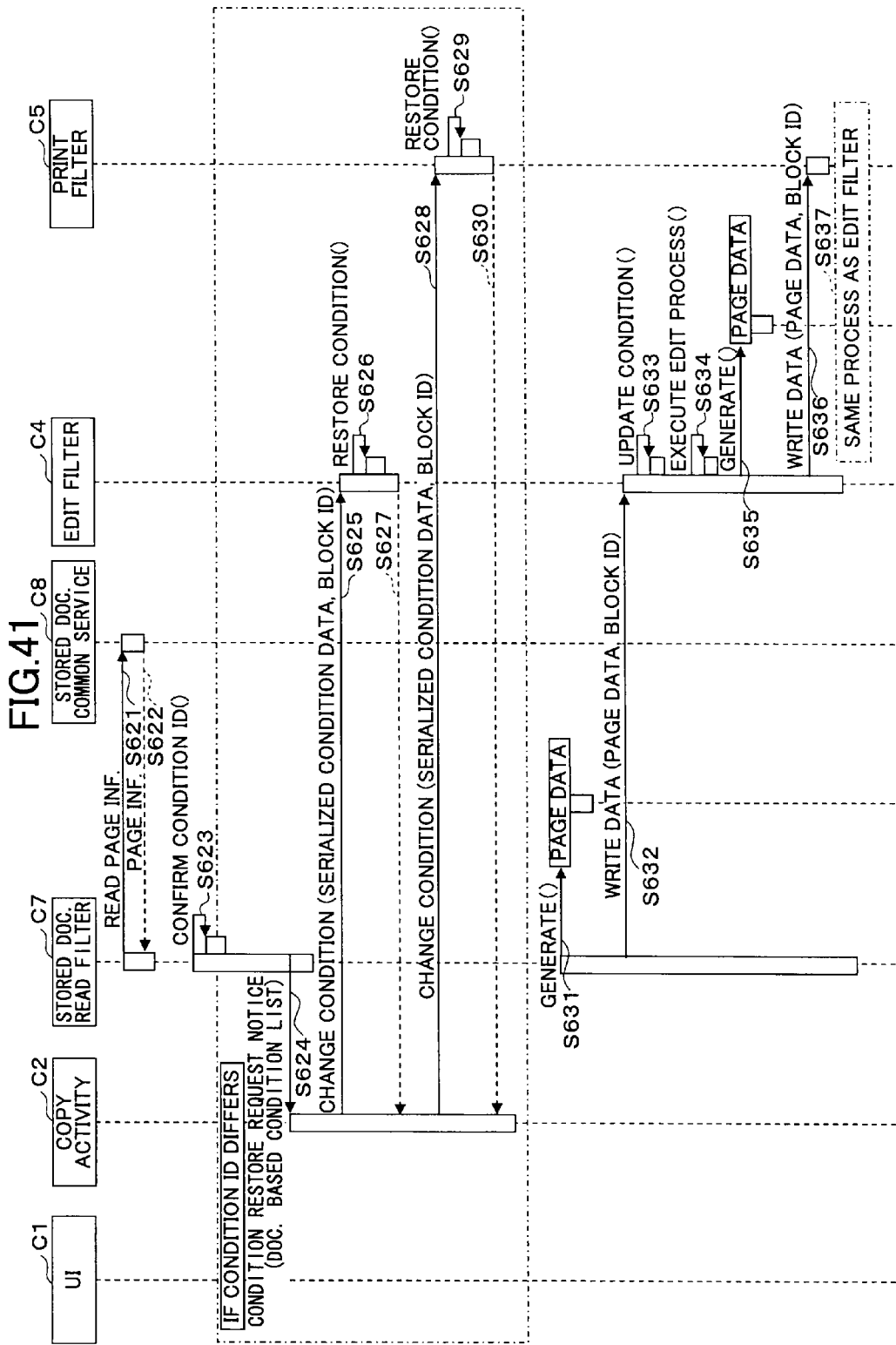

IMAGE PROCESSING APPARATUS AND APPLICATION EXECUTING METHOD

BACKGROUND OF THE INVENTION

1. Field of the Invention

The present invention relates to image processing apparatuses and application executing methods. Particularly, the present invention relates to an image processing apparatus having an input unit for entering data that is subjected to image processing, and an output unit for outputting a result of image processing.

2. Description of the Related Art

Modern image processing apparatuses, such as printers, copiers, scanners, facsimile machines, and multifunction peripherals, the last of which incorporate the aforementioned functions within a single casing, are equipped with a central processing unit (CPU) similar to that in general-purpose computers, although its memory or other capacities may be limited. Each of those multiple functions is realized by controlling applications.

For example, Japanese Patent No. 3679349 discloses an image processing apparatus having a platform of functions that are commonly utilized by each application, where an application can be implemented by using an application program interface (API) of the platform. In this image processing apparatus, the platform of the commonly utilized functions avoids the overlapping implementation of functions among the applications, thereby enhancing the efficiency of development of the entire applications.

Generally, unless the granularity of a function or an interface provided by the platform having the commonly utilized API is properly designed, an expected level of improvement in application development efficiency cannot be achieved.

For example, if the granularity is too small, an application that provides a simple service would require a number of API calls, resulting in a complex source code.

On the other hand, if the granularity is too large, when it is desired to implement an application that provides a service that modifies a part of a function provided by a certain interface, it becomes necessary to modify the platform internally, possibly resulting in an increase in the number of development steps. Particularly, when the individual modules within the platform are strongly dependent upon one another, it may become necessary to modify existing portions in addition to adding a new function to the platform, thus further complicating the matter.

When it is desired to implement an application that modifies a part (such as an image input process) of a service provided by an existing application, portions of the existing application other than the particular part cannot be called. Thus, a new application needs to be implemented by newly describing a source code.

SUMMARY OF THE INVENTION

It is a general object of the present invention to provide a novel and useful image processing apparatus and application executing method whereby one or more of the aforementioned problems of the related art are eliminated. A more specific object of the invention is to provide an image processing apparatus and application executing method whereby function customization or expansion can be performed easily.

Another object of the present invention is to provide an image processing apparatus and an application executing method whereby, when performing a process such as editing or printing a document while the document is stored, edit or print conditions set by a user are saved together with the document per se, so that, in response to a request to reproduce the edit or print conditions when reutilizing the stored document, even those conditions that are allocated on a page by page basis can be accurately reproduced without the development of strong dependency between components.

In one aspect, the present invention provides an image processing apparatus comprising one or more input units configured to input image data that is subjected to image processing; one or more output units configured to output a result of the image processing; a first filter configured to control a process of inputting the image data from the input unit depending on the input unit; a second filter configured to control an output to the output unit depending on the output unit, wherein an application is constructed by a connection of the first filter and the second filter; a setting unit configured to set a setting condition for each of the first filter and the second filter; an instructing unit configured to instruct a registration of a stored document; and an ID acquisition unit provided to each of the first filter and the second filter. In response to an instruction from the instructing unit to register the stored document, the ID acquisition unit notifies a data managing unit of the setting condition set by the setting unit, and acquires a condition ID that is assigned to the setting condition. The apparatus further comprises a storing unit configured to store the condition ID acquired by the ID acquisition unit and the image data in association with one another.

In a preferred embodiment, the setting condition includes an edit condition or a print condition concerning the image data.

In another preferred embodiment, the setting unit sets the setting condition on a page by page basis. The ID acquisition unit checks the setting condition for each of successively inputted pages, notifies the data managing unit of the setting condition only when there is a change in the setting condition, and acquires a condition ID.

In another preferred embodiment, the storing unit stores the condition ID on a page by page basis.

In another preferred embodiment, the image processing apparatus may further include an identifying unit configured to identify the image data stored in the storing unit; a condition ID reading unit configured to read the condition ID associated with the image data from the image data; a notifying unit configured to notify the first filter and the second filter of the condition ID read by the condition ID reading unit; an acquisition unit provided to each of the first filter and the second filter and configured to notify the data managing unit of the condition ID of which each of the first filter and the second filter is notified by the notifying unit, and configured to acquire the setting condition attached to the condition ID; and a condition restoring unit configured to restore a setting based on the acquired setting condition.

In another aspect, the present invention provides an image processing apparatus comprising one or more input units configured to input image data that is subjected to image processing; one or more output units configured to output a result of the image processing; a first filter configured to control a process of inputting the image data from the input unit depending on the input unit; a second filter configured to control an output to the output unit depending on the output unit, wherein an application is constructed by a connection of the first filter and the second filter; a setting unit configured to set a setting condition for each of the first filter and the second filter; an instructing unit configured to instruct a registration of a stored document; a transforming unit provided to each of the first filter and the second filter and configured to convert the setting condition set by the setting unit into a general-purpose data sequence of condition data in response to an instruction by the instructing unit to register the stored document; and a storing unit configured to store the general-purpose data sequence of condition data generated by the transforming unit and the image data in association with one another.

In a preferred embodiment, the image processing apparatus may further comprise an identifying unit configured to identify the image data stored in the storing unit; a condition data reading unit configured to read the condition data associated with the image data from the image data; a notifying unit configured to notify the first filter and the second filter of the condition data read by the condition data reading unit; and a condition restoring unit provided to each of the first filter and the second filter and configured to restore the setting condition from the general-purpose data sequence of condition data of which each of the first and the second filter is notified.

In another aspect, the present invention provides an application executing method for an image processing apparatus comprising one or more input units configured to input image data that is subjected to image processing; one or more output units configured to output a result of the image processing; a first filter configured to control a process of inputting the image data from the input unit depending on the input unit; and a second filter configured to control an output to the output unit depending on the output unit, wherein an application is constructed by a connection of the first filter and the second filter. The method comprises the steps of setting a setting condition for each of the first filter and the second filter; instructing a registration of a stored document; in response to an instruction to register the stored document, notifying a data managing unit of the setting condition from each of the first filter and the second filter, and acquiring a condition ID assigned to the setting condition; and storing the acquired condition ID and the image data in association with one another.

In a preferred embodiment, the setting condition may include an edit condition or a print condition concerning the image data.

In a preferred embodiment, the setting step may include setting the setting condition on a page by page basis, and the step of acquiring the condition ID may include checking the setting condition for each of successively inputted pages, notifying the data managing unit of the setting condition only when there is a change in the setting condition, and acquiring a condition ID.

In a preferred embodiment, the storing step may include storing the condition ID on a page by page basis.

In another preferred embodiment, the application executing method may further comprise the steps of identifying the image data that is stored; reading the condition ID associated with the image data from the identified image data; notifying the first filter and the second filter of the condition ID that is read; notifying the data managing unit of the condition ID of which each of the first filter and the second filter is notified in the notifying step, and acquiring the setting condition attached to the condition ID; and restoring a setting based on the setting condition that is acquired.

In accordance with an embodiment of the invention, function customization or expansion can be performed easily. In accordance with another embodiment of the invention, when performing a process such as editing or printing a document while the document is stored, edit or print conditions set by a user are saved together with the document per se, so that, in response to a request to reproduce the edit or print conditions when reutilizing the stored document, even those conditions that are allocated on a page by page basis can be accurately reproduced without the development of strong dependency between components.

BRIEF DESCRIPTION OF THE DRAWINGS

These and other objects, features and advantages of the invention will be apparent to those skilled in the art from the following detailed description of the invention, when read in conjunction with the accompanying drawings in which:

FIG. 6 shows an example of combinations of filters for realizing functions of the multifunction peripheral according to the first embodiment;

FIG. 19A shows a diagram illustrating the timing of setting conditions in a copy and storage process;

FIG. 19B shows a diagram illustrating the content of the condition in the copy and storage process of FIG. 19A;

FIG. 20A shows a process of reading conditions on a page-by-page basis in the stored document print process;

FIG. 21 shows a sequence diagram of a process of setting and saving initial conditions in the copy and storage process;

FIG. 22 shows a sequence diagram of a process of reading, editing, and storing a document in the copy and storage process, as well as saving document information;

FIG. 28 shows a flowchart of the process of reading a page-based condition in the stored document print process;

FIG. 41 shows a sequence diagram of a process of reading and editing a page-based condition in the stored document print process.

DETAILED DESCRIPTION OF THE PREFERRED EMBODIMENTS

In the following, a description is given of embodiments of the present invention.

Embodiment 1

Figure 1:
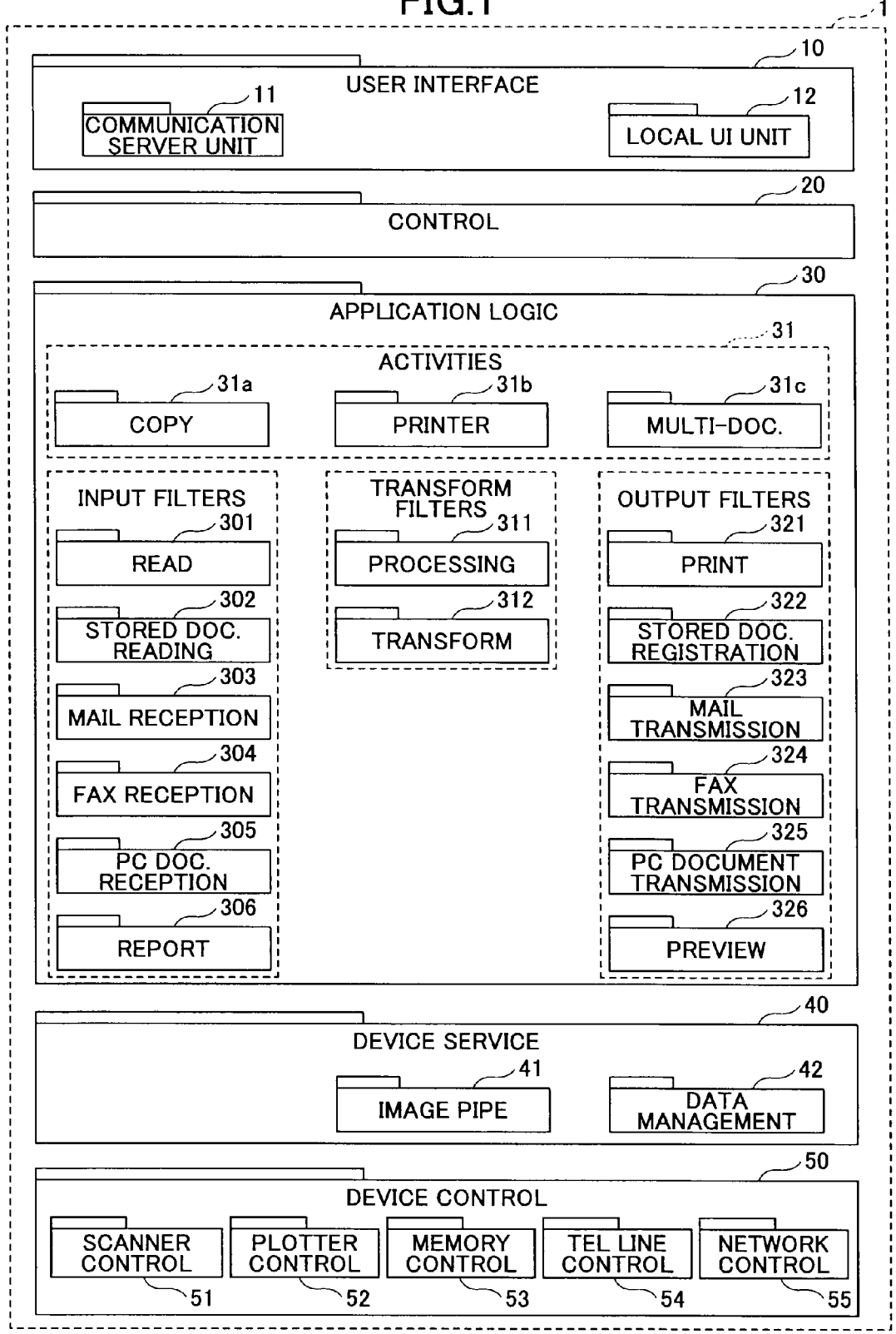
FIG. 1 shows a software structure of a multifunction peripheral according to a first embodiment of the invention.

FIG. 1 shows a software structure of a multifunction peripheral according to a first embodiment of the invention. The term "multifunction peripheral" is herein intended to refer to an image processing apparatus that realizes multiple functions of a printer, a copier, a scanner, and/or a FAX machine within a single casing.

As shown in FIG. 1, the software structure of the multifunction peripheral 1 includes a user interface layer 10, a control layer 20, an application logic layer 30, a device service layer 40, and a device control layer 50. The upper-lower relationship among the layers in the figure is based on the calling/called relationship among the layers. Namely, basically a layer shown above calls a layer shown below.

The user interface layer 10 is where a function for accepting a request to execute a function (such as copy, print, scan, or FAX transmission) is implemented. The user interface layer 10 includes a communication server unit 11 and a local user interface (UI) unit 12. The communication server unit 11 may receive a request from a client personal computer (PC), which is not shown, via a network. The local UI unit 12 may receive a request that is entered via an operation panel, which is not shown. The request received by the user interface layer 10 is transmitted to the control layer 20.

The control layer 20 implements a function for controlling a process for realizing a requested function. Specifically, depending on the requested function, the control layer 20 connects individual filters in the application logic layer 30, and controls the execution of the function based on the connected filters. In the present embodiment, a "function" of the multifunction peripheral 1 is equivalent to a unit of service provided by the multifunction peripheral 1 to a user (between the input of a request and the obtaining of a final result). In software terms, the function is synonymous with an application that provides a single coherent unit of service.

The application logic layer 30 implements components each of which realizes a part of a function provided by the multifunction peripheral 1. By combining the components in the application logic layer 30, a single function is realized. Each of the components is referred to as a "filter". This is due to the fact that the software architecture of the multifunction peripheral 1 is based on the concept of "pipe and filter".

Figure 2:
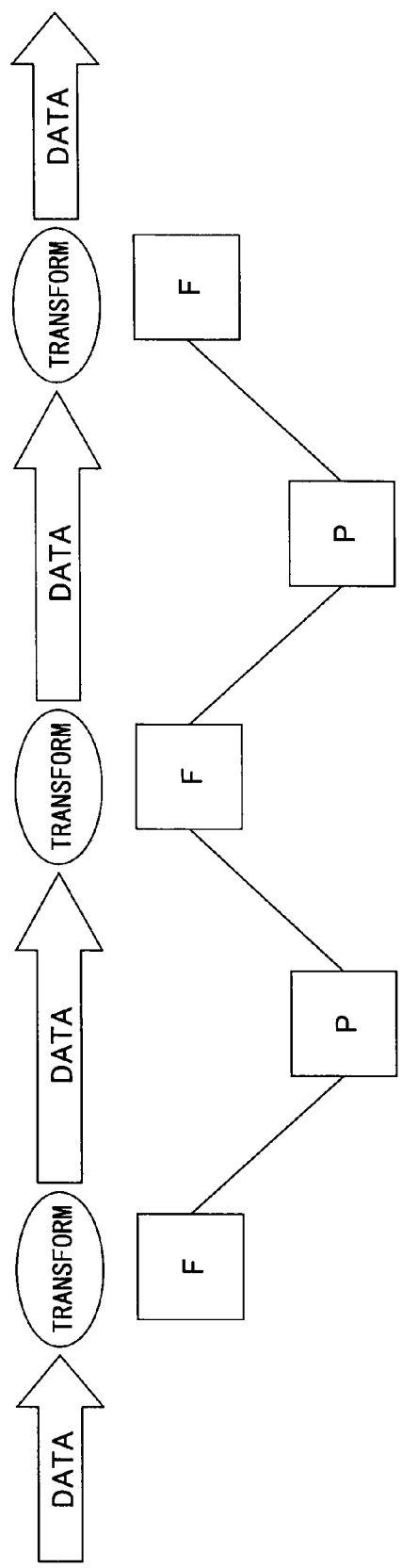
FIG. 2 illustrates the pipe and filter concept.

FIG. 2 illustrates the concept of pipe and filter. In FIG. 2, "F" indicates a filter, and "P" indicates a pipe. As shown in FIG. 2, the filters are connected via pipes. The filters transform input data and output a result. The pipes transmit data outputted by the filter to the next filter.

Thus, in the multifunction peripheral 1 according to the present embodiment, each function is considered to consist of a succession of transformations of a document (data). Each function of the multifunction peripheral 1 can be generalized as consisting of an input, a processing, and an output of a document. Thus, an "input", a "processing", and an "output" are considered to be "transformations", where each "transformation" is realized by the software component of filter. A filter for realizing an input is referred to as an input filter. A filter for realizing a processing is referred to as a transform filter. And a filter for realizing an output is referred to as an "output filter". Each filter is independent, and there is basically no dependency relationship (calling/called relationship) among the filters. Thus, addition (installation) or deletion (uninstallation) can be made on a filter by filter basis.

Referring back to FIG. 1, the application logic layer 30 includes a read filter 301, a stored document read filter 302, a mail reception filter 303, a FAX reception filter 304, a PC document reception filter 305, and a report filter 306 as input filters.

The read filter 301 controls the reading of image data by a scanner, and outputs the image data that has been read. The stored document read filter 302 reads document data (image data) stored in a storage unit of the multifunction peripheral 1, and outputs the data that has been read. The mail reception filter 303 receives electronic mail and outputs data contained in the electronic mail. The FAX reception filter 304 controls FAX receptions and outputs print data that has been received. The PC document reception filter 305 receives print data from a client PC which is not shown, and outputs the received print data. The report filter 306 outputs setting information or history information about the multifunction peripheral 1 as data, which may be modified in the form of a table.

As transform filters, there are shown a document processing filter 311 and a document transform filter 312. The document processing filter 311 performs a predetermined image transform process (such as layout or size changes) on input data, and outputs a result. The document transform filter 312 performs a rendering process involving the conversion of PostScript data that is inputted into bit map data that is outputted.

As output filters, there are shown a print filter 321, a stored document registration filter 322, a mail transmission filter 323, a FAX transmission filter 324, a PC document transmission filter 325, and a preview filter 326.

The print filter 321 causes a plotter to output (print) data that is inputted. The stored document registration filter 322 saves data that is inputted in a storage device in the multifunction peripheral 1, such as a hard disk unit. The mail transmission filter 323 attaches data that is inputted to electronic mail and transmits the electronic mail. The FAX transmission filter 324 transmits data that is inputted via FAX. The PC document transmission filter 325 transmits input data to the client PC. The preview filter 326 causes input data to be displayed on an operation panel of the multifunction peripheral 1 for preview purposes.

The application logic layer 30 includes activities 31, such as a copy activity 31a, a multi-document activity 31c, and a printer activity 31b. The term "activity" is herein intended to refer to software that realizes, based on a predetermined combination of filters, a single "function" (i.e., a coherent unit of service or application that the multifunction peripheral 1 provides to a user).

Thus, a function of the multifunction peripheral 1 can be assembled by having a user select filters individually. However, when the function is frequently utilized by the user, such as the copy function, it is inconvenient if the user has to enter an instruction concerning the selection of the filters each time the function is utilized. Thus, by defining a combination of certain filters as the activity 31 in advance, as the user selects the activity 31 as a unit of execution, the filters associated with the combination defined for the activity 31 can be automatically executed. In this way, the operational complexity can be eliminated, and it becomes possible to provide the same sense of operation as that of a conventional user interface that allows the selection of an object of execution on an application by application basis.

With reference to FIG. 1, the copy activity 31a realizes the copy function (copy application) based on the combination of the read filter 301, the document processing filter 311, and the print filter 321.

The printer activity 31b realizes the print function (printer application) based on the combination of the PC document reception filter 305, the document transform filter 312, and the print filter 321.

The multi-document activity 31c is an activity consisting of any desired combination of an input filter, a transform filter, and an output filter.

The individual activities 31 are independent and there is basically no dependency (calling/called) relationship among the activities 31. Thus, addition (installation) or deletion (uninstallation) can be made on an activity by activity basis. Therefore, other than the activity 31 shown in FIG. 1, a desired activity 31 can be created by combining the filters as needed and installed.

The device service layer 40 implements lower-level functions that are commonly utilized by the individual filters in the application logic layer 30. The device service layer 40 includes an image pipe 41 and a data managing unit 42. The image pipe 41 realizes the aforementioned function of a pipe; namely, it transmits output data from one filter to the next filter. The data managing unit 42 represents various databases, such as a database in which user information is registered, and a database in which documents or image data are stored.

The device control layer 50 implements a group of program modules called drivers that control (hardware) devices. The device control layer 50 includes a scanner control unit 51, a plotter control unit 52, a memory control unit 53, a telephone line control unit 54, and a network control unit 55. Each control unit controls a device designated by the name of the control unit.

Figure 3:
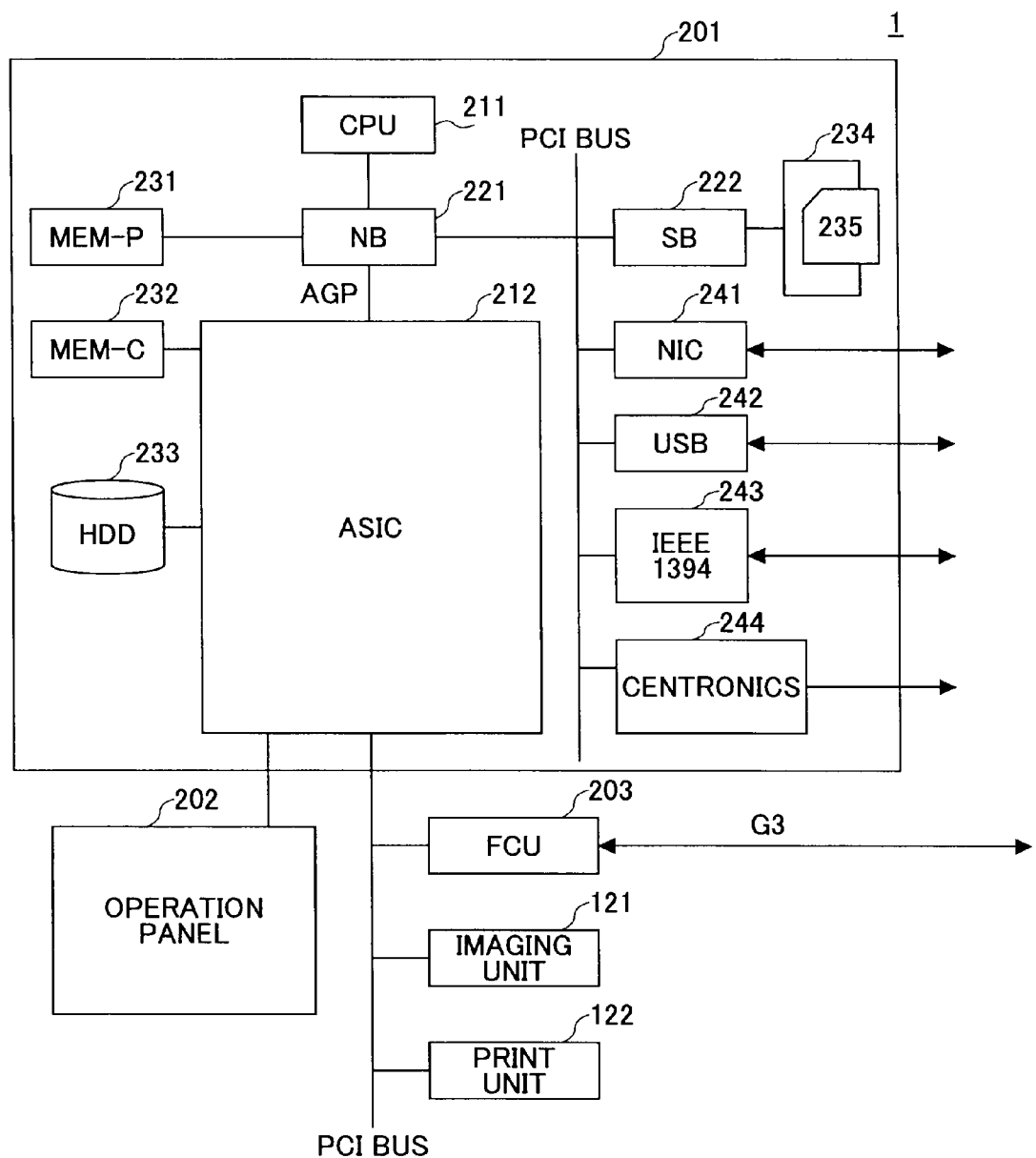
FIG. 3 shows a hardware structure of the multifunction peripheral according to the first embodiment.

FIG. 3 shows a hardware structure of the multifunction peripheral 1. The multifunction peripheral 1 includes a controller 201, an operation panel 202, a facsimile control unit (FCU) 203, an imaging unit 121, and a print unit 122 as hardware units.

The controller 201 includes a CPU 211, an application specific integrated circuit (ASIC) 212, a north bridge (NB) 221, a south bridge (SB) 222, a MEM-P 231, a MEM-C 232, a hard disk drive (HDD) 233, a memory card slot 234, a network interface controller (NIC) 241, a universal serial bus (USB) device 242, an IEEE 1394 device 243, and a Centronics device 244.

The CPU 211 includes an integrated circuit (IC) for various information processes. The ASIC 212 is an IC for various image processing. The NB 221 is a north bridge of the controller 201. The SB 222 is a south bridge of the controller 201. The MEM-P 231 is a system memory of the multifunction peripheral 1. The MEM-C 232 is a local memory of the multifunction peripheral 1. The HDD 233 is a storage for the multifunction peripheral 1. The memory card slot 234 is a slot for setting the memory card 235. The NIC 241 is a controller for network communications based on MAC address. The USB device 242 is a device for providing a USB-standard connection terminal. The IEEE 1394 device 243 is a device for providing an IEEE 1394-standard connection terminal. The Centronics device 244 is a device for providing a Centronics-standard connection terminal. The operation panel 202 provides an operating unit (hardware) for an operator to enter data into the multifunction peripheral 1, and a display unit (hardware) for the operator to obtain an output from the multifunction peripheral 1.

The software shown in FIG. 1 may be stored in the MEM-C 232 and then processed by the CPU 211 to cause a relevant function to be executed by the multifunction peripheral 1.

Figure 4:
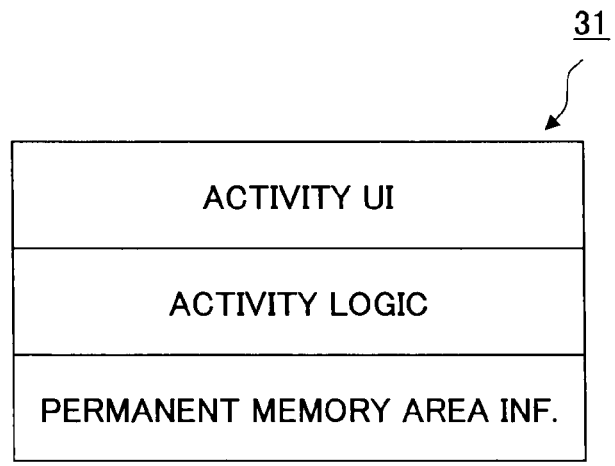
FIG. 4 shows constituent elements of an activity.

In the following, a detailed description is given of the activity and the filter. FIG. 4 shows constituent elements of an activity. As shown in FIG. 4, an activity 31 consists of an activity UI, an activity logic, and a persistent memory area information, for example.

The activity UI includes information or a program for causing a screen concerning the activity 31 (such as a setting screen for setting an execution condition for an activity) to be displayed on an operation panel or the like.

The activity logic is a program implementing a process content of the activity 31. Basically, the activity logic implements a logic concerning the combination of filters (such as the order of execution of the filters, settings concerning multiple filters, connection changes among the filters, and an error process).

The persistent memory area information corresponds to a schema definition of data that needs to be stored in a non-volatile memory, such as setting information concerning the activity 31 (such as a default value of an execution condition).

The relevant schema definition is registered in the data managing unit 42 upon installing of the activity 31.

Figure 5:
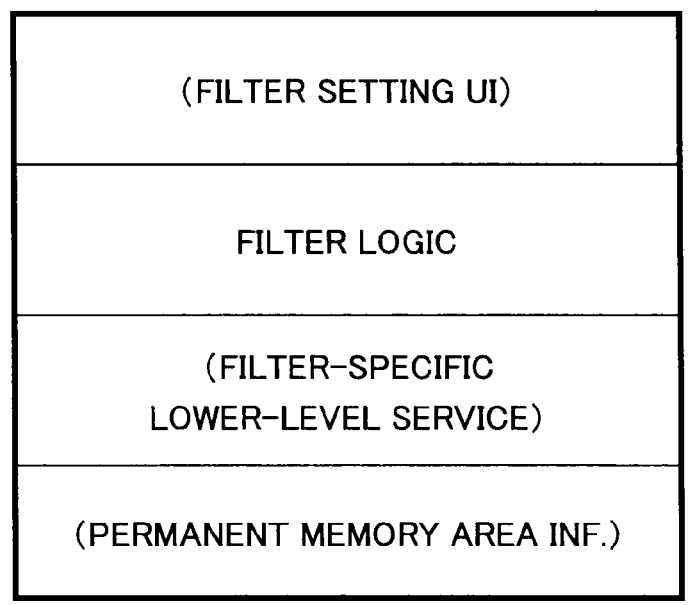
FIG. 5 shows constituent elements of a filter.

FIG. 5 shows constituent elements of a filter. As shown in FIG. 5, each filter includes a filter setting UI, a filter logic, a filter-specific lower-layer service, and persistent memory area information. Among those, the filter setting UI, the filter-specific lower-layer service, and the persistent memory area information may not be necessarily included as constituent elements in some filters.

The filter setting UI includes a program for causing a screen for setting an execution condition or the like for the filter to be displayed on the operation panel or the like. For example, in the case of the read filter 301, the corresponding screen may allow the setting of resolution, density, and image type. In view of the fact that the display on the operation panel may be made based on HTML data or a script, the filter setting UI may consist of HTML data or a script.

The filter logic includes a program implementing a function of the filter. Specifically, the filter logic, utilizing the constituent elements of the filter such as the filter-specific lower-level service, the device service layer 40, and/or the device control layer 50, realizes the filter function in accordance with the execution condition that is set via the filter setting UI. For example, in the case of the read filter 301, a corresponding logic may control the reading of a manuscript by a scanner.

The filter-specific lower-level service is a lower-level function (library) necessary for realizing the filter logic. Specifically, the function corresponds to the device service layer 40 or the device control layer 50. When not utilized by another filter, the filter-specific lower-level service may be implemented as part of the filter. In this case, the relevant part corresponds to the filter-specific lower-layer service. For example, in the case of the read filter 301, a corresponding function may control the scanner. In the present embodiment, the function is implemented as the scanner control unit 51 in the device control layer 50. Thus, in the read filter 301, the filter-specific lower-layer service does not necessarily need to be implemented.

The persistent memory area information corresponds to a schema definition of data that needs to be stored in a non-volatile memory, such as setting information concerning the filter (such as a default value of an execution condition). The relevant schema definition is registered in the data managing unit 42 upon installing of the filter.

FIG. 6 shows an example of combinations of filters for realizing the individual functions of the multifunction peripheral 1. For example, the copy function is realized by connecting the read filter 301 and the print filter 321 so that image data read by the read filter 301 from a manuscript can be printed by the print filter 321. When a request for a processing including a layout or size change is made, the document processing filter 311 that realizes the required processing is inserted between the two filters.

The printer function (for printing from the client PC) can be realized by connecting the PC document reception filter 305, the document transform filter 312, and the print filter 321. The scan to email function (whereby scanned image data is transferred via electronic mail) is realized by connecting the read filter 301 and the mail transmission filter 323. The FAX transmission function is realized by connecting the read filter 301 and the FAX transmission filter 324. The FAX reception function is realized by connecting the FAX reception filter 304 and the print filter 321. The document box storing function (whereby scanned image data is saved within the multifunction peripheral 1) is realized by connecting the read filter 301 and the stored document registration filter 322. The document box print function (whereby document data saved in the multifunction peripheral 1 is printed) is realized by connecting the stored document read filter 302 and the print filter 321.

In FIG. 6, four functions (copy, scan to email, FAX transmission, and storage in document box) are utilized for the read filter 301, for example. Thus, each filter can be utilized from multiple functions, so that the number of development steps for realizing each function can be reduced. For example, with regard to the copy function and the scan function (document box storage), their user interfaces for setting their execution conditions are similar. However, it has been the case that when each function is implemented by an application, a user interface is also implemented for each application. In the present embodiment, settings for both the copy function and the scan function can be entered via the user interface of the read filter 301, thus making the user interface commonly available.

A case is considered where a new function is realized. Specifically, a function #1 is to be realized that prints print data transmitted from a client PC in a page description language (PDL) that is not compatible with the multifunction peripheral 1 (to be hereafter referred to as the "other PDL"). In this case, the printer function shown in FIG. 6 can be used as a model. However, the printer function is based on the assumption that the data outputted by the PC document reception filter 305 is in PostScript format. This is because the document transform filter 312 can handle input data only in the form of PostScript data. However, in the case of function #1, the data received and outputted by the PC document reception filter 305 is in the other PDL format. Therefore, if the data is transferred to the document transform filter 312 as is, the document transform filter 312 cannot appropriately perform a process. Thus, function #1 can be realized by newly implementing a transform filter (to be hereafter referred to as an "other PDL-PS transform filter") that executes data transformation from the other PDL format to the PostScript format, and inserting the transform filter between the PC document reception filter 305 and the document transform filter 312. Namely, function #1 is realized by connecting the PC document reception filter 305, the other PDL-PS transform filter, the document transform filter 312, and the print filter 321.

Hereafter, a case is considered where a function #2 is to be realized that collects information from Web sites, and prints the collected information. In this case, there is no filter that collects information from Web sites. Thus, at least it is necessary to newly implement an input filter (to be hereafter referred to as a "Web collection filter") that collects information from Web sites. Because it is desired to eventually cause function #2 to execute printing, it is appropriate to use the print filter 321 as an output filter. The problem here is how to connect the Web collection filter and the print filter 321. Namely, while the input data to the print filter 321 needs to be in a rendered bit map format, implementing a rendering function within the Web collection filter requires a large number of steps and is therefore inappropriate. A solution could be to utilize the document transform filter 312 that already realizes a rendering function. However, the input data to the document transform filter 312 needs to be in PostScript format. Thus, by implementing the Web collection filter in such a manner as to output collected information in PostScript format, the Web collection filter can be connected to the document transform filter 312. By thus implementing the Web collection filter, function #2 can be realized by connecting the Web collection filter with the document transform filter 312, and connecting the document transform filter 312 with the print filter 321.

Figure 7:
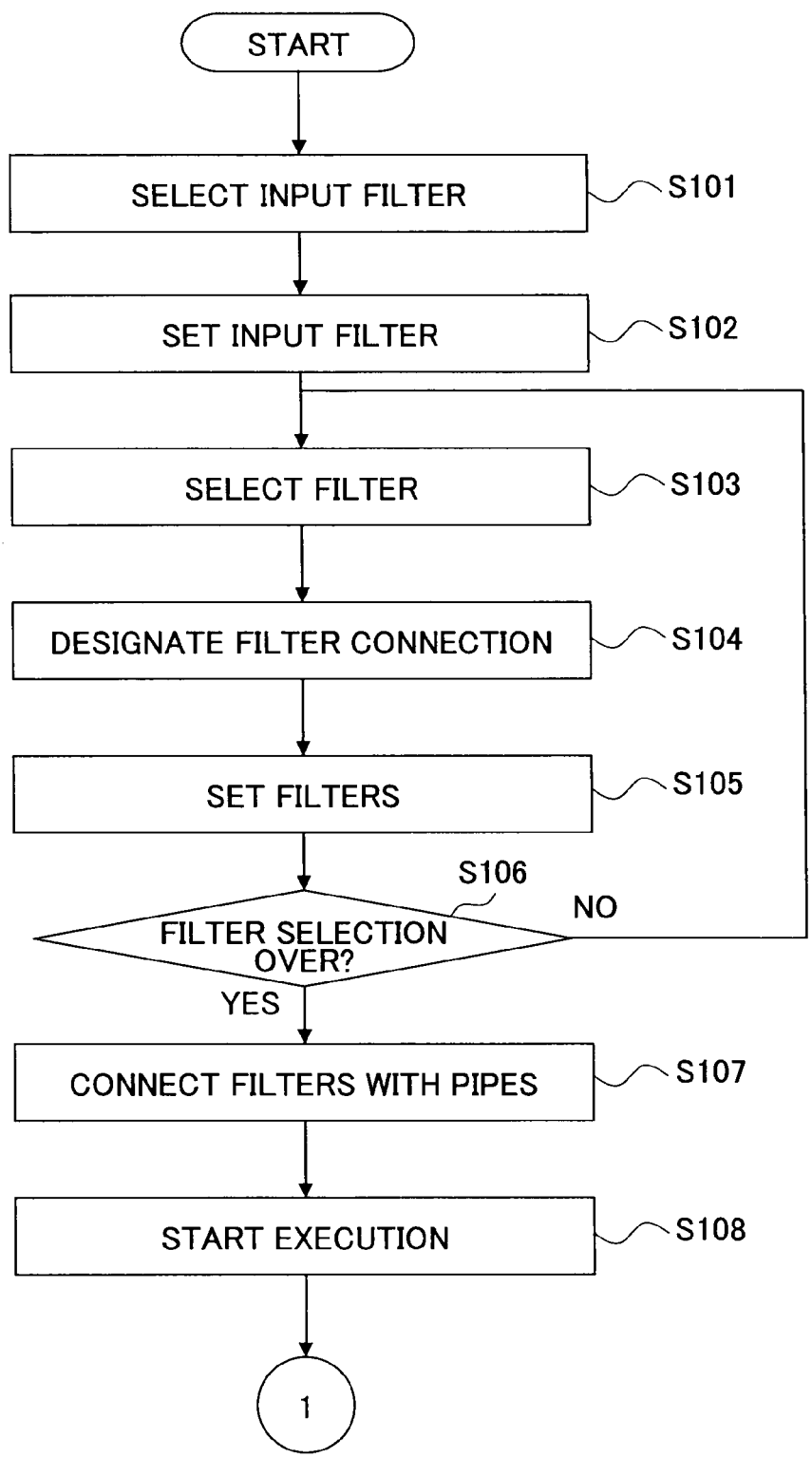
FIG. 7 shows a first part of a flowchart of a process of realizing a function using the multifunction peripheral of the first embodiment.
Figure 8:
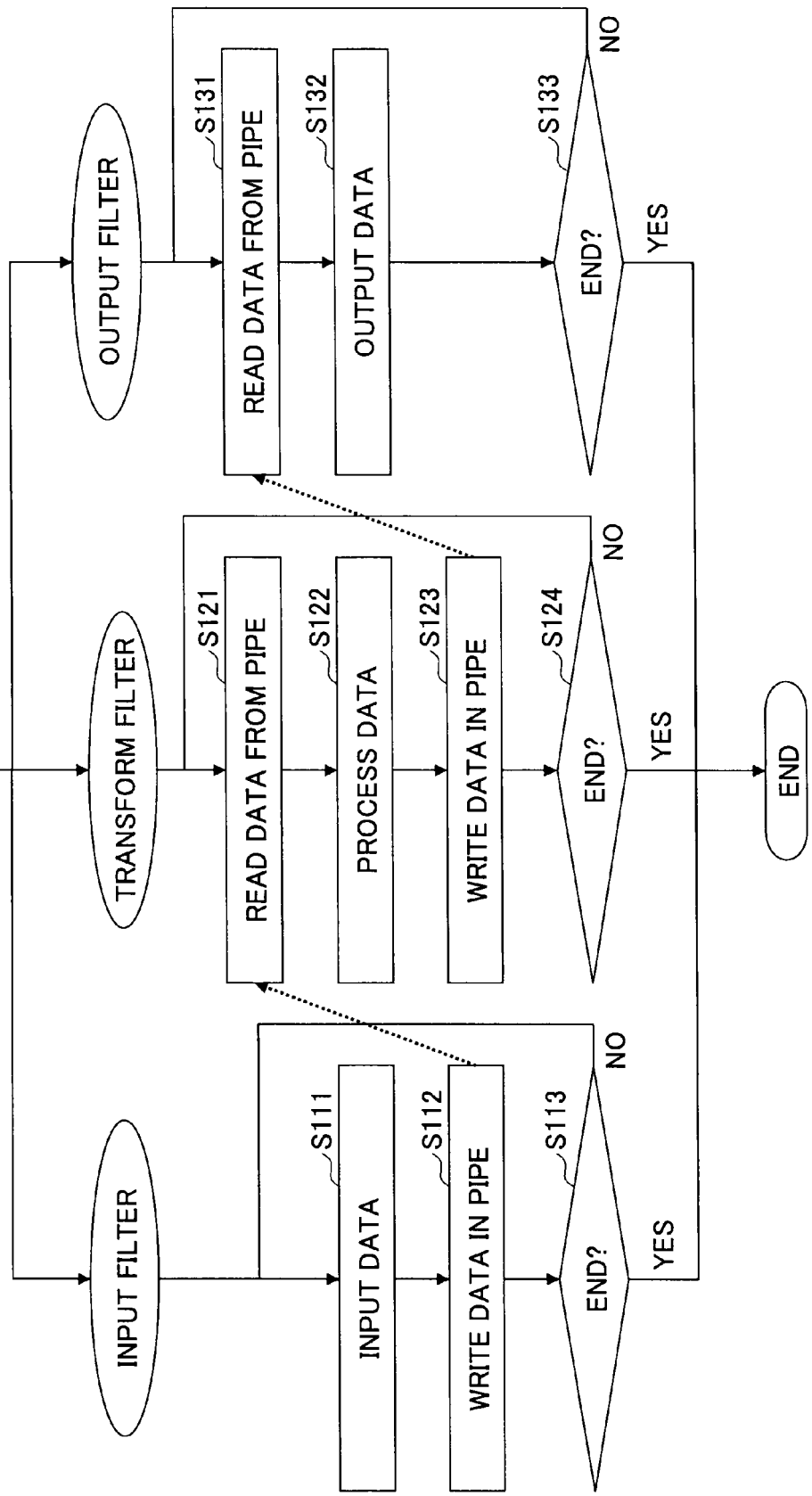
FIG. 8 shows a second part of the flowchart of the process of realizing the function of the multifunction peripheral of the first embodiment.

Hereafter, a description is given of a process sequence of the multifunction peripheral 1 according to the present embodiment. FIGS. 7 and 8 show a flowchart of a process of the multifunction peripheral 1 realizing a single function.

First, a user selects an activity, whereupon an input filter identified by the selected activity is selected (step S101). An execution condition for the selected input filter is set (step S102). Similar selections are made concerning the transform filter and the output filter (step S103), connection between the filters is designated (step S104), and an execution condition is set (step S105).

Figure 9:
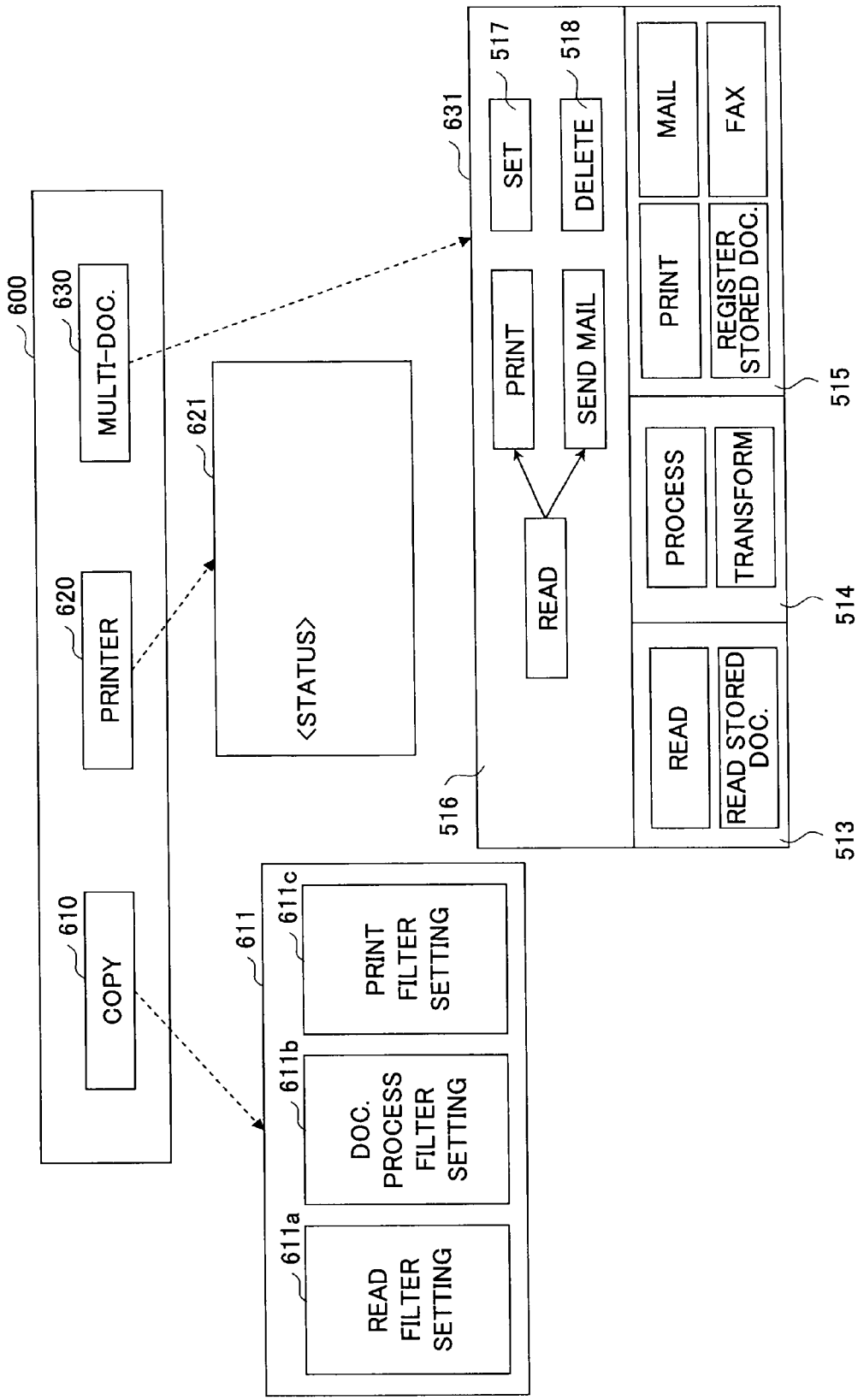
FIG. 9 shows an operating screen for utilizing an activity.

The above operation may be performed via an operation panel (the operation panel 202 in FIG. 3) shown in FIG. 9, under the control of the local UI unit 12. The operation panel 202 includes a touch panel and a start button. The touch panel provides hardware (touch operating unit) for entering data by a touch operation, and also hardware (screen display unit) for obtaining an output via the screen display. The start button provides hardware for instructing the start of execution of a requested function.

FIG. 9 shows an example of an operating screen for utilizing an activity. In FIG. 9, an activity selecting screen 600 is displayed on the touch panel of the operation panel 202 for selecting an activity as an object of execution. The activity selecting screen 600 displays a button for each of the activities 31 installed on the multifunction peripheral 1. In FIG. 9, there are shown a copy button 610 corresponding to the copy activity 31b, a printer button 620 corresponding to the printer activity 31b, and a multi-document button 630 corresponding to the multi-document activity 31c.

Information about a list of the installed activities 31 is recorded in a storage device and may be managed by the control layer 20. Therefore, the local UI unit 12 queries the control layer 20 to acquire the list information about the activities 31, and causes the buttons to be displayed on the activity selecting screen 600 based on the list information.

On the activity selecting screen 600, when the copy button 610 is selected (touched), the local UI unit 12 calls the activity UI of the copy activity 31a to acquire screen information for the copy activity 31a, and causes the copy activity screen 611 to be displayed on the touch panel based on the relevant screen information. The copy activity screen 611 is a screen for setting an execution condition for the copy activity 31a. In FIG. 9, there are shown setting screens for the individual filters of the copy activity 31a (a read filter setting screen 611a, a document processing filter setting screen 611b, and a print filter setting screen 611c). Thus, by setting an execution condition for each filter, the execution conditions for the copy activity 31a are set. The screen information for the setting screen for each filter is acquired by the activity UI of the copy activity 31a by calling, in response to a call from the local UI unit 12, the setting UI for each filter. The thus acquired screen information is included in (i.e., merged with) the screen information about the copy activity 31a. Instead of simply arranging the setting screens for the individual filters, a UI for entering settings for the individual filters collectively (including, for example, a "both-side→both-side button", a read setting (both-side) button, and a print setting (both-side) button) may be displayed on the copy activity screen 611.

Upon selection of the printer button 620, the local UI unit 12 calls the activity UI of the printer activity 31b to acquire the screen information for the printer activity 31b, and causes the printer activity screen 621 to be displayed on the touch panel based on the screen information. The printer activity screen 621 is a screen for displaying the status of the printer activity 31b (such as "printing"). Namely, the printer activity 31b is started up upon reception of print data (i.e., not in response to an operation on the operation panel 202), and basically there is no need for a setting screen.

Upon selection of the multi-document button 630, the local UI unit 12 calls the activity UI of the multi-document activity 31c to acquire the screen information for the multi-document activities 31c, and causes a multi-document activity screen 631 to be displayed on the touch panel based on the screen information.

In the multi-document activity screen 631, desired filters can be combined by a user operation. The multi-document activity screen 631 includes an input filter selection area 513, a transform filter selection area 514, an output filter selection area 515, and a request display area 516. The input filter selection area 513 is an area for selecting an input filter, where a button for each input filter is displayed. When any of the buttons is selected in the input filter selection area 513, a button for an input filter corresponding to the selected button is displayed in the request display area 516. In FIG. 9, there are shown buttons for the read filter 301 and the stored document read filter 513 for convenience's sake.

The transform filter selection area 514 is an area for selecting a transform filter, where buttons for individual transform filters are displayed. When any of the buttons is selected in the transform filter selection area 514, a button for the transform filter corresponding to the selected button is displayed on the request display area 516.

The output filter selection area 515 is an area for selecting an output filter, where buttons for individual output filters are displayed. When any of the buttons in the output filter selection area 515 is selected, a button for an output filter corresponding to the selected button is displayed in the request display area 516. In the figure, there are shown the buttons for the print filter 321, the stored document registration filter 322, the mail transmission filter 323, and the FAX transmission filter 324 for convenience's sake.

Information about a list of installed filters (input filter, transform filter, and output filter) is recorded in a recording device and may be managed by the control layer 20. Thus, the local UI unit 12 queries the control layer 20 to acquire the list information about the filters for displaying the input filter selection area 513, the transform filter selection area 514, and the output filter selection area 515.

In the request display area 516, there are shown buttons for the filters selected in the input filter selection area 513, the transform filter selection area 514, or the output filter selection area 515. The input filter, the transform filter, and the output filter are connected by arrows indicating the flow of data or a pipe. By manipulating the arrows, the order of execution of the filters can be changed. Based on the content displayed in the request display area 516, the user can recognize the filters that are utilized and their flow. In the request display area 516, there are also disposed a setting button 517 and a deleting button 518. The setting button 517 is a button for causing the display of a setting screen for a filter when the button for that filter is selected in the request display area 516. Namely, when the setting button 517 is pressed (touched), a corresponding setting screen is displayed on the touch panel 511 based on the filter setting UI for the selected filter. The deleting button 518 is a button for canceling the use of a filter when a button for that filter is selected in the request display area 516.

More than one input filter, transform filter, or output filter can be selected for a single function. For example, when a scanned image and an image saved in the multifunction peripheral 1 are to be composed and then printed as well as transmitted by FAX, at least two input filters (read filter 301 and stored document read filter 302) and at least two output filters (print filter 321 and FAX transmission filter 324) are selected.

Referring back to FIG. 7, when the selection of the filters is complete ("YES" in step S106), and the start button is pressed, the control layer 20 is notified by the user interface layer 10 about the request content.

Figure 10:
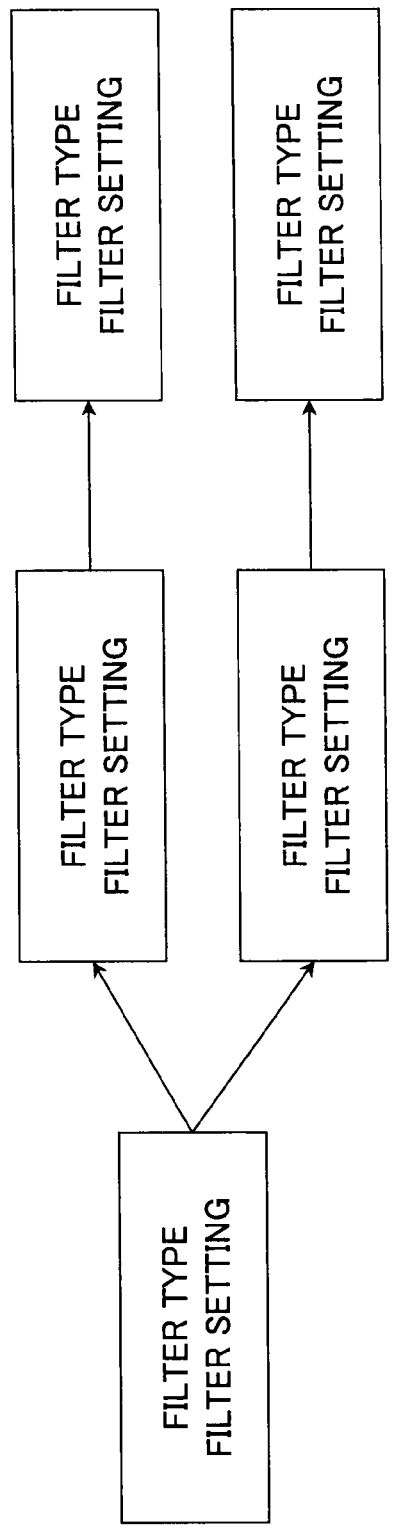
FIG. 10 shows a conceptual diagram of request content sent from the user interface layer to the control layer.

FIG. 10 shows a conceptual diagram illustrating the request content about which the control layer 20 is notified by the user interface layer 10. As shown in FIG. 10, the request from the user interface layer 10 includes the type of each of the filters selected in the user interface layer 10, setting information concerning the filters, and an order of execution of the filters (in FIG. 10, the arrows connecting the blocks indicate the order of execution of the filters).

Referring back to FIG. 7, in response to the aforementioned request content, the control layer 20 connects the selected filters with pipes (step S107). The pipe is actually a memory (including the HDD), of which the types are different depending on the filters on either side of the pipe. Correspondence between the memories and the filters may be defined in the HDD of the multifunction peripheral 1 in advance.

Figure 11:
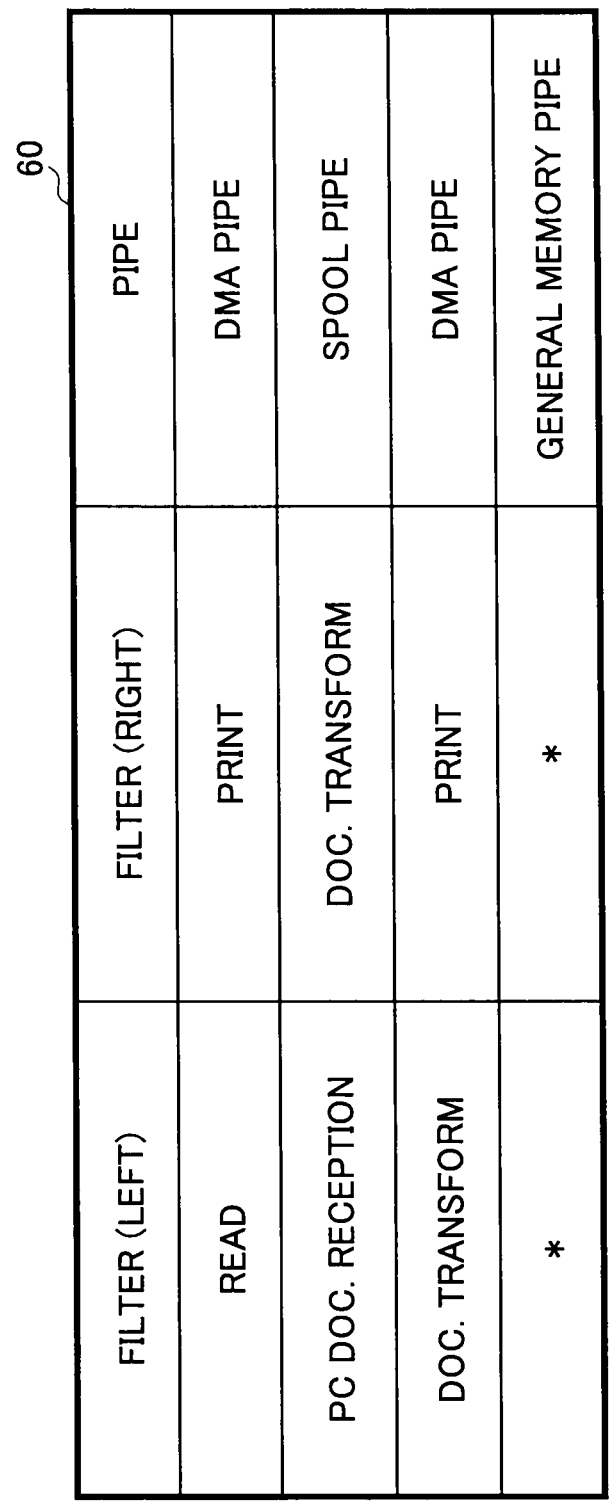
FIG. 11 shows an example of a correspondence table of filters and pipes.

FIG. 11 shows an example of a correspondence table for the filters and the pipes. According to the correspondence table 60 shown in FIG. 11, the read filter 301 and the print filter 321 are connected by a direct memory access (DMA) pipe, and so are the document transform filter 312 and the print filter 321, whereby data can be transferred at high speed. The PC document reception filter 305 and the document transform filter 312 are connected via a spool pipe. The spool pipe is a pipe utilizing the HDD, in which data outputted by the filter on the left is spooled (saved) in the HDD until it is read by the filter on the right. The other filters are connected via general-purpose memory pipes. A general-purpose memory pipe is a pipe that transfers data using a random access memory (RAM) buffer with a limited size. The correspondence table 60 can be edited in accordance with an expansion (addition) or deletion of filters or pipes. The image pipe 41 shown in FIG. 1 represents in an abstract manner a module that provides an interface to the aforementioned various kinds of pipes.

Figure 12:
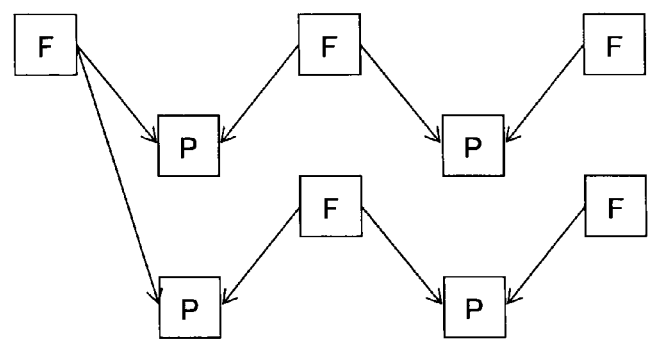
FIG. 12 shows a conceptual diagram of how information is generated by the control layer.

Thus, the control layer 20, based on the correspondence table 60 of FIG. 11, connects the filters with specific pipes. FIG. 12 conceptually shows information generated by the control layer 20, illustrating how the individual filters ("F") are connected by pipes ("P").

Referring back to FIG. 7, the control layer 20 outputs an execution request to the individual filters in a parallel manner (step S108). Namely, the filters are called not in the order of their connection but virtually simultaneously. This is because the filters are synchronized by the pipes. Specifically, in response to the execution request from the control layer, each filter stands by until data is inputted in the pipe on its own input side. However, because the input filter has no pipe on its input side, the input filter starts a process in response to the execution request.

With reference to FIG. 8, the input filter receives data from an input device (step S111) and outputs the data to the pipe connected on the output side (step S112). When the data is entered in plural portions (such as when plural manuscript sheets are scanned), the input of data and its output to the pipe are repeated. When the process is completed for all of the input data ("YES" in step S113), the input filter process ends.

Upon detection of the input of data in the pipe connected on its input side, the transform filter starts its process. First, the transform filter reads the data from the pipe (step S121), and then subjects the data to image processing (step S122). Thereafter, the transform filter outputs data as a process result to the pipe connected to its output side (step S123). When the process is complete with regard to the entire data inputted into the pipe on the input side ("YES" in step S124), the transform filter process ends.

Upon detection of data in the pipe connected to the input side, the output filter starts its process. First, the output filter reads the data from the pipe (step S131), and then outputs the data that has been read, using an output device (step S132). When the process is complete for the entire data inputted into the pipe on the input side (step "YES" in S133), the output filter process ends.

Figure 13:
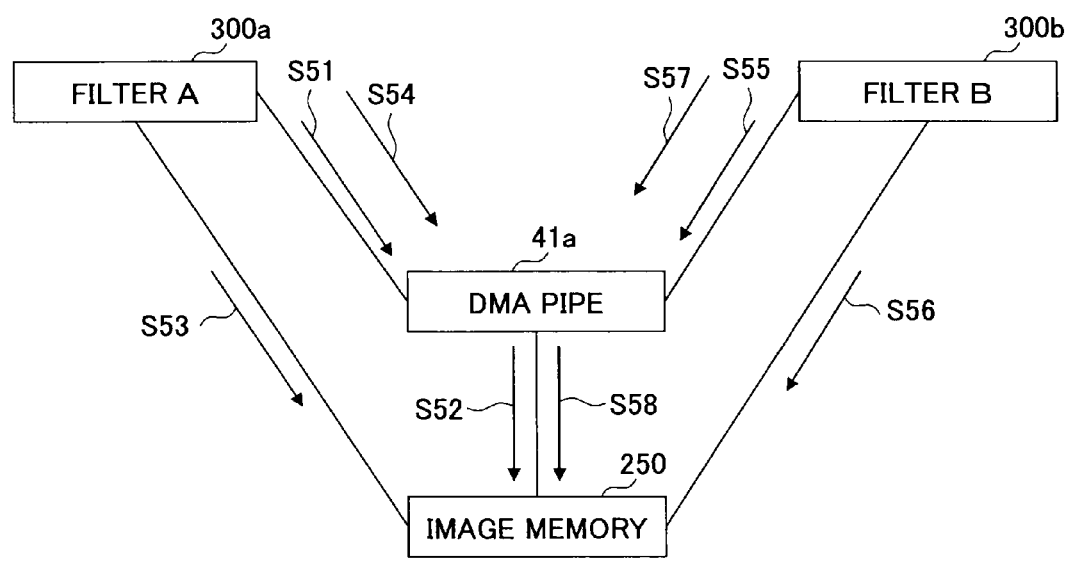
FIG. 13 shows a diagram illustrating a sequence of transmission of data between filters via pipes.

Hereafter, the pipe is described in greater detail. FIG. 13 shows a diagram illustrating a sequence of transmission of data between a filter A (300a) and a filter B (300b) via pipes. A DMA pipe 41a is an example of the image pipe 41 that has been described with reference to FIG. 11. An image memory 250 is a physical (hardware) image memory provided in the multifunction peripheral 1.

When data (image data) is transmitted from the filter A to the filter B, the filter A requests that a memory area be ensured in the DMA pipe 41a for saving the image data (step S51). The DMA pipe 41a ensures the memory area and returns its address to the filter A (step S52). The filter A writes the image data at the returned address (in the image memory 250) (step S53), and notifies the DMA pipe 41a of the address at which the image data has been written (step S54).

The filter B (300b) repeatedly (periodically) makes a query about the address of the image data written in the DMA pipe 41a until it is notified of the address (step S55). Alternatively, the filter B may stand by until notified of the address. Upon notification of the address to the DMA pipe 41a, the filter B acquires the address and thereby detects the writing of the image data in the image memory 250. Thus, the filter B reads the image data from the address in the image memory 250 (step S56), and executes a process associated with the filter B on the image data. At the completion of the process, the filter B requests that the memory area associated with the address be released (step S57). The DMA pipe 41a then releases the memory area (step S58).

Thus, by transmitting data between the filters via an image memory (common memory), the need to ensure a memory area for saving image data in each filter can be eliminated, whereby memory efficiency and process performance can be enhanced. Further, because there is no calling/called relationship among the filters, filter dependency can be maintained.

Embodiment 2

In the second embodiment, when performing a process such as editing or printing a document while storing the document based on multiple outputs, edit or print conditions (detailed setting items) set by the user are saved together with the document itself. In response to a request to reproduce the edit or print conditions when reutilizing the stored document, no strong dependency arises between components, and it becomes possible to accurately reproduce even those conditions that are attached on a page by page basis. The second embodiment is based on the pipe and filter mechanism, of which the basic structure and operation are the same as those described with reference to the first embodiment.

Figure 14:
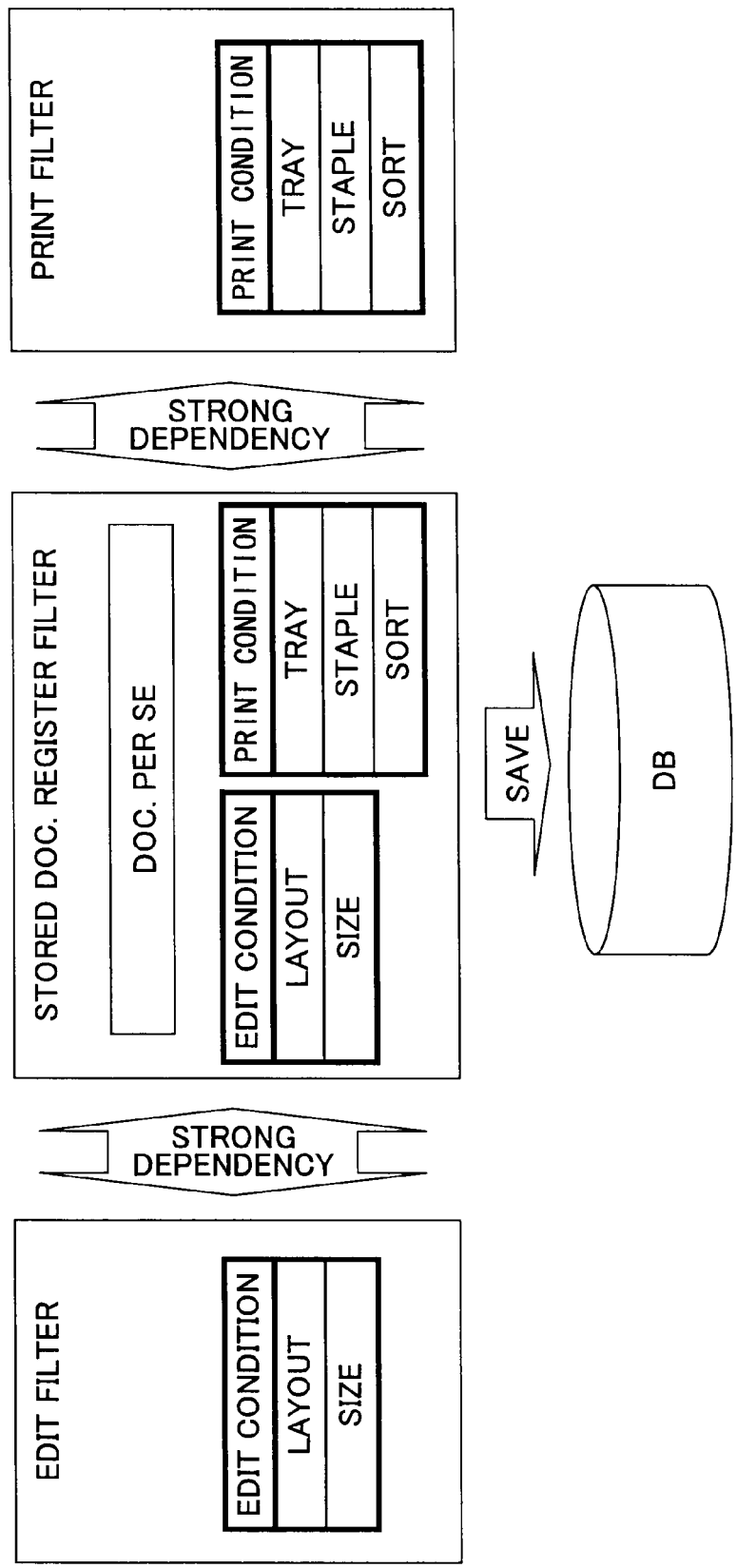
FIG. 14 shows a diagram illustrating problems of storing edit or print conditions together with a document itself.

Generally, document storage is performed by a stored document registration filter, where the conventional technique is to store the edit and print conditions set by the user together with the document itself, using the stored document registration filter. FIG. 14 shows a diagram illustrating the problems encountered when saving the edit or print conditions together with the document itself. As shown, edit conditions (such as layout or size changes) set in an edit filter and print conditions (such as output tray, staple, sort) set in a print filter are delivered to a stored document registration filter, where the edit and print conditions are stored in a database together with the document itself under the control of the stored document registration filter.

In this case, because the stored document registration filter directly handles the edit conditions in the edit filter and the print conditions in the print filter, it is a prerequisite that the stored document registration filter knows the data format or the like of these conditions. As a result, a strong dependency relationship arises between the stored document registration filter and the edit filter or the print filter, thus impeding the dependency of the components. Thus, when modifying one component, another component would also need to be modified, thereby reducing the customization performance. For example, when making an addition or modification to the edit conditions of the edit filter or to the print conditions of the print filter, it becomes necessary to also modify the stored document registration filter.

A user may set conditions on a document by document basis or a page by page basis. A condition may be set by a user on a document by document basis (a "document-based condition") at the start of execution of a job (activity), where the condition is used throughout a series of document processes. On the other hand, a condition may be set on a page by page basis (a "page-based condition") by a user in a pause status after the start of a job (such as in the case of a pressing-plate reading mode in which a manuscript is set one by one, or in the case of a semi-automatic reading mode in which a set of manuscripts is read while another set of manuscripts stands by). More than one condition may be employed in the sequence of the job.

In this case, the technique of saving the edit or print conditions under the control of the stored document registration filter as shown in FIG. 14 have the following problems:

Because a paged-based condition is determined after the start of execution of a job, it is difficult to determine the timing of storing the condition.

Even if the page-based condition is successfully saved, if the condition is associated with the page at the time of setting the condition, inconsistency may arise if the number of pages is changed by a layout change, or when the pages are exchanged.

With regard to the page-based condition, the following has been learned by an analysis from the viewpoint of setting by the user:

A page-based condition is set when the user changes the condition that has been set at the start of execution of a job (initial condition).

The initial condition and the condition after the change are the same in terms of a setting item.

A document-based condition is the same as the initial condition that is not changed from the start of execution of a job by the user.

Thus, if the process of the "user having changed the initial condition" can be reproduced, the requirement to save a page-based condition and then read it can be realized.

Thus, in accordance with the present embodiment, the following features are adopted to overcome the aforementioned problems:

A condition (whether on a document by document basis or on a page by page basis) is saved in a database by the component that has detailed information about the condition, and the stored document registration filter is merely notified of a condition ID of the condition stored in the database.

The stored document registration filter retains the document-based and page-based conditions in the form of a document-based condition list and a page-based condition list, each listing the pairs of condition ID's and component names. The stored document registration filter saves the lists together with the documents themselves in its database as needed. With regard to the page-based conditions, a page-based condition list of the same content is attached not only to the page at the time of setting the condition, but also to all the subsequent pages until a different condition is set. This is to deal with page exchanges or a process order change.

Thus, because the stored document registration filter only needs to exchange a condition ID with the other components (such as the edit filter and the print filter), the stored document registration filter can remain unaware of data format or the like of the conditions, whereby the dependency between them decreases (i.e., the components become more dependent) and customization performance increases.

Because a page-based condition only needs to be saved when it is set by the user, the timing of its storage is clarified.

Furthermore, because it is determined whether a condition is changed on a page by page basis, the process can be modified from the relevant page if the condition is changed. Thus, consistency can be maintained when the number of pages is changed by a layout change or by page exchanges. This is because such a change in the page-based condition is caused somewhere along the sequence of the job, from the viewpoint of user operation, and the starting point in the page where the condition is changed remains the same even if the number of pages is changed by a layout change or the like.

Figure 15:
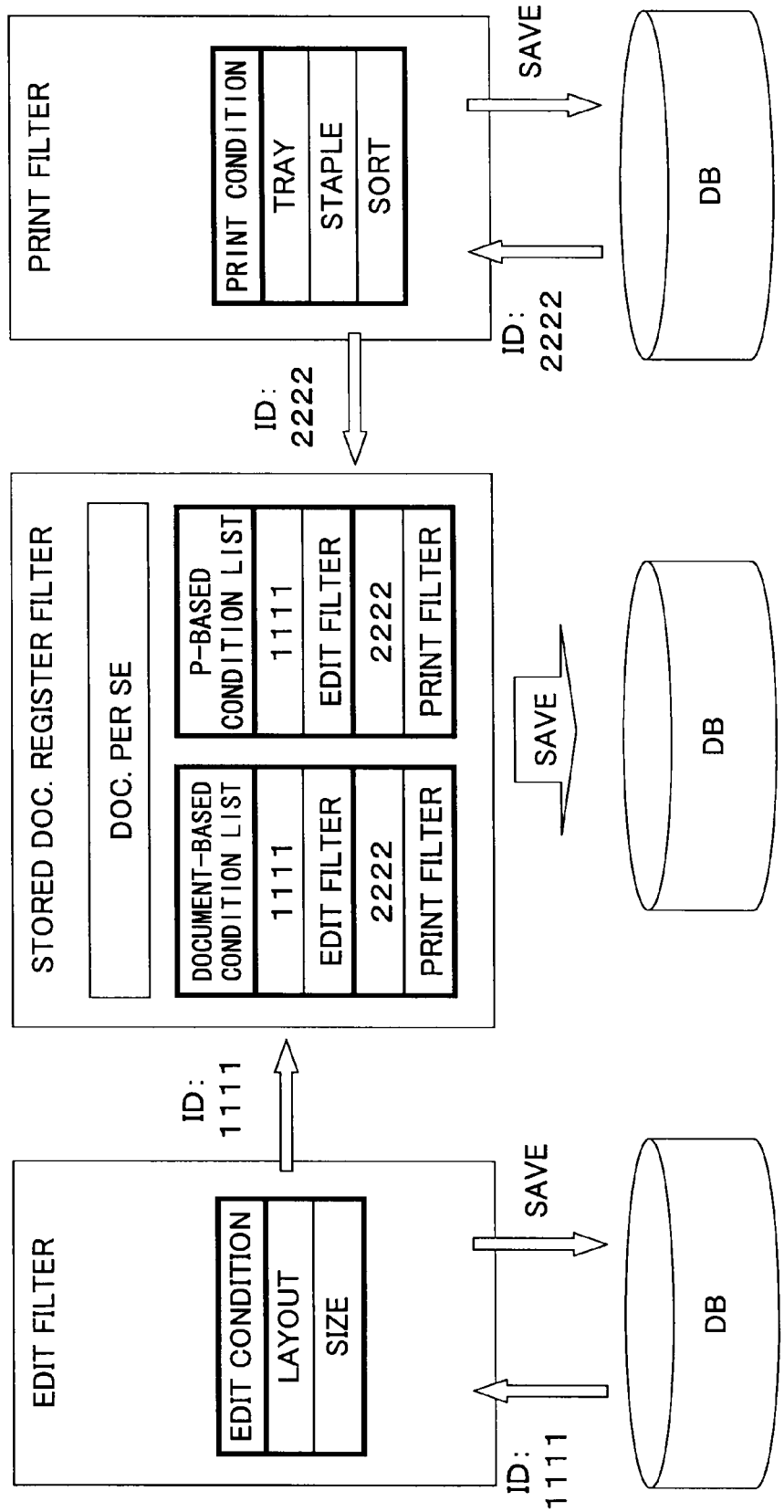
FIG. 15 shows a conceptual diagram illustrating a mechanism to prevent the development of strong dependency among components.

FIG. 15 shows a conceptual chart of a mechanism for preventing the development of a strong dependency among the components in accordance with the present embodiment.

In FIG. 15, the edit filter, at the start of a job, saves edit conditions including the items concerning a layout setting and size change in its database, and acquires a condition ID "1111" identifying the saved data. The edit filter then delivers the condition ID "1111" to the stored document registration filter. The print filter, at the start of the job, saves print conditions including the items such as output tray, staple, and sort in its database, and acquires a condition ID "2222" identifying the saved data. The print filter then delivers the condition ID "2222" to the stored document registration filter. The stored document registration filter stores the condition ID "1111" paired with the component name "edit filter", and the condition ID "2222" paired with the component name "print filter", which the stored document registration filter received at the start of the job, in the document-based condition list and in the page-based condition list for the initial page. The component name is paired with the condition ID because each condition may be based on a different data system, and the condition ID's that are allocated individually may possibly overlap among the components.

The edit filter and the print filter similarly saves in their databases a condition that is set in a job paused status after the start of the job, and deliver the condition ID of the condition to the stored document registration filter. The stored document registration filter stores the condition ID and the corresponding component name in the page-based condition list for the relevant page.

The stored document registration filter saves the document-based condition list and the page-based condition list in its database at an appropriate time, together with the document. The page-based condition list may be saved in the database simultaneously with the storage of the document on a page by page basis. The document-based condition list may be stored in the database upon completion of the process for the entire pages.

Figure 16:
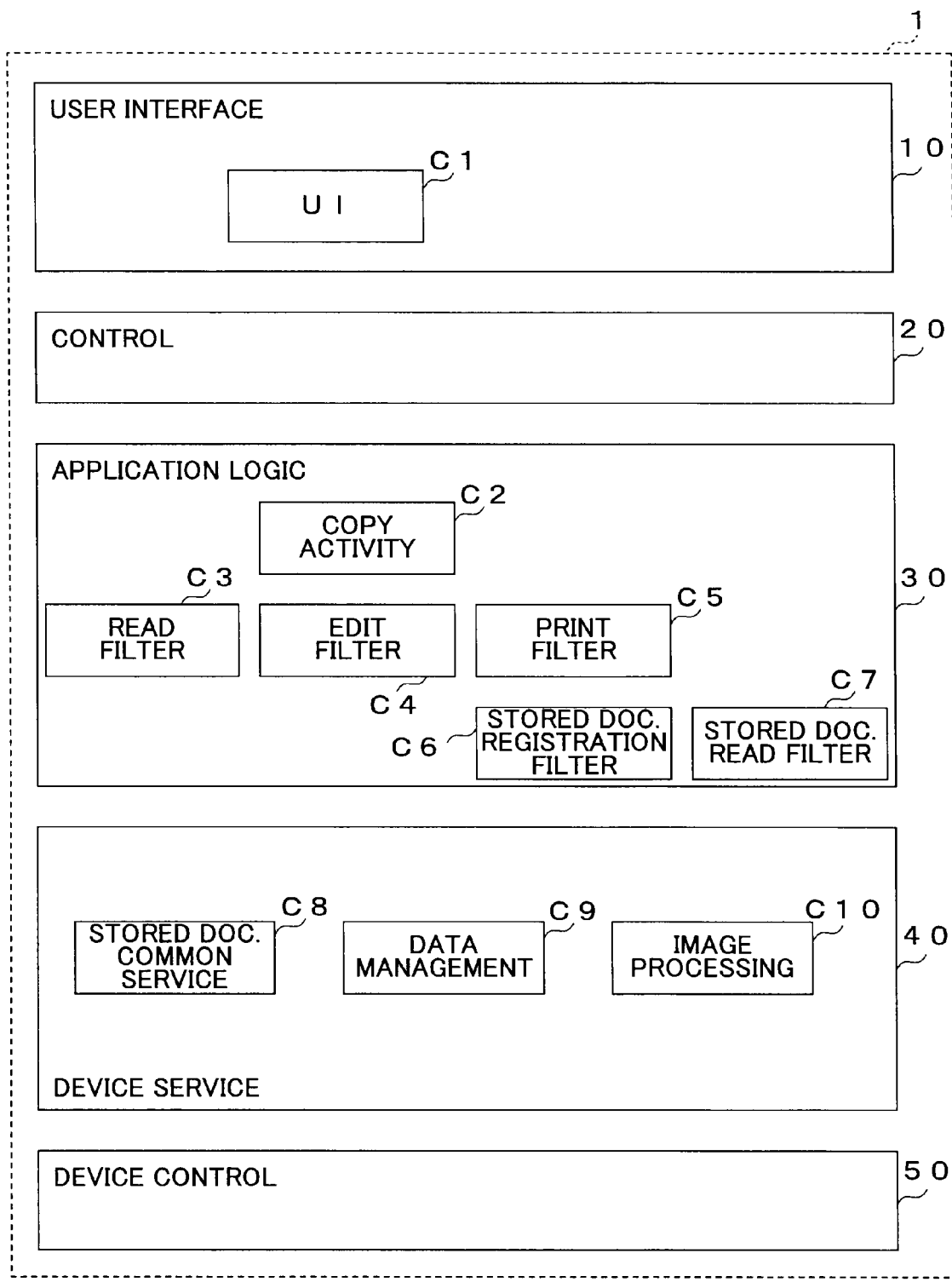
FIG. 16 shows a software structure of a multifunction peripheral according to a second embodiment of the invention.

FIG. 16 shows a software structure of the multifunction peripheral 1 according to the second embodiment.

In FIG. 16, a user interface layer 10 includes a UI C1 which is a component that provides a user interface. An application logic layer 30 includes a copy activity C2 that is a component providing a function for a copy and store process (which may be referred to as "stored copy"); a read filter C3 which is a component providing a function of reading a manuscript using a scanner; an edit filter C4 which is a component providing a function of editing an image that has been read; a print filter C5 which is a component providing a function of printing an image that has been read; a stored document registration filter C6 which is a component providing a function of storing an image that has been read; and a stored document read filter C7 which is a component providing a function of reading a stored document. A device service layer 40 includes a stored document common service C8 which is a component providing a function of storing and reading a document; a data management C9 which is a component providing a function of saving and reading data to and from a database; and an image processing C10 which is a component providing a function of processing an image.

Figure 17A:
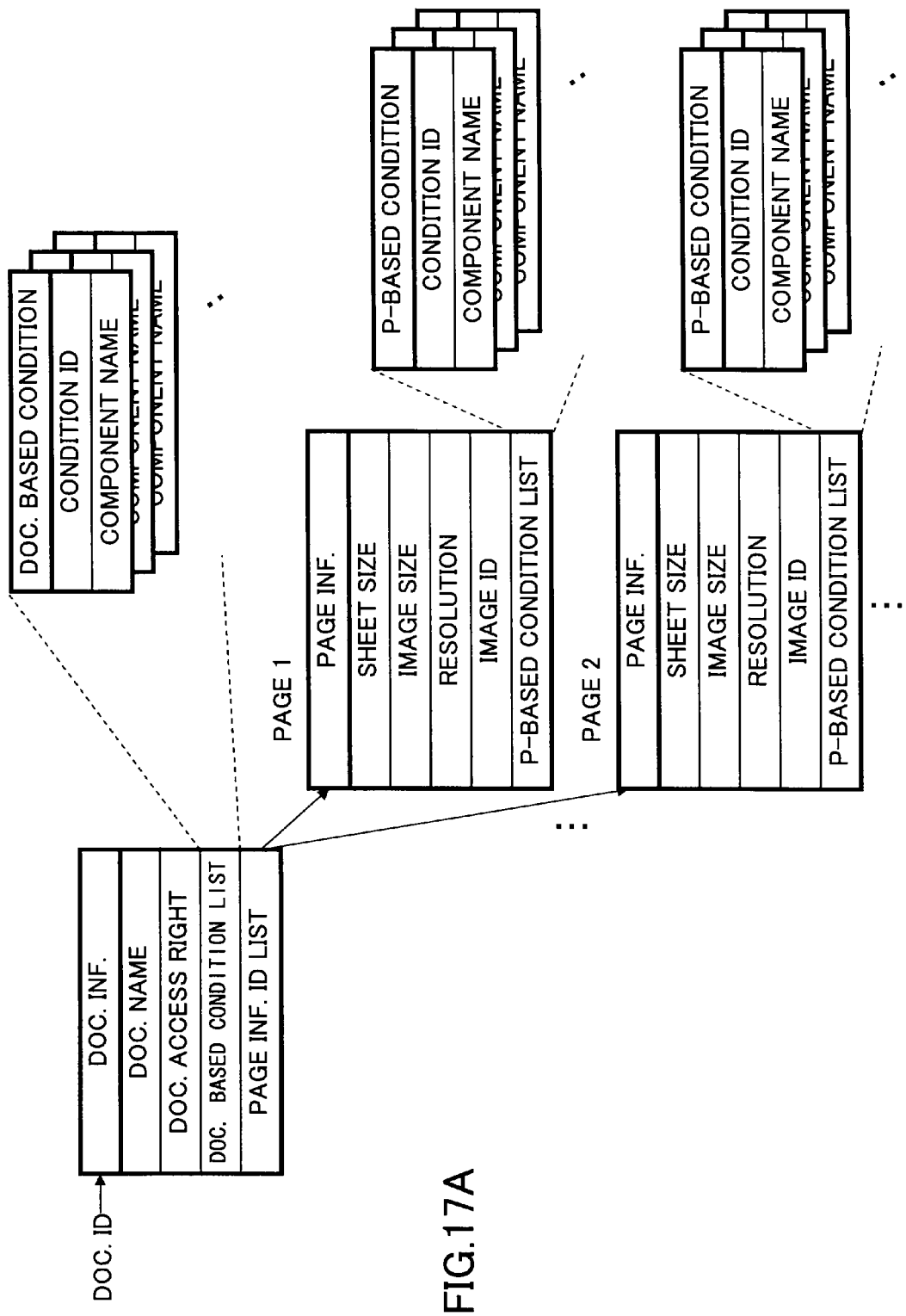
FIG. 17A shows an example of data structure.
Figure 17B:
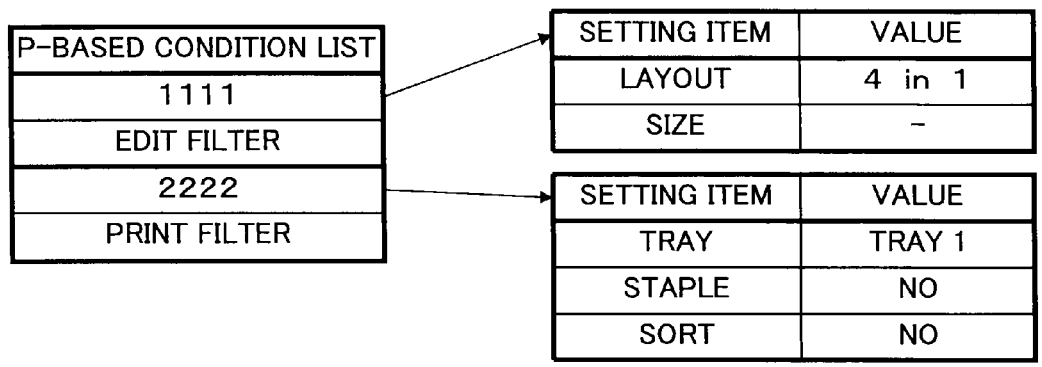
FIG. 17B shows another example of data structure.
Figure 17C:
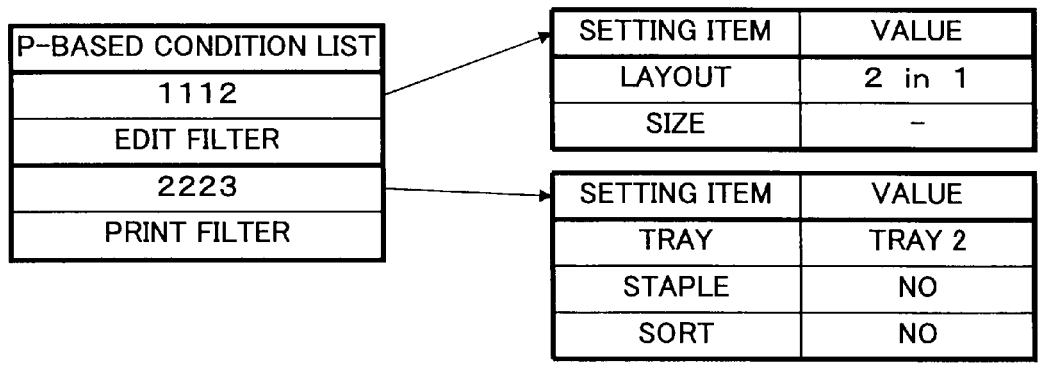
FIG. 17C shows another example of data structure.

FIGS. 17A through 17C show examples of structures of data handled in the components. As shown in FIG. 17A, document information identified by a document ID includes a document name, a document access right, a document-based condition list, and a page information ID list. The document-based condition list includes one or more document-based conditions. Each document-based condition has a condition ID and a component name.

Page information about each page identified by a page information ID included in the page information ID list includes a sheet size, an image size, resolution, an image identifier, and a page-based condition list. The page-based condition list includes one or more page-based conditions. Each page-based condition includes a condition ID and a component name.

FIGS. 17B and 17C show examples of the page-based condition list, showing the page-based conditions successively. In FIG. 17B, an edit condition identified by a condition ID "1111" paired with the component name "Edit Filter" specifies "Layout Setting: 4 in 1, Size Change:-". A print condition identified by a condition ID "2222" paired with the component name "Print Filter" specifies "Output Tray: Tray 1, Staple: No, Sort: No". The item "Layout Setting: 4 in 1" indicates that four pages are concentrated within one page. In FIG. 17C, an edit condition identified by a condition ID "1112" paired with the component name "Edit Filter" specifies "Layout Setting: 2 in 1, Size Change:-". A print condition identified by a condition ID "2223" paired with the component name "Print Filter" specifies "Output Tray: Tray 2, Staple: No, Sort: No". The document-based condition list, of which specific examples are omitted, is similar to these page-based condition lists.

Figure 18A:
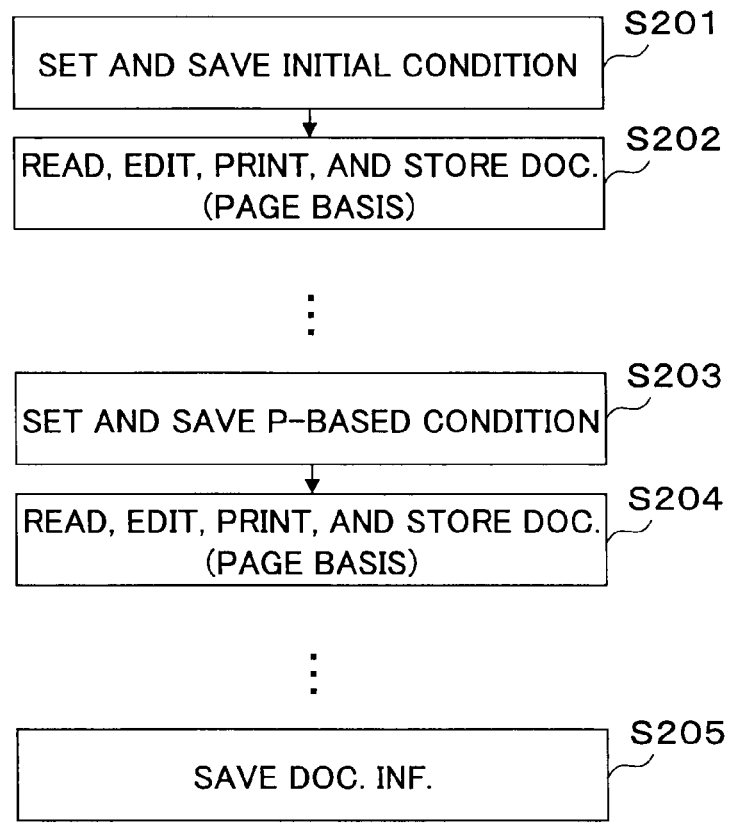
FIG. 18A shows a flowchart of a general sequence of a process performed by the multifunction peripheral according to the second embodiment.
Figure 18B:
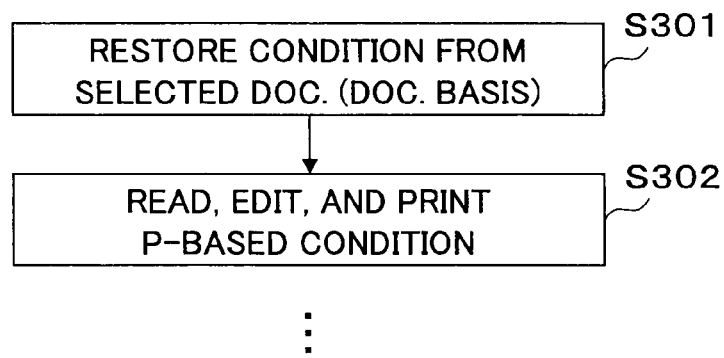
FIG. 18B shows a flowchart of a general sequence of another process performed by the multifunction peripheral of the second embodiment.

FIGS. 18A and 18B show flowcharts each illustrating an outline of an overall process of the present embodiment. The processes performed by the present embodiment can be roughly categorized into a copy and store process whereby a document is edited or printed while it is stored based on multiple outputs, and a stored document print process whereby a stored document is read and then edited or printed.

In the copy and store process, as shown in FIG. 17A, after initial conditions are set (by a user) and saved (step S201), a document is read, edited, printed, and stored on a page by page basis (step S202) for as long as the number of the pages unless the condition is changed. In this storage of the document on a page by page basis, page information including the page-based condition list is simultaneously saved.

Thereafter, upon setting and storage of a page-based condition in a job paused status (step S203), the document is read, edited, printed, and stored on a page by page basis (step S204) as long as the number of the pages, unless the condition is changed. Such a setting and storage of a page-based condition in the job paused status may occur several times thereafter (step S203), which is followed by the reading, editing, printing, and storage of the document on a page by page basis (step S204).

Figure 19C:
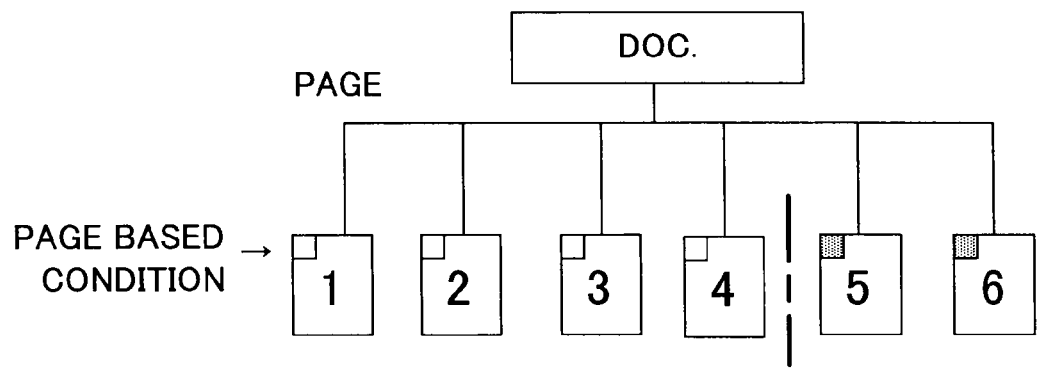
FIG. 19C shows a diagram illustrating how a page-based condition is attached to each page of a document.

FIGS. 19A through 19C show examples of condition setting timings in the copy and storage process. As shown in FIG. 19A, a condition #1 is set at the start of a job, and a condition #2 is set in a job paused status after the completion of page 4 and prior to the start of page 5. In this case, condition #1 is applied from page 1 to page 4, and then condition #2 is applied in page 5 and thereafter. FIG. 19B shows examples of the content of the conditions. Condition #1 indicates "Layout: 4 in 1" for editing, and "Output Tray: Tray 1" for printing. Condition #2 indicates "Layout: 2 in 1" for editing and "Output Tray: Tray 2" for printing. FIG. 19C schematically shows a page-based condition associated with each page. The same page-based condition is attached from page 1 to page 4, and a different page-based condition is allocated to page 5 and thereafter.

Referring back to FIG. 18, upon completion of the process for all of the pages, the document information is saved (step S205). The document information that is saved includes the document-based condition list.

On the other hand, in the case of the stored document print process, as shown in FIG. 18B, conditions are restored from a document selected by the user (step S301). Thereafter, reading of the page-based conditions, and editing and printing are continued as long as the number of the pages (step S302). The page-based condition that is read is supplied to the subsequent filter via a pipe based on the pipe and filter concept. This is because the same flow of the process of setting the conditions by the user on the operation panel can be realized because the difference is merely whether a trigger is produced via the UI or via pipes based on the pipe and filter concept.

Each filter performs a process in accordance with the following rules:

Each filter, when its own condition is set in the page data supplied via the pipe, continues the process with the existing condition when the condition attached to the page is the same as that attached to the previous page.

When the condition attached to the page differs from the condition attached to the previous page, the filter, determining that the user has changed the condition, performs a process for the changed condition.

When pages are concentrated or a page is divided by a layout change, the filter attaches the conditions of the source pages.

When a layout change is made, if there is a pattern that integrates pages with different conditions, an incomplete page should follow specifications for normal output (i.e., not for reutilization), such as making the page blank.

Figure 20B:
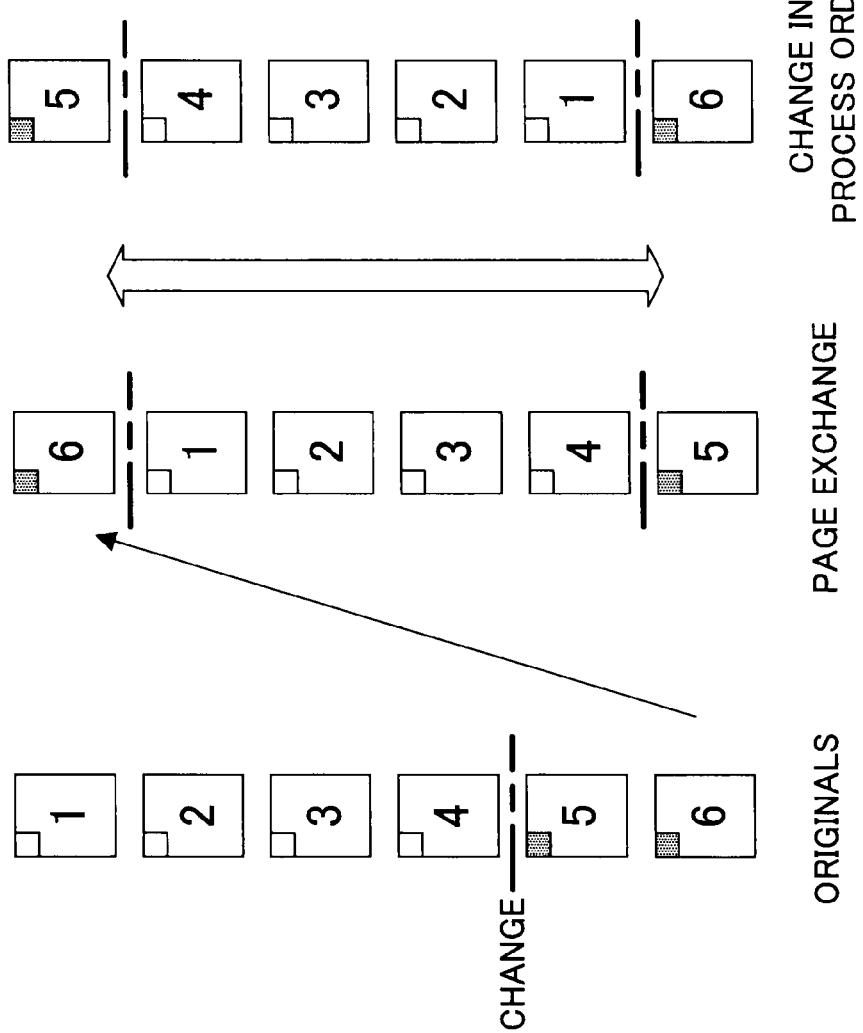
FIG. 20B illustrates how the page-based conditions are read when the pages are exchanged or the sequence of the process is changed.

FIGS. 20A and 20B show examples of reading conditions in the stored document read process. The content of the conditions corresponds to that shown in FIG. 19B. In FIG. 20A, basically, it is determined whether a condition is changed on a page by page basis, and if so, the process is modified from the page where the change is made. Namely, from pages 1 to 4, where the same page-based condition, i.e., condition #1, is allocated, condition #1 is followed. Thus, the four pages are concentrated within one page by editing in accordance with the edit condition "Layout: 4 in 1", and the integrated page is printed and ejected into a tray 1 in accordance with the print condition "Output Tray: Tray 1". In page 5 and thereafter, where the condition is changed, condition #2 is followed, whereby the two pages are edited into a single page in accordance with the edit condition "Layout: 2 in 1", and the edited page is printed and ejected into a tray 2 in accordance with the print condition "Output Tray: Tray 2".

FIG. 20B shows a case where the pages are exchanged or the order of the process sequence is changed. The original document sequence is page 1→page 2→page 3→page 4→page 5→page 6, and a condition change point is located between pages 4 and 5. When page 6 is moved before page 1, the condition change point is now at two locations, i.e., one between pages 6 and 1 and the other between pages 4 and 5. In this case, too, the process is basically the same; namely, it is determined whether the condition is changed on a page by page basis and, if the condition is changed, the process is modified from the point of change.

When the order of the process is reversed to page 5→page 4→page 3→page 2→page 1→page 6, the condition change point is present at the two locations, one between pages 5 and 4 and the other between pages 1 and 6. In this case, too, the process is basically the same; i.e., it is determined whether the condition is changed on a page by page basis, and if it is, the process is modified from the point of change.

FIG. 21 shows a sequence diagram of a process of setting and saving initial conditions in the copy and storage process (corresponding to step S201 of FIG. 18A).

In FIG. 21, in response to an operation performed by a user on the operation panel, the UI C1 sets a read condition with regard to the read filter C3 (steps S221, S222). The UI C1 sets an edit condition with regard to the edit filter C4 (steps S223, S224). The UI C1 sets a print condition with regard to the print filter C5 (steps S225, S226). The UI C1 sets a storage condition with regard to the stored document registration filter C6 (steps S227, S228).

Then, in response to an operation by the user on the operation panel, the UI C1 sends a job start request to the copy activity C2 (step S229). The copy activity C2 sends a condition save request to the edit filter C4 (step S230). The edit filter C4 sends an edit condition data storage request to the data management C9 (step S231), and acquires from the data management C9 a condition ID identifying the stored data (step S232). The edit filter C4 returns the condition ID to the copy activity C2 (step S233).

Similarly, the copy activity C2 sends a condition save request to the print filter C5 (step S234). The print filter C5 sends a print condition storage request to the data management C9 (step S235), and acquires from the data management C9 a condition ID identifying the stored data (step S236) The print filter C5 then returns the condition ID to the copy activity C2 (step S237).

The read condition in the read filter C3 and the storage condition in the stored document registration filter C6 are not saved because they need not be reproduced when printing the stored document.

The copy activity C2 then sets a condition in the document-based condition list with regard to the stored document registration filter C6 (steps S238, S239). At this point in time, the stored document registration filter C6 does not save the document-based condition list; the document-based condition list is stored as part of the document information at the time of saving the document information (in step S205 in FIG. 18A) upon completion of the process for the entire pages.

FIG. 22 shows a sequence diagram of a process of reading, editing, and storing a document in the copy and storage process (step S202 and part of S204 in FIG. 18A), and a process of saving document information (step S205 of FIG. 18). The print process is omitted.

In FIG. 22, upon start of a read process (step S241), the read filter C3 generates page data (step S242), and sets the image information that the read filter C3 has read in the page data (steps S243, S244). The read filter C3 then notifies the edit filter C4 about the writing of data in the page data (step S245). These processes are performed via pipes.

The edit filter C4 acquires the image data from the page data (steps S246, S247), starts an edit process (step S248), generates page data (step S249), sets the edited image information in the page data (step S250), and notifies the stored document registration filter C6 about the writing of data in the page data (step S251). These processes are performed via pipes.

The stored document registration filter C6 acquires the image data from the page data (steps S252, S253), starts a storing process (step S254), and sends an image persisting request to the image processing C10, together with the image data and an image identifier (steps S255, S256). The stored document registration filter C6 also sends a page information persisting request, together with the page image, the image identifier, and the page-based condition list, to the stored document common service C8 (step S257). The stored document common service C8 delivers the persistence data to the data management C9 and requests that the data be persisted (step S258), acquires a data ID identifying the saved data from the data management C9 (step S259), and returns the page information ID to the stored document registration filter C6 (step S260). The page-by-page process ends here, and a similar process is performed for each page.

Upon completion of reading or editing of the final page, the following process is performed. The stored document registration filter C6 sends a document information persisting request to the stored document common service C8, together with the document information, the page information ID, and the document-based condition list (step S261). The stored document common service C8 delivers the persistence data to the data management C9 and requests that the data be persisted (step S262), acquires a data ID identifying the saved data from the data management C9 (step S263), and returns the document information ID to the stored document registration filter C6 (step S264).

Figure 23:
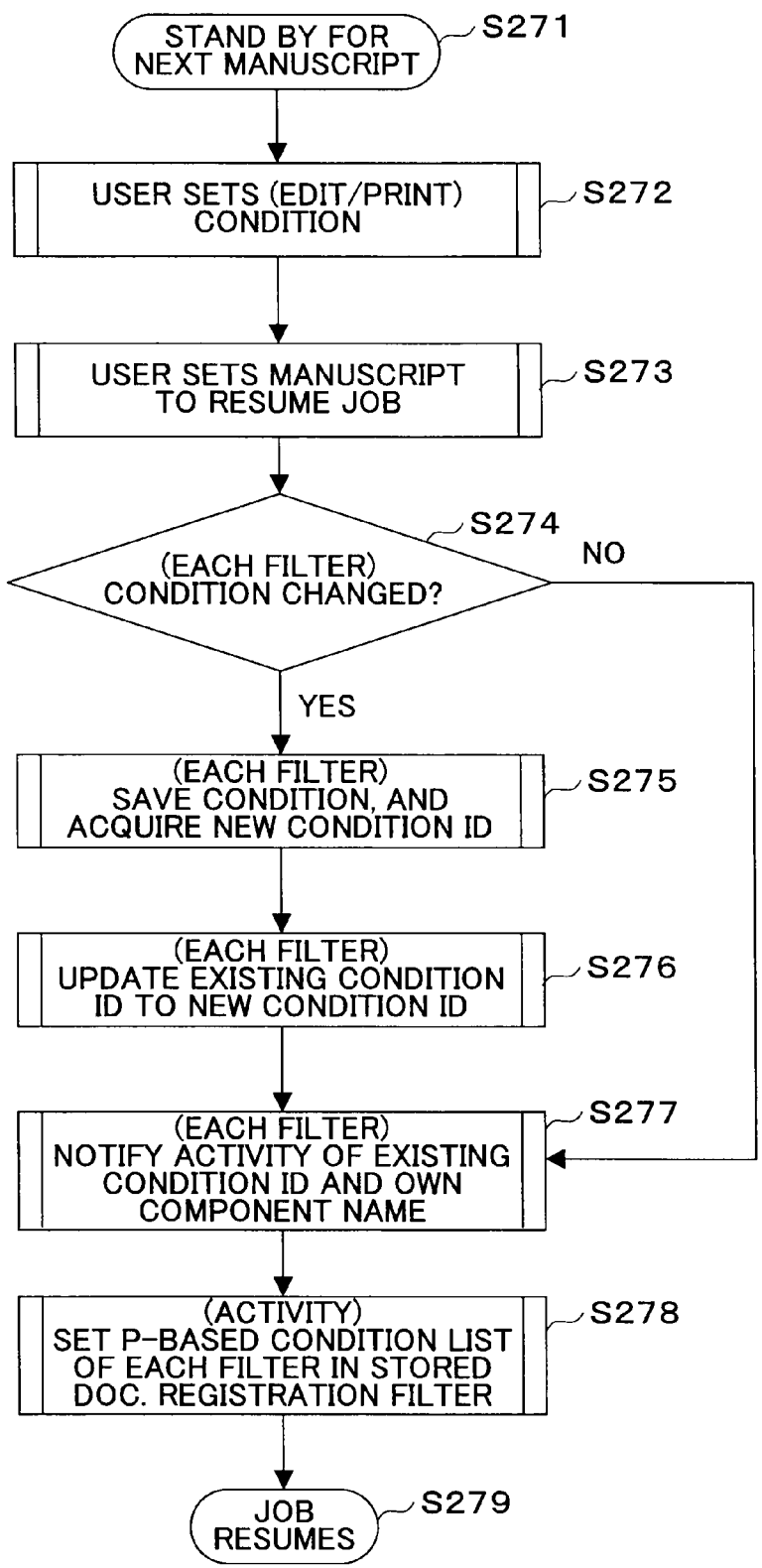
FIG. 23 shows a flowchart of the process of setting and saving page-based conditions in the copy and storage process.

FIG. 23 shows a flowchart of a process of setting and saving a page-based condition in the copy and storage process (step S203 of FIG. 18A).

In FIG. 23, when the job is paused to wait for the next manuscript (step S271), the user sets a condition (edit condition/print condition) (step S272). As the user resumes the job by setting the manuscript (step S273), each filter (edit filter C4, print filter C5) determines whether the condition is changed (step S274).

When the condition is changed ("YES" in step S274), each filter saves the condition and acquires a new condition ID (step S275), and updates the older condition ID to the new condition ID (step S276). When the condition is not changed ("NO" in step S274), these steps are not performed.

Then, each filter notifies the copy activity C2 of the condition ID that the filter retains and the filter's component name (step S277). The copy activity C2 sets the page-based condition list of each filter in the stored document registration filter C6 (step S278). Thereafter, the job is resumed (step S279).

Figure 24:
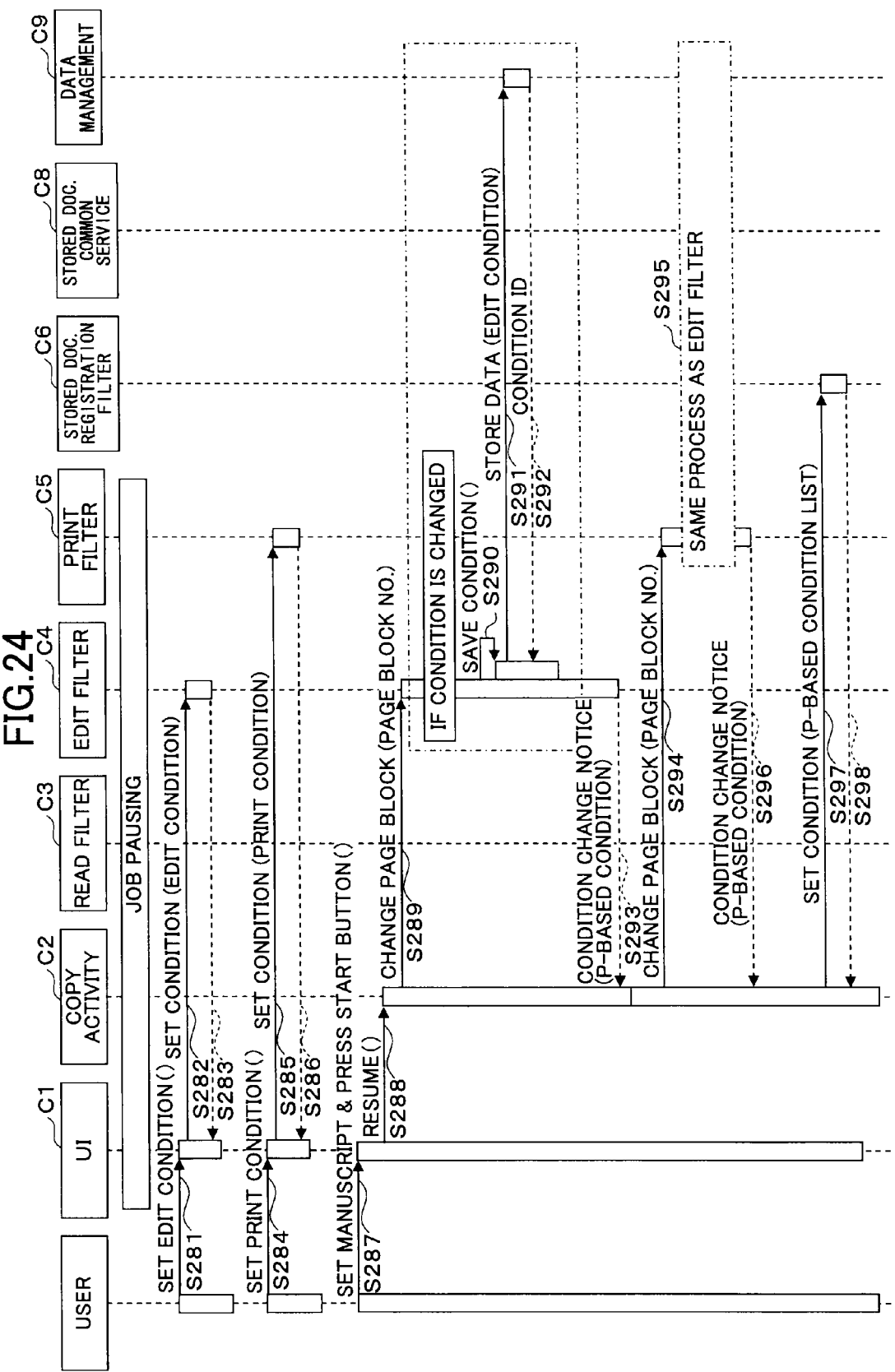
FIG. 24 shows a sequence diagram of a process of setting and saving a page-based condition in the copy and storage process.

FIG. 24 shows a sequence diagram of a process of setting and saving a page-based condition in the copy and storage process (step S203 in FIG. 18A).

In FIG. 24, when the job is paused to wait for the next manuscript, as the user sets an edit condition on the UI C1 (step S281), the UI C1 sets the edit condition with regard to the edit filter C4 (steps S282, S283).

Similarly, as the user sets a print condition on the UI C1 (step S284), the UI C1 sets the print condition with regard to the print filter C5 (steps S285, S286).

Then, the user sets a manuscript and presses the start button on the UI C1 (step S287), whereby the UI C1 sends a job resume request to the copy activity C2 (step S288). In the case of a semi-automatic document feed (SADF) mode, the job is automatically resumed upon setting of the manuscript on an automatic document feeder (ADF) without pressing the start button.

The copy activity C2 notifies the edit filter C4 about the change in page block, notifying it of a page block number (step S289). The edit filter C4, when the condition is changed, starts saving the condition (step S290), and sends an edit condition data storage request to the data management C9 (step S291). The edit filter C4 acquires a condition ID identifying the stored data from the data management C9 (step S292), and sends a condition change notice to the copy activity C2, together with the page-based condition (step S293).

Similarly, the copy activity C2 notifies the print filter C5 of the change in page block and the page block number (step S294). The print filter C5 performs the same process (steps S290 to S292) as that by the edit filter C4 (step S295), and sends a condition change notice to the copy activity C2, together with the page-based condition (step S296).

Thereafter, the copy activity C2 sets the page-based condition lists with regard to the stored document registration filter C6 (steps S297, S298). The stored document registration filter C6, at this point in time, does not save the page-based condition list; the page-based condition list is saved at the time of the aforementioned page-based storage (step S204 in FIG. 18A).

Figure 25:
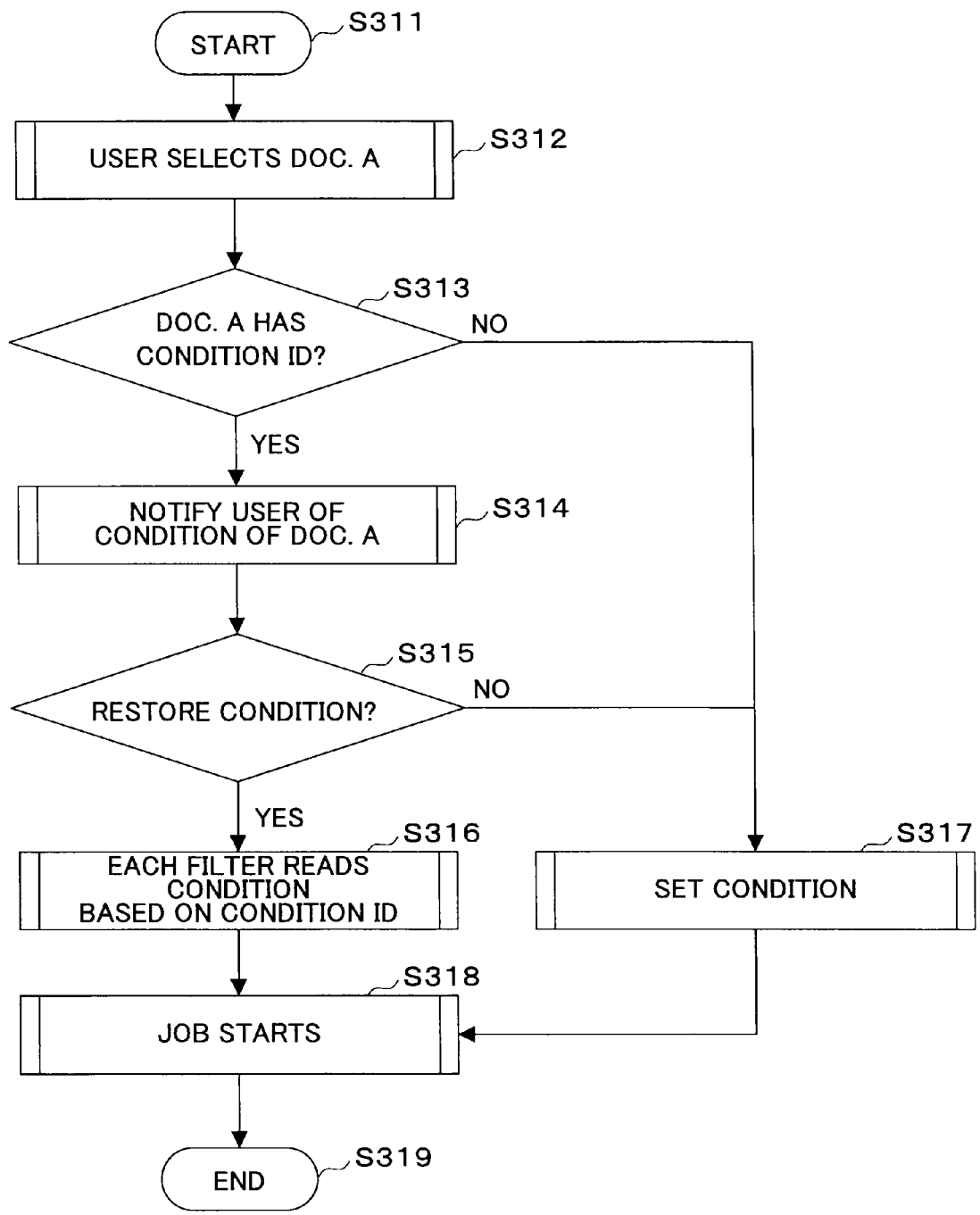
FIG. 25 shows a flowchart of the process of restoring a condition from a selected document in the stored document print process.

FIG. 25 shows a flowchart of a process of restoring a condition from a selected document in the stored document print process (step S301 in FIG. 18B).

In FIG. 25, following the start of the stored document print process (step S311), as the user selects a document A (step S312), the UI C1 determines whether a condition ID is associated with the document A (step S313). In the case of the aforementioned copy and storage process, a condition ID is associated with the document; however, when the document is just stored without being copied, no condition ID is associated with the document, so that the condition cannot be restored.

When a condition ID is associated with the document A ("YES" in step S313), the UI C1 notifies the user that the condition ID is associated with the document A (step S314), and determines whether or not to restore the condition based on a selection operation by the user (step S315).

When restoration of the condition is selected ("YES" in step S315), each filter (edit filter C4, print filter C5) reads the condition based on the condition ID, and restores it (step S316).

When no condition ID is associated with the document A ("NO" in step S313), or when restoration of the condition is not selected ("NO" in step S315), a condition is set depending on an operation by the user (step S317).

Thereafter, a job is started (step S318), and the process ends (step S319).

Figure 26:
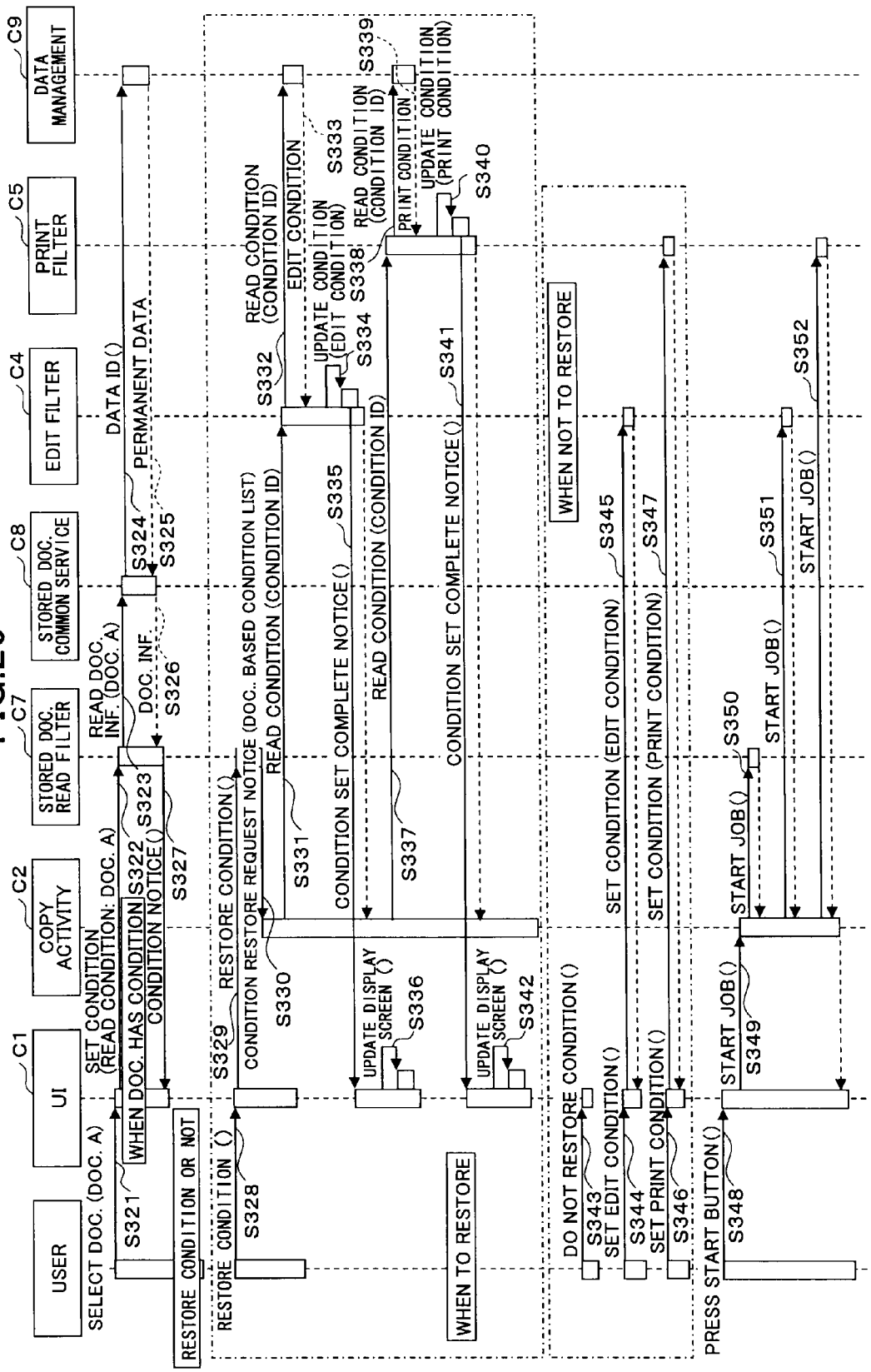
FIG. 26 shows a sequence diagram of the process of restoring a condition from a selected document in the stored document print process.

FIG. 26 shows a sequence diagram of a process of restoring a condition from a selected document in the stored document read process (step S301 of FIG. 18B).

In FIG. 26, when printing the stored document, a user selects a desired document A via the UI C1 (step S321). FIG. 27A shows an example of a screen showing a list of documents, where document A is selected and an OK button is pressed.

Referring back to FIG. 26, the UI C1 sets the document A as a read condition with regard to the stored document read filter C7 (step S322). The stored document read filter C7 sends a request to the stored document common service C8 to read document information about the document A (step S323). The stored document common service C8 reads persistent data from the data management C9 (steps S324, S325), and returns the document information to the stored document read filter C7 (step S326). The stored document read filter C7, when a condition is associated with the document, notifies the UI C1 that there is a condition (step S327), and prompts the user to select whether or not to restore the condition associated with the document. FIG. 27B shows an example of a screen prompting the user to select whether or not to restore the condition. When the condition is to be restored, the "Yes" button is pressed; when not, the "No" button is pressed.

Referring back to FIG. 26, when the condition is restored, the user enters a condition restoration request into the UI C1 (step S328). The UI C1 sends a condition restoration request to the stored document read filter C7 (step S329). The stored document read filter C7 sends a condition restoration request to the copy activity C2, together with the document-based condition list (step S330).

The copy activity C2 sends a condition read request to the edit filter C4, together with the condition ID (step S331). The edit filter C4 acquires an edit condition from the data management C9 based on the condition ID (steps S332, S333), updates the condition based on the edit condition it has read (step S334), and notifies the UI C1 of completion of the condition setting process (step S335). In response, the UI C1 updates the display screen (step S336).

Figure 27C:
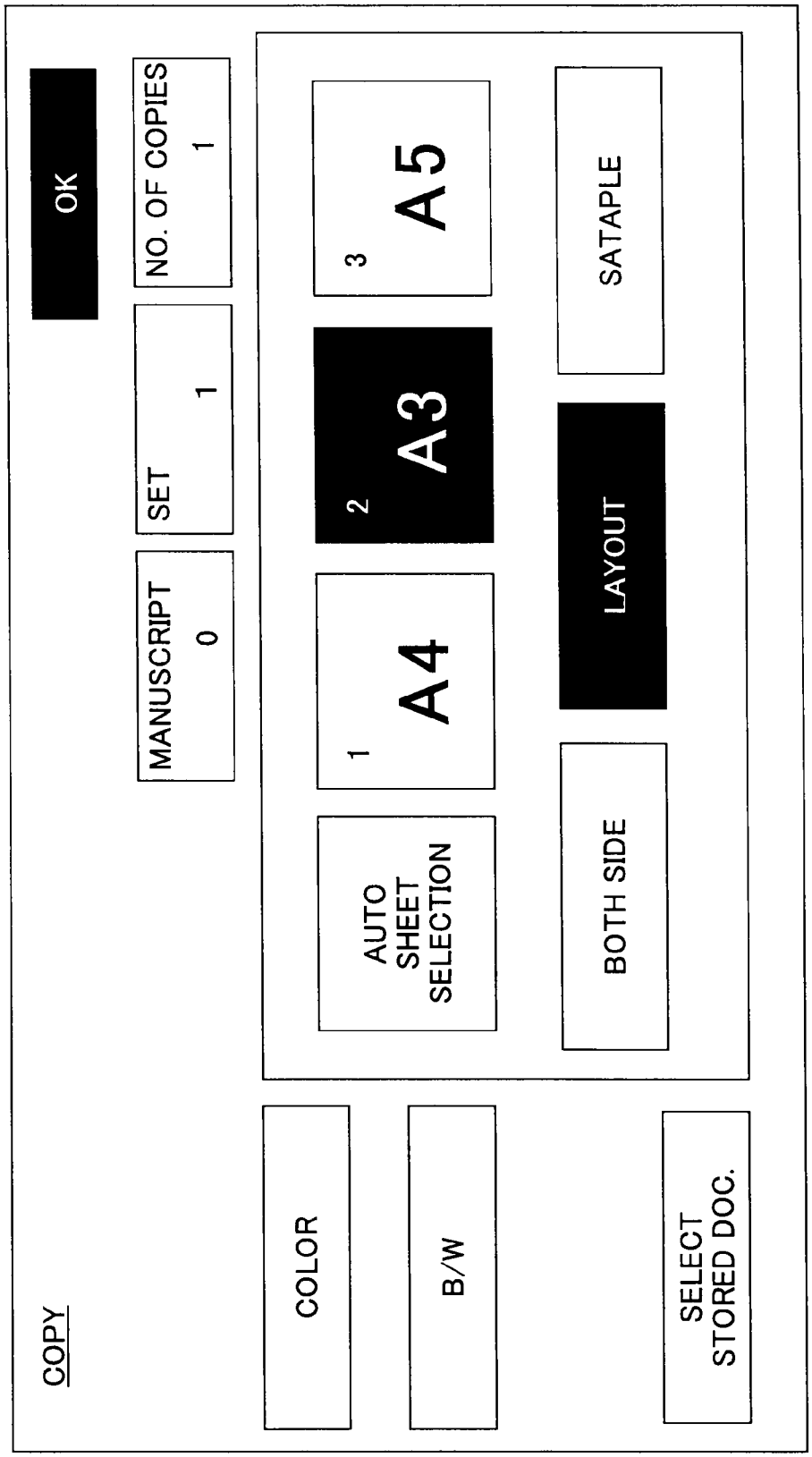
FIG. 27 shows an example of a screen.

Similarly, the copy activity C2 sends a condition read request to the print filter C5, together with the condition ID (step S337). The print filter C5 acquires a print condition from the data management C9 based on the condition ID (steps S338, S339), updates the condition based on the print condition that it has read (step S340), and notifies the UI C1 of completion of the condition setting process (step S341). In response, the UI C1 updates the display screen (step S342). FIG. 27C shows an example of a setting screen showing the restored condition, where "A3" is already selected as the sheet, and "Layout" is already selected as the edit content.

Referring back to FIG. 26, when the condition is not to be restored, the user enters a request into the UI C1 that the condition not be restored (step S343). The user then sets an edit condition with regard to the UI C1 (step S344). The UI C1 sets the edit condition in the edit filter C4 (step S345). Similarly, the user sets a print condition on the UI C1 (step S346), and the UI C1 sets the print condition with regard to the print filter C5 (step S347).

Thereafter, as the user presses the start button on the UI C1 (step S348), the UI C1 sends a request to the copy activity C2 to start a job (step S349). The copy activity C2 sends a request to the stored document read filter C7, the edit filter C4, and the print filter C5 to start the job (steps S350 to S352).

FIG. 28 shows a flowchart of a process of reading a page-based condition in the stored document print process (part of step S302 in FIG. 18B).

In FIG. 28, as the process starts (step S361), the stored document read filter C7 reads page information to generate page data (step S362). When a condition already made by a user is to be restored (step S363), the stored document read filter C7 sets a condition ID list in the page data (step S364). When the condition is not to be restored ("NO" in step S363), this process is not performed.

The stored document read filter C7 then writes the page data (step S365).

The edit filter C4 then acquires the condition ID from the page data (step S366), and determines whether its own condition ID is included (step S367). When its own condition ID is present ("YES" in step S367), the edit filter C4 further determines whether the condition ID differs from the condition ID of the previous page (step S368). If the condition ID differs from that of the previous page ("YES" in step S368), the edit filter C4 reads the condition based on the condition ID (step S369). If its own condition ID is not present ("NO" in step S367), or if the condition ID is the same as that of the previous page ("NO" in step S368), this process is not performed.

Thereafter, the edit filter C4 performs an edit process, sets a condition ID list in the page data, and writes the data (step S370), whereby the process ends (step S371).

A similar process is also performed with regard to the print filter C5, with the exception that the condition ID is acquired not from the page data generated by the stored document read filter C7 but from the page data generated by the edit filter C4, followed by the reading of the condition.

Figure 29:
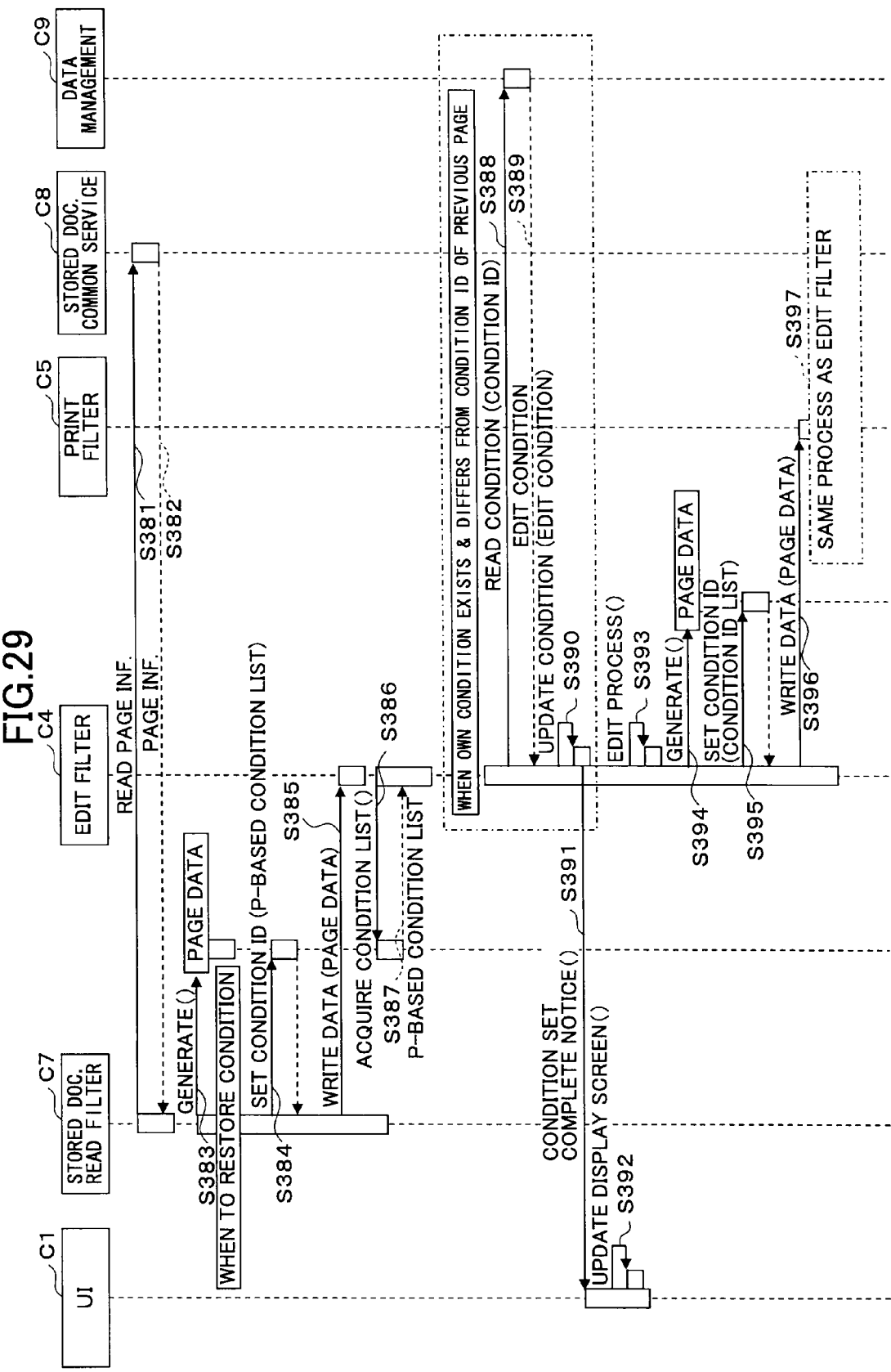
FIG. 29 shows a sequence diagram of a process of reading and editing a page-based condition in the stored document print process.

FIG. 29 shows a sequence diagram of the process of reading and editing a page-based condition in the stored document print process (part of step S302 in FIG. 18B).

In FIG. 29, the stored document read filter C7 sends a page information read request to the stored document common service C8, together with a page ID (step S381), and acquires page information from the stored document common service C8 (step S382). The stored document read filter C7 then generates page data (step S383) and, when a condition is to be restored, sets a page-based condition list in the page data (step S384), and notifies the edit filter C4 about the writing of data in the page data (step S385). These steps are performed via pipes.

Then, the edit filter C4 acquires a page-based condition list from the page data (steps S386, S387). The edit filter C4, if its own condition ID is included and it differs from the condition ID that has been read from the previous page, reads the edit condition from the data management C9 based on the condition ID (steps S388, S389). The edit filter C4 updates the existing condition to the edit condition that has been read (step S390), and notifies the UI C1 of completion of the condition setting process (step S391). In response, the UI C1 updates the display screen (step S392).

The edit filter C4 then performs an edit process based on the updated edit condition (step S393), generates page data (step S394), sets a page-based condition list in the page data (step S395), and notifies the print filter C5 about the writing of data in the page data (step S396).

Thereafter, the print filter C5, if its own condition ID is included and if it differs from the condition ID that has been read from the previous page, performs the same process (steps S388 to S391) as that by the edit filter C4 (step S397).

Figure 30:
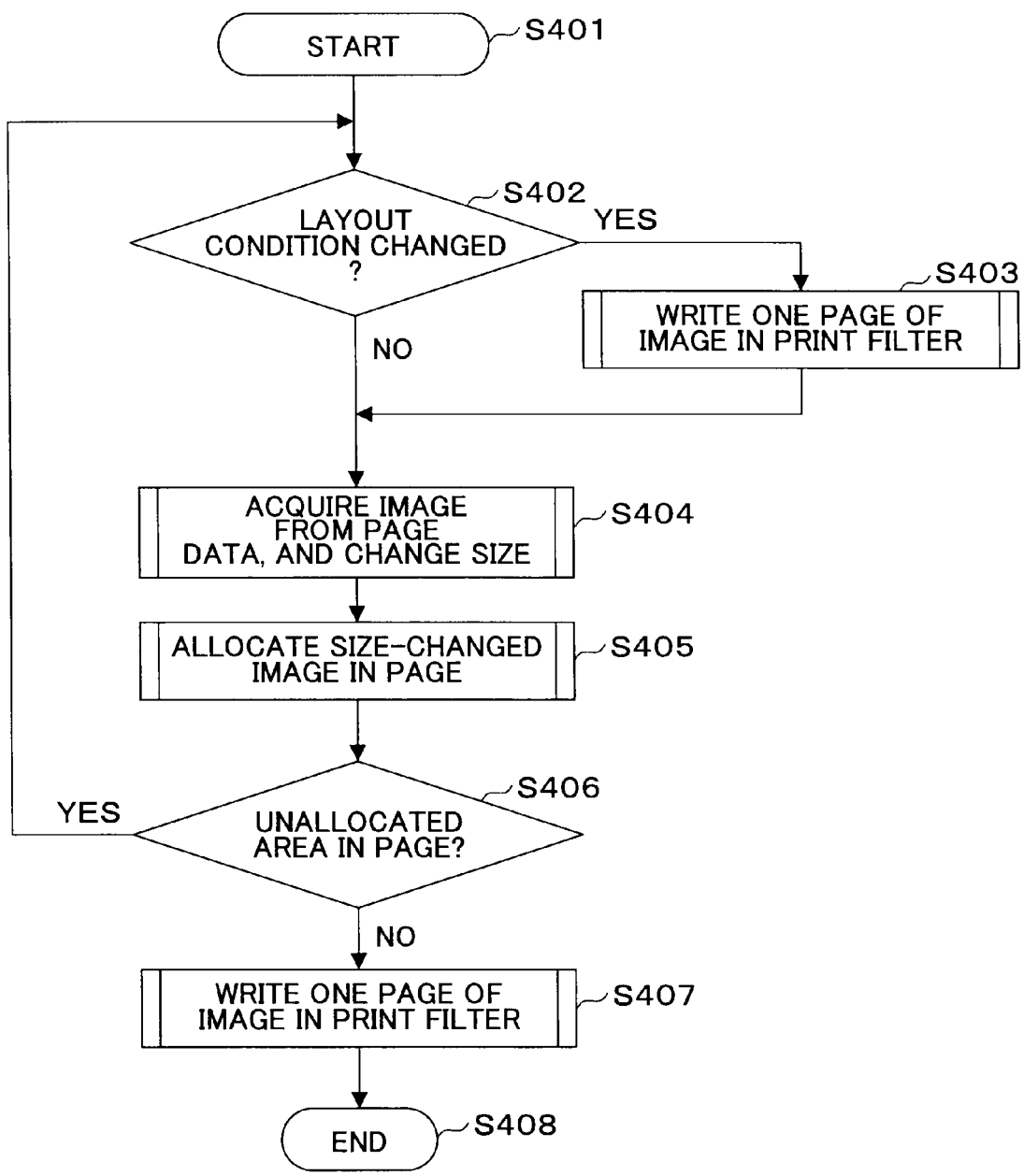
FIG. 30 shows a flowchart of a layout-change process in an edit process.

FIG. 30 shows a flowchart of a layout-change process during editing, corresponding to step S393 in FIG. 29. When a layout setting specifies "4 in 1", if the setting is changed (such as to "2 in 1") when an entire page is not filled with images, the page is outputted while leaving the unfilled areas blank, and images are newly allocated in areas from the page in which the layout change occurred.

In FIG. 30, when the process is started (step S401), the edit filter C4 determines whether the layout condition is changed (step S402). If it is changed ("YES" in step S402), the edit filter C4 writes the image on page 1 in the print filter C5 (step S403). If the layout condition is not changed ("NO" in step S402), this process is not performed.

Thereafter, the edit filter C4 acquires the image from the page data and changes its size to a certain layout size (step S404), and then allocates the size-changed image in the page (step S405). It is then determined whether there is an un-allocated area in the page (step S406). If there is ("YES" in step S406), the sequence goes onto the step of determining a change in the layout condition (step S402). If there is no un-allocated area ("NO" in step S406), the edit filter C4 writes the image on page 1 in the print filter C5 (step S407), and the process ends (step S408).

Embodiment 3

In the third embodiment, while maintaining the basic concepts of the foregoing second embodiment, the dependency of the filters is minimized with respect to a database in which edit or print conditions (detailed setting items) are saved together with a document itself.

In the second embodiment shown in FIG. 15, because the edit filter and the print filter save edit or print conditions directly in the database, it becomes necessary, when a change is caused in the interface of the database, to modify not only the stored document registration filter, by which the document itself, a document-based condition list, and a page-based condition list are eventually saved in the database, but also the edit filter or the print filter. Thus, there is a strong dependency with respect to the database. In the case of local storage where the database exists within the apparatus, the probability is very low that the interface is changed; however, when a storage on a network is used as the database (network storage), the probability is high that the destination of the saved data is changed to another database of a different structure, for operational reasons. It is not realistic to modify all of the relevant filters each time such a change occurs, or to provide interfaces to handle all possible changes in advance.

Thus, in accordance with the third embodiment, the stored document registration filter alones accesses the database so that dependency on the database can be minimized. At the same time, in order to circumvent dependency between the edit filter or the print filter and the stored document registration filter, the condition data that the edit filter or the print filter delivers to the stored document registration filter is contained in a black box, as it were, using a general-purpose data sequence, such as a Byte sequence that serializes item data, that is not dependent on the data definitions in the filters.

Figure 31:
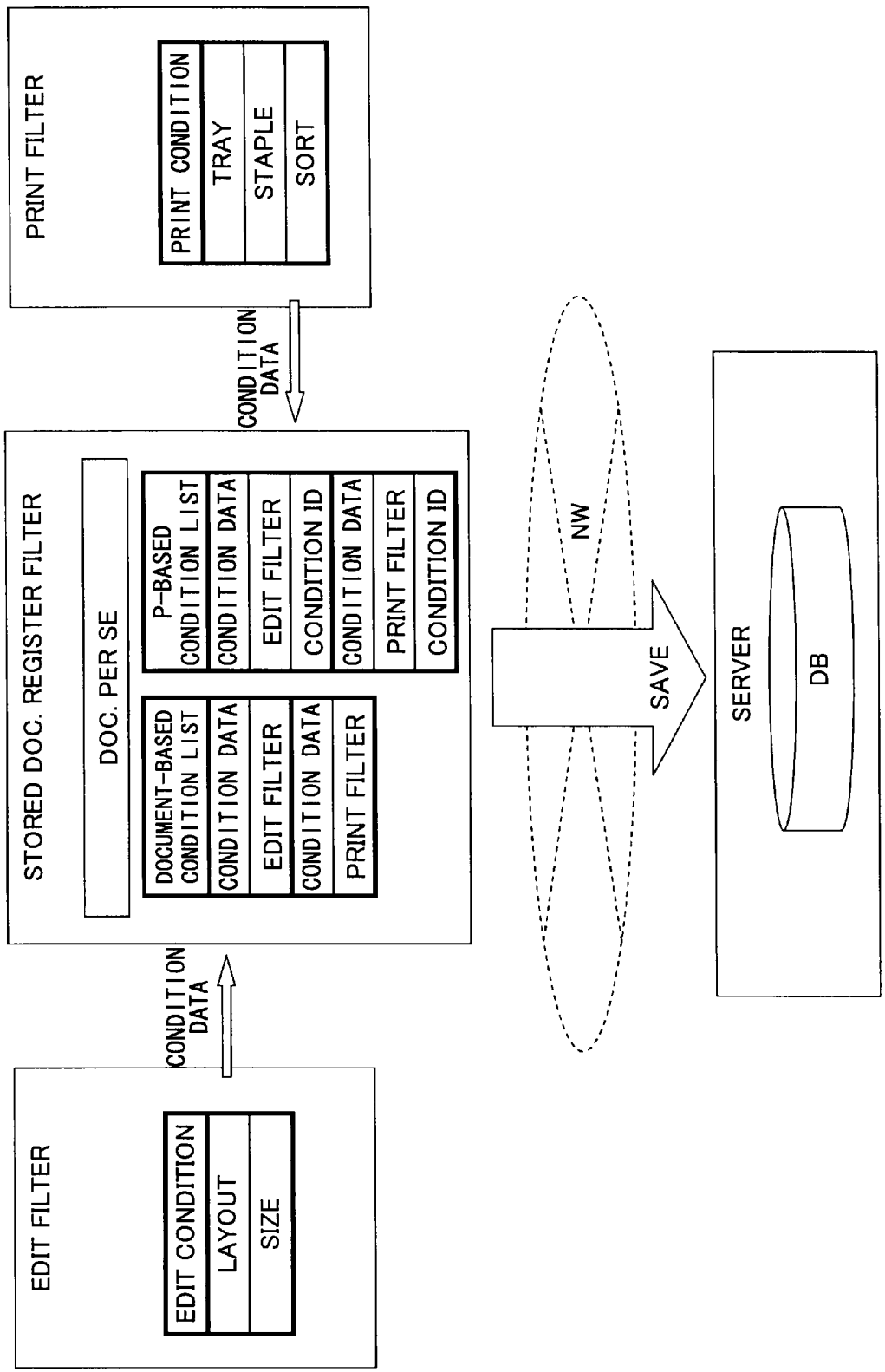
FIG. 31 shows a conceptual diagram of a third embodiment of the present invention.

FIG. 31 shows a diagram illustrating the concept of the third embodiment.

In FIG. 31, the edit filter, at the start of a job when one or more conditions are set, serializes edit condition item data consisting of items concerning a layout setting, size change, and so on, into a Byte sequence of condition data, which the edit filter delivers to the stored document registration filter. The print filter, at the start of a job when one or more conditions are set, serialize print condition item data consisting of items concerning an output tray, staple, sort, etc., into a Byte sequence of condition data, which is delivered to the stored document registration filter. The stored document registration filter then stores the condition data that it has received at the start of the job, a component name "edit filter", and a component name "print filter" in the document-based condition list and in the page-based condition list in the initial page. Each component name is paired with the corresponding condition data so that the component that generated the condition data, which is merely a Byte sequence, can be identified.

The edit filter and the print filter similarly generate condition data when a condition is set in a job paused status after the start of the job, and delivers the condition data to the stored document registration filter. The stored document registration filter stores the condition data, a component name, and a newly assigned condition ID in the page-based condition list for the page that is relevant at this point in time.

The stored document registration filter saves, as needed, the document itself, the document-based condition list, and the page-based condition list in a database (either one on a network or a local storage). The page-based condition list may be saved in the database simultaneously with the storage of the page by page basis document itself. The document-based condition list may be saved in the database upon completion of the process for the entire pages.

Figure 32:
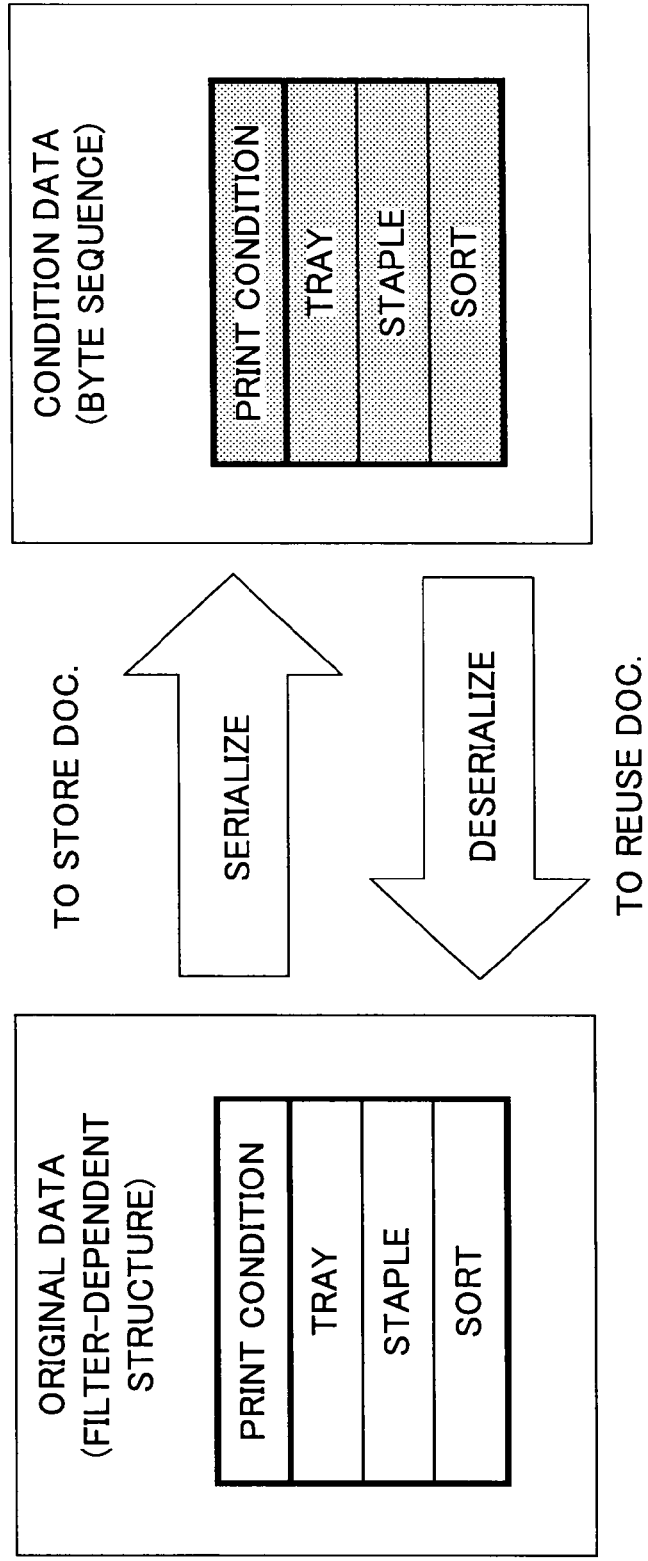
FIG. 32 shows a conceptual diagram illustrating how condition data is generated and restored.

FIG. 32 shows a conceptual diagram illustrating how condition data is generated and restored. A Byte sequence of condition data is generated by serializing items of data from original data about the conditions that depend on the data definition in each filter, at the time of storing the document. The original data about the conditions that depend on the data definition in each filter is restored (deserialized) from the Byte sequence of condition data, at the time of reutilizing the document.

The software structure of the multifunction peripheral 1 according to the third embodiment is similar to that shown in FIG. 16, with the exception of, as described later, the process function concerning the handling of the conditions in the edit filter C4, the print filter C5, the stored document registration filter C6, and the stored document read filter C7.

Figure 33:
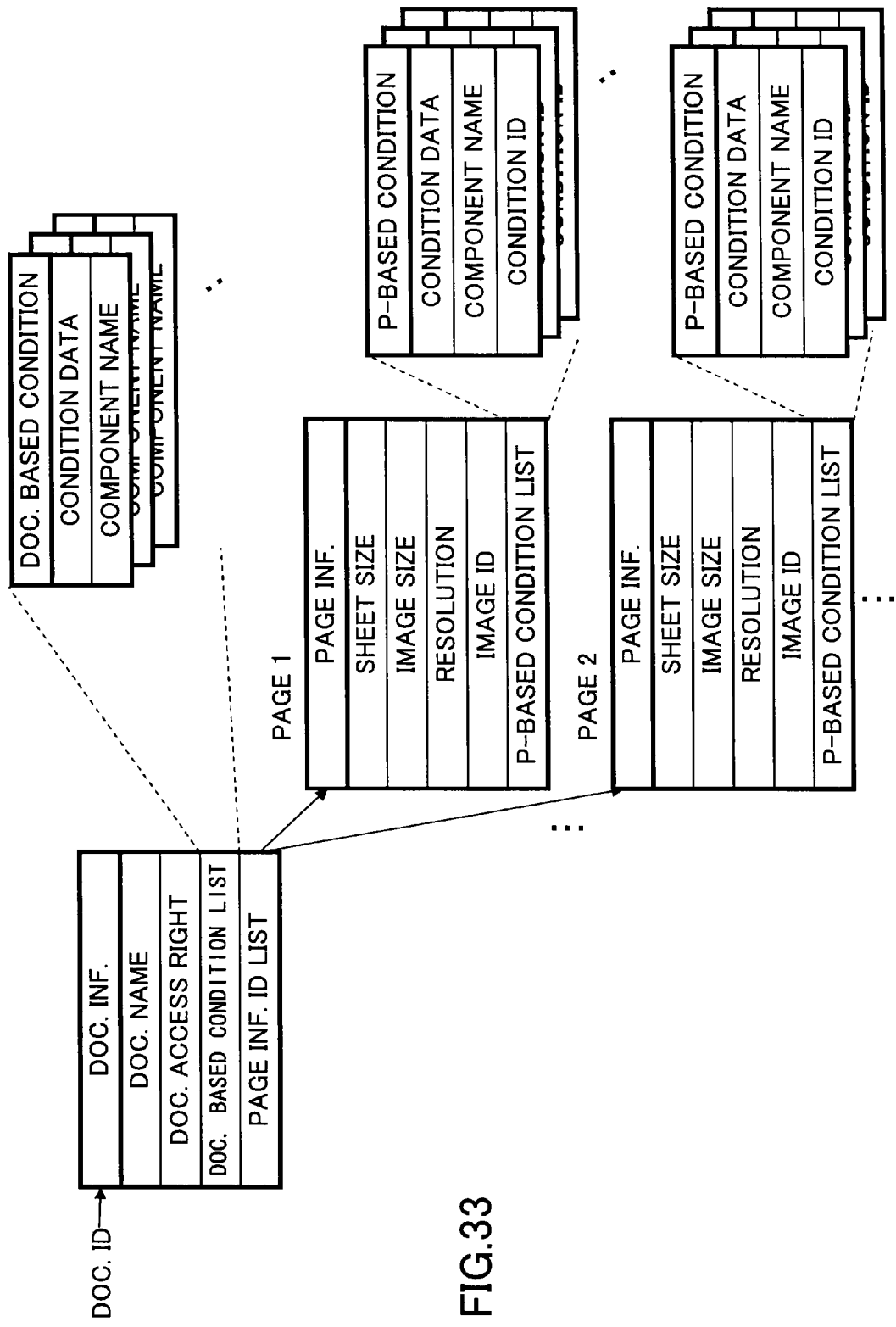
FIG. 33 shows an example of data structure.

FIG. 33 shows a data structure example. Document information identified by a document ID includes a document name, a document access right, a document-based condition list, and a page information ID list. The document-based condition list includes one or more document-based conditions. The document-based condition includes condition data and a component name.

The page information about each page identified by the page information ID contained in the page information ID list includes a sheet size, an image size, a resolution, an image identifier, and a page-based condition list. The page-based condition list includes one or more page-based conditions. The page-based condition includes condition data, a component name, and a condition ID.

In the following, a description is given of an operation of the third embodiment.

The overall process sequence is the same as that of the flowcharts shown in FIGS. 18A and 18B.

Figure 34:
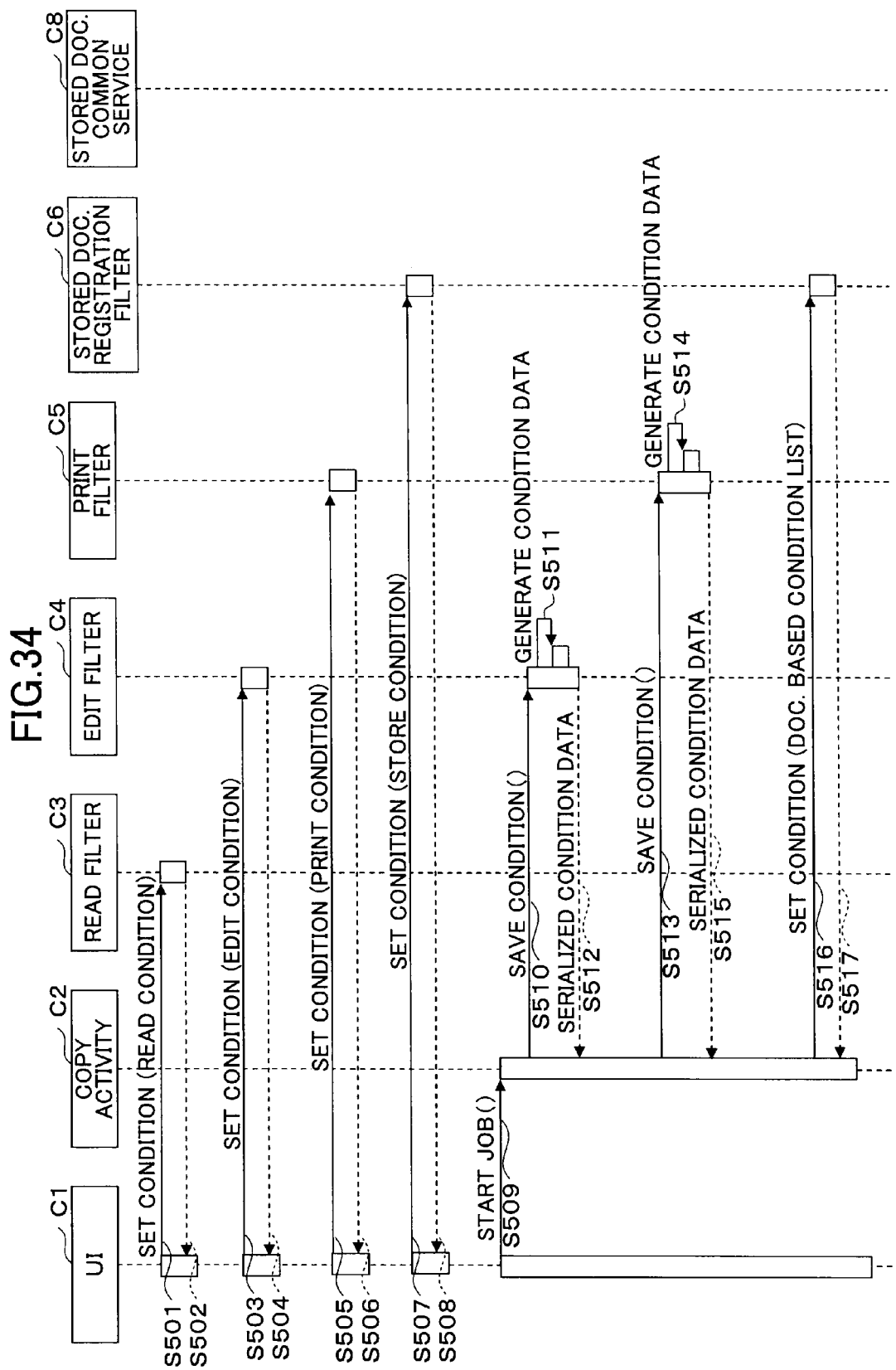
FIG. 34 shows a sequence diagram of a process of setting and saving initial conditions in the copy and storage process.

FIG. 34 shows a sequence diagram of a process of setting and saving initial conditions in the copy and storage process (step S201 in FIG. 18A).

In FIG. 34, in response to an operation by a user on the operation panel, the UI C1 sets a read condition with regard to the read filter C3 (steps S501, S502). The UI C1 sets an edit condition with regard to the edit filter C4 (steps S503, S504). The UI C1 sets a print condition with regard to the print filter C5 (steps S505, S506). The UI C1 sets a storage condition with regard to the stored document registration filter C6 (steps S507, S508).

Then, in response to an operation by the user on the operation panel, the UI C1 sends a job start request to the copy activity C2 (step S509). The copy activity C2 sends a condition save request to the edit filter C4 (step S510). The edit filter C4 then generates condition data by serializing condition item data (step S511), and returns the serialized condition data to the copy activity C2 (step S512).

Similarly, the copy activity C2 sends a condition save request to the print filter C5 (step S513). The print filter C5 generates condition data by serializing the condition item data (step S514), and returns the serialized condition data to the copy activity C2 (step S515).

No condition data is generated with regard to the read condition in the read filter C3 or the storage condition in the stored document registration filter C6 because they are conditions that do not need to be reproduced in the stored document printing process.

Thereafter, the copy activity C2 sets a document-based condition list including the condition data with regard to the stored document registration filter C6 (steps S516, S517). At this point in time, the stored document registration filter C6 does not save the document-based condition list; the document-based condition list is saved as part of the document information when it is saved upon completion of the process for the entire pages (step S205 in FIG. 18A).

The processes for reading, editing, and storing the document in the copy and storage process (step S202 and part of S204 in FIG. 18A), and the process for saving the document information (step S205 in FIG. 18A) are the same as those shown in FIG. 22.

Figure 35:
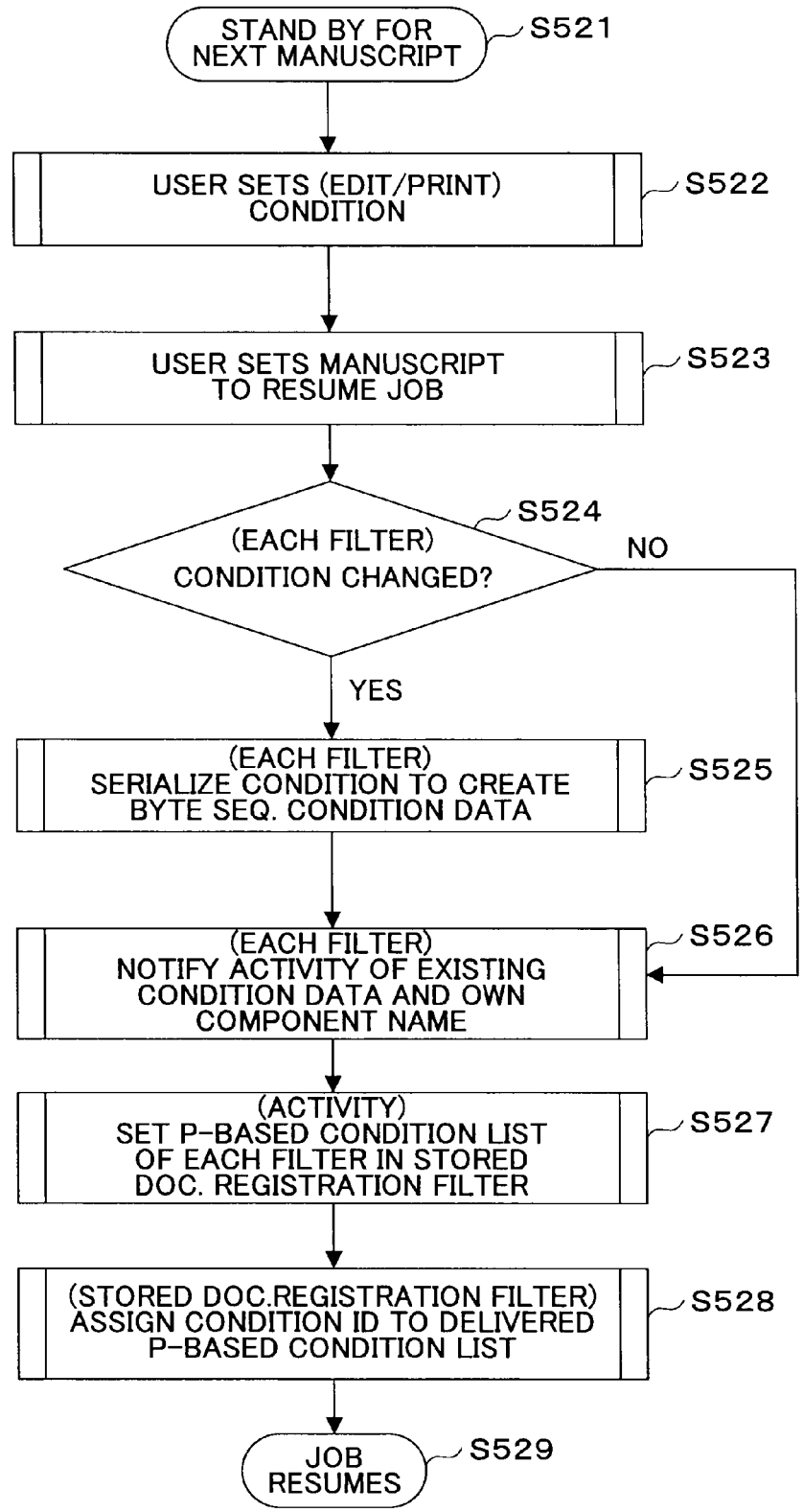
FIG. 35 shows a flowchart of a process of setting and saving a page-based condition in the copy and storage process.

FIG. 35 shows a flowchart of a process of setting and saving page-based conditions in the copy and storage process (step S203 in FIG. 18A).

In FIG. 35, in a job paused status waiting for the next manuscript (step S521), the user sets conditions (edit condition/print condition)(step S522). As the user sets a manuscript to resume a job (step S523), each filter (edit filter C4, print filter C5) determines whether there is a condition change (step S524).

If a condition is changed ("YES" in step S524), each filter serializes the conditions into a Byte sequence of condition data (step S525). If there is no condition change ("NO" in step S524), this process is not performed.

Thereafter, each filter notifies the copy activity C2 of the condition data that the filter retains and its own component name (step S526).

The copy activity C2 then sets a page-based condition list of each filter in the stored document registration filter C6 (step S527).

The stored document registration filter C6 assigns condition ID's to the page-based conditions in the received page-based condition list (step S528). The job is then resumed (step S529).

Figure 36:
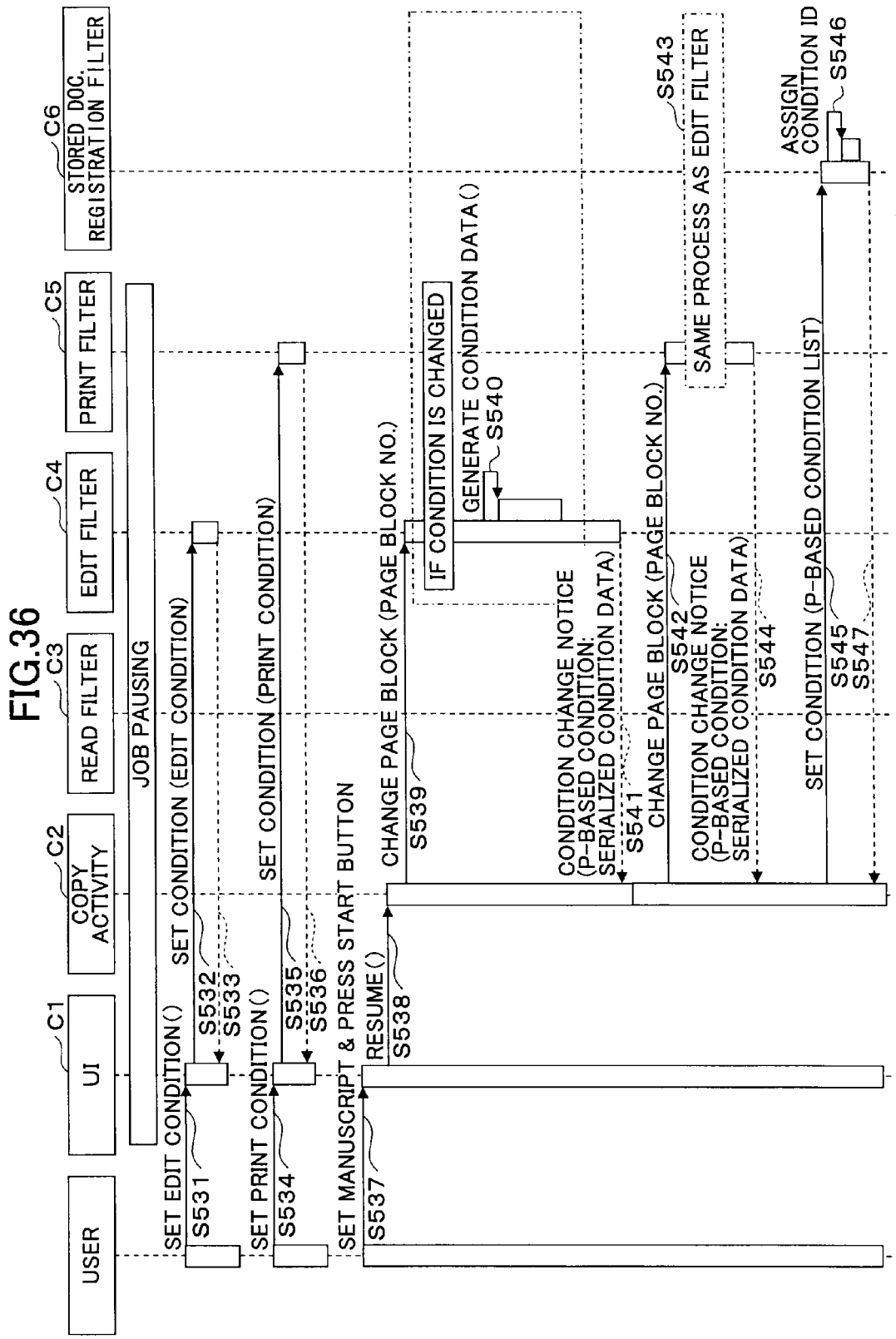
FIG. 36 shows a sequence diagram of the process of setting and saving a page-based condition in the copy and storage process.

FIG. 36 shows a sequence diagram of a process of setting and saving a page-based condition in the copy and storage process (step S203 in FIG. 18A).

In FIG. 36, in a job paused status waiting for the next manuscript, as a user sets an edit condition with regard to the UI C1 (step S531), the UI C1 sets the edit condition with regard to the edit filter C4 (steps S532, S533).

Similarly, as the user sets a print condition with regard to the UI C1 (step S534), the UI C1 sets the print condition with regard to the print filter C5 (steps S535, S536).

Then, as the user sets a manuscript and presses the start button with regard to the UI C1 (step S537), the UI C1 sends a request to the copy activity C2 to resume the job (step S538). In the case of the SADF mode, the job is automatically resumed upon setting of the manuscript in the ADF without pressing the start button.

The copy activity C2 notifies the edit filter C4 of a page block number and about a change in the page block (step S539). The edit filter C4, when a condition is changed, generates condition data (step S540), and sends a condition change notice to the copy activity C2, together with a page-based condition including serialized condition data (step S541). When there is no condition change, the edit filter C4 returns the existing condition ID without generating condition data.

Similarly, the copy activity C2 sends a page block change notice to the print filter C5, together with a page block number (step S542). The print filter C5 performs the same process (step S540) as that by the edit filter C4 (step S543), and sends a condition change notice to the copy activity C2, together with a page-based condition including serialized condition data (step S544).

Then, the copy activity C2 sets a page-based condition list with regard to the stored document registration filter C6 (step S545). The stored document registration filter C6 assigns a condition ID (step S546), and returns a response to the copy activity C2 (step S547). The assigning of the new condition ID indicates the timing of change in the condition. At this point in time, the stored document registration filter C6 does not save the page-based condition list, which is saved at the time of the aforementioned page-based storage (step S204 in FIG. 18A).

Figure 37:
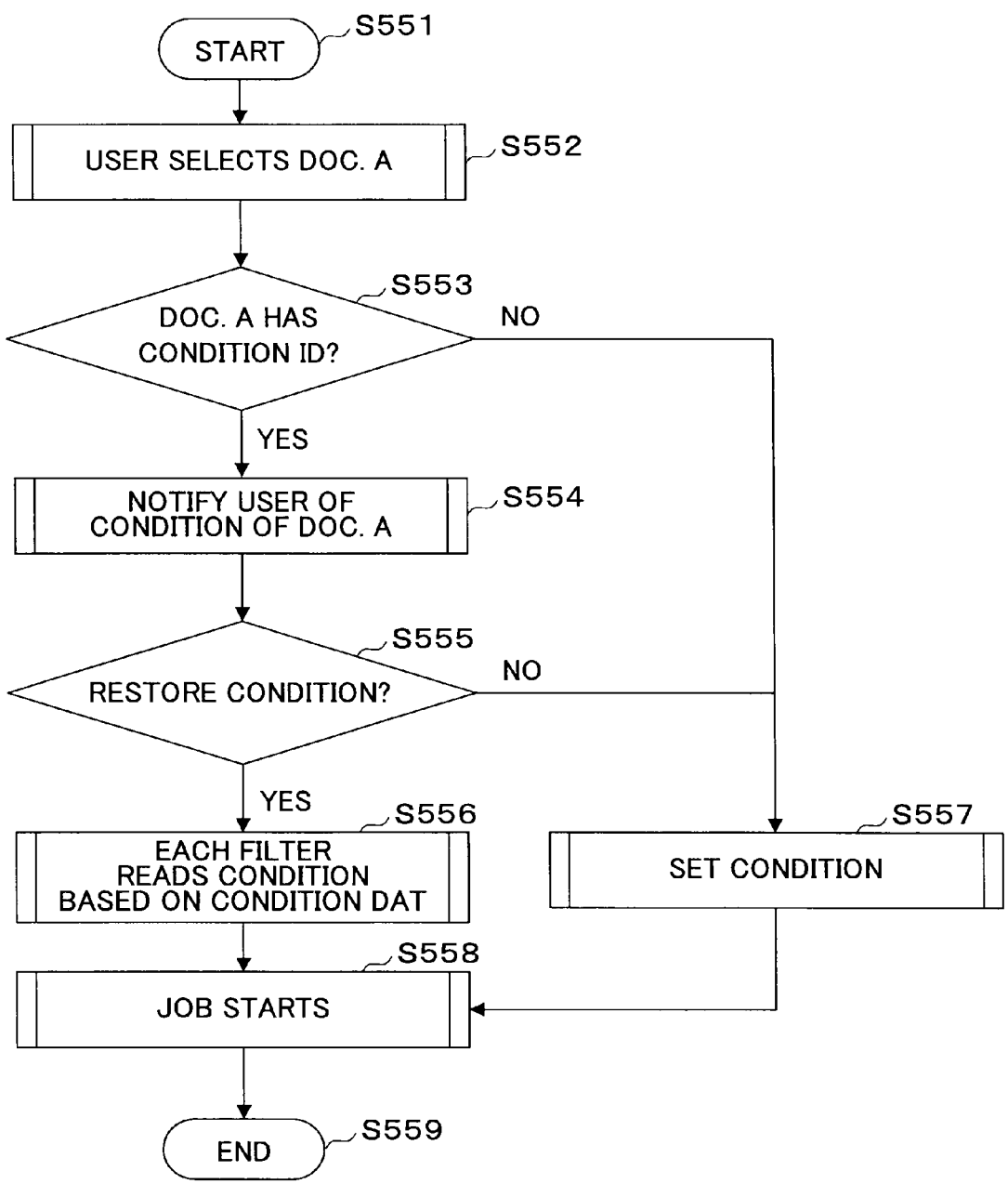
FIG. 37 shows a flowchart of a process of restoring a condition from a selected document in the stored document print process.

FIG. 37 shows a flowchart of a process of restoring a condition from a selected document in the stored document print process (step S301 in FIG. 18B).

In FIG. 37, at the start of printing a stored document (step S551), a user selects a document A (step S552). The UI C1 determines whether a condition ID is associated with the document A (step S553). In the case of the aforementioned copy and storage process, a condition ID is associated with the document; however, in the case of a storing process without copying, no condition ID is associated with the document, so that the condition cannot be restored.

When a condition ID is associated with the document A ("YES" in step S553), the UI C1 notifies the user about the association of the document A with the condition ID (step S554), and determines whether or not to restore the condition based on a selection operation by the user (step S555).

When the user selects restoration of the condition ("YES" in step S555), each filter (edit filter C4, print filter C5) reads and restores the condition based on the condition data (step S556).

When no condition ID is associated with the document A ("NO" in step S553), or when restoration of the condition is not selected ("NO" in step S555), a condition is set in accordance with an operation by the user (step S557).

Thereafter, the job is started (step S558), and the process ends (step S559).

Figure 38:
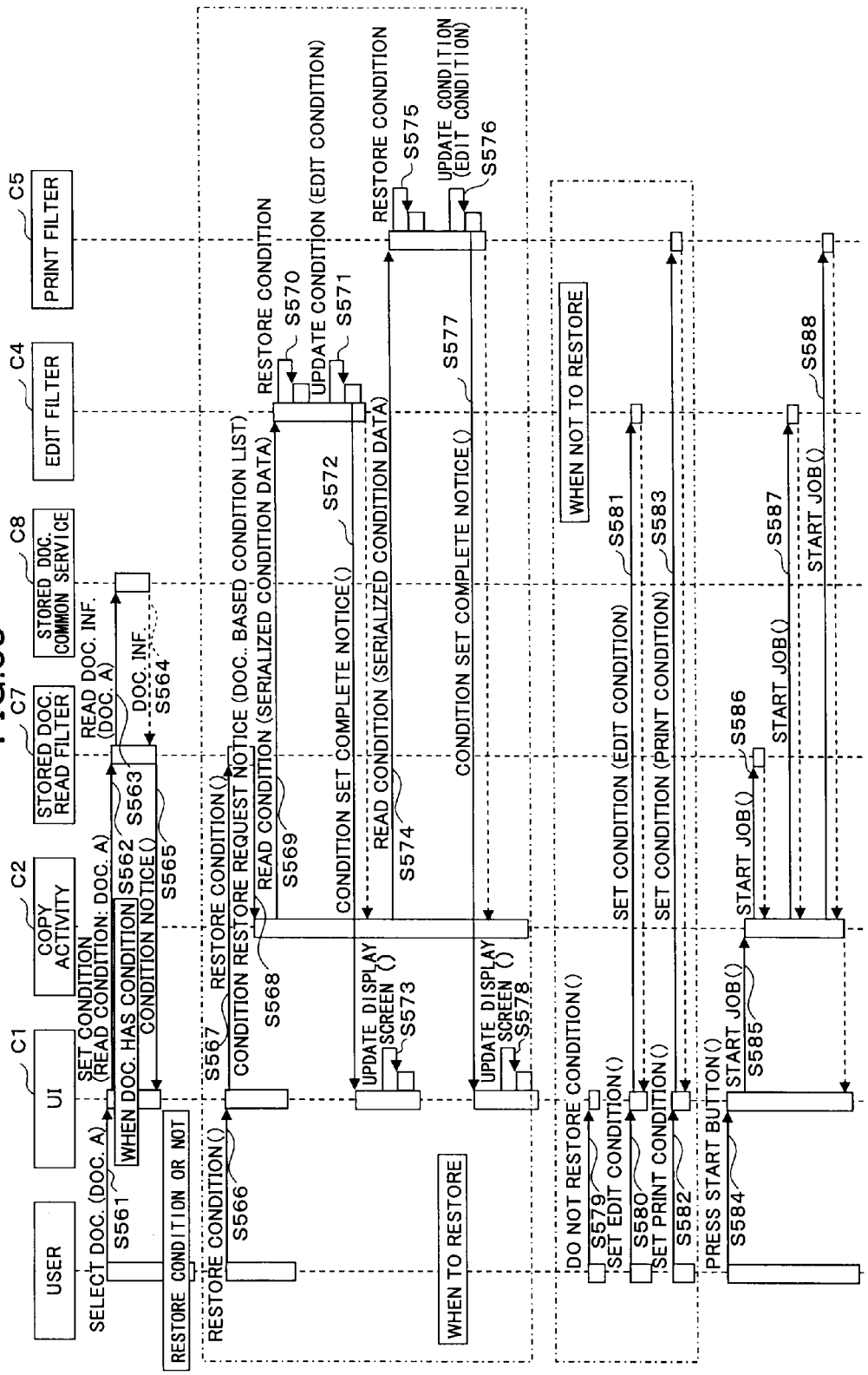
FIG. 38 shows a sequence diagram of the process of restoring a condition from a selected document in the stored document print process.

FIG. 38 shows a sequence diagram of the process of restoring a condition from a selected document in the stored document print process (step S301 in FIG. 18B).

In FIG. 38, when printing a stored document, a user selects a desired document A via the UI C1 (step S561).

The UI C1 sets the document A in the stored document read filter C7 as a read condition (step S562). The stored document read filter C7 sends a request to the stored document common service C8 to read document information about the document A (step S563). The stored document common service C8 returns the document information to the stored document read filter C7 (step S564). The stored document read filter C7, when a condition is associated with the document, notifies the UI C1 about the presence of the condition (step S565). The UI C1 then prompts the user to select whether or not to restore the condition associated with the document.

When the condition is to be restored, the user sends a request to the UI C1 to restore the condition (step S566). The UI C1 sends a request to the stored document read filter C7 to restore the condition (step S567). The stored document read filter C7 sends a condition restoration request notice to the copy activity C2, together with a document-based condition list (step S568).

The copy activity C2 sends a condition reading request to the edit filter C4, together with serialized condition data (step S569). The edit filter C4 restores the condition data and acquires an edit condition (step S570), updates a condition based on the acquired edit condition (step S571), and notifies the UI C1 about completion of the condition setting process (step S572). In response, the UI C1 updates the display screen (step S573).

Similarly, the copy activity C2 sends a condition reading request to the print filter C5, together with serialized condition data (step S574). The print filter C5 restores the condition data and acquires a print condition (step S575), updates a condition based on the acquired print condition (step S576), and notifies the UI C1 about completion of the condition setting process (step S577). In response, the UI C1 updates the display screen (step S578).

On the other hand, when the condition is not restored, the user sends a request to the UI C1 indicating that the condition is not to be restored (step S579). The user then sets an edit condition with regard to the UI C1 (step S580). The UI C1 sets the edit condition in the edit filter C4 (step S581). Similarly, the user sets a print condition with regard to the UI C1 (step S582), and the UI C1 sets the print condition with regard to the print filter C5 (step S583).

Thereafter, as the user presses a start button with regard to the UI C1 (step S584), the UI C1 sends a job start request to the copy activity C2 (step S585). The copy activity C2 then sends a job start request to the stored document read filter C7, the edit filter C4, and the print filter C5 (steps S586 to S588).

Figure 39:
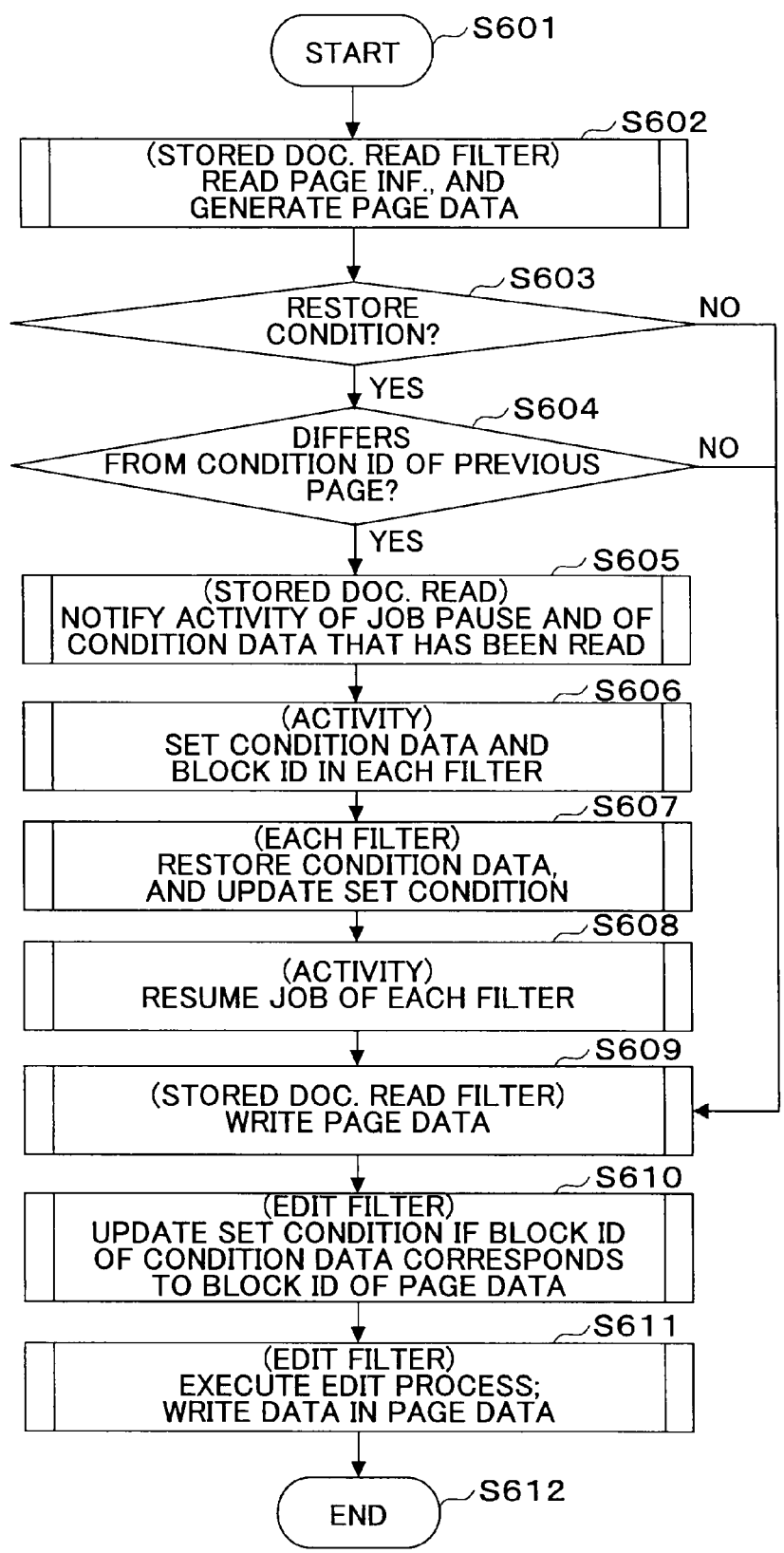
FIG. 39 shows a flowchart of a process of reading a page-based condition in the stored document print process.

FIG. 39 shows a flowchart of a process of reading a page-based condition in the stored document print process (part of step S302 in FIG. 18B).

In FIG. 39, when the process is started (step S601), the stored document read filter C7 reads page information to generate page data (step S602). When a condition made by a user is to be restored based on a selection ("YES" in step S603), the stored document read filter C7 determines whether the condition ID of the condition differs from that of the previous page (step S604).

If the condition ID differs from that of the previous page ("YES" in step S604), the stored document read filter C7 sends a job pause notification to the copy activity C2, and notifies the copy activity C2 of the condition data that has been read (step S605).

Then, the copy activity C2 sets the condition data and the block ID in each filter (edit filter C4, print filter C5) (step S606).

Figure 40:
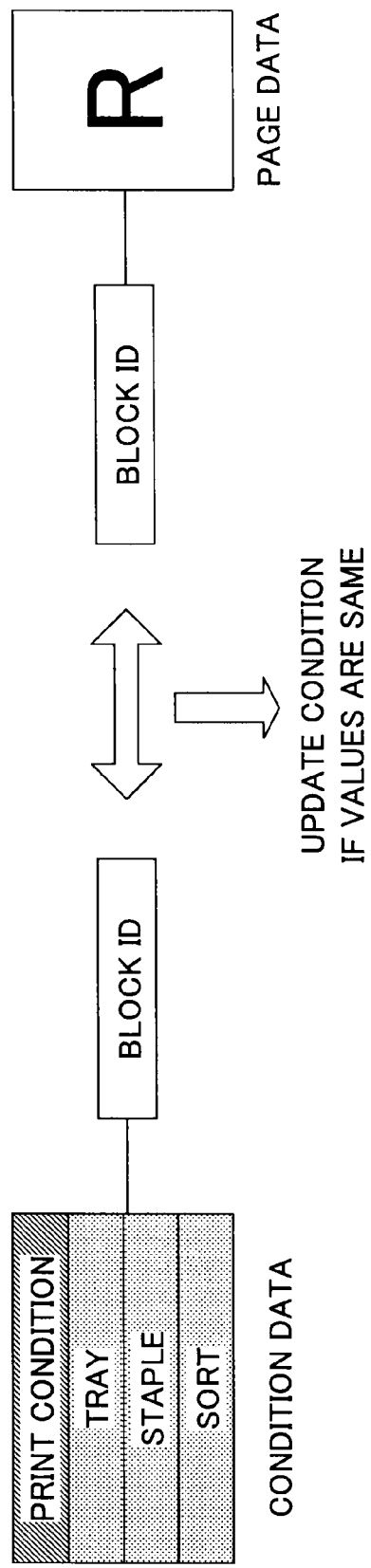
FIG. 40 shows a relationship between setting condition and block ID.

FIG. 40 shows a relationship between the setting condition and the block ID. When a page-based condition is to be updated, the copy activity C2 allocates a block ID to the condition data that attaches the condition that is set to the page in which the condition is to be applied. Each filter applies the setting condition having a block ID that corresponds to the block ID attached to the page data as the condition for the page that is processed.

Referring back to FIG. 39, each filter restores the condition data and updates the setting condition (step S607).

Thereafter, the copy activity C2 resumes the job of each filter (step S608).

When the condition is not to be restored ("NO" in step S603), or when the condition ID of the previous page is not changed ("NO" in step S604), the above process is not performed.

The stored document read filter C7 then writes the page data (step S609).

The edit filter C4, when the block ID attached to the condition data corresponds to the block ID of the page data, updates the setting condition (step S610).

The edit filter C4 then executes the edit process, writes data in the page data (step S611), and ends the process (step S612).

A similar process is performed with regard to the print filter C5, with the exception that the process is directed not to the page data generated by the stored document read filter C7 but to the page data generated by the edit filter C4.

FIG. 41 shows a sequence diagram of the process of reading and editing a page-based condition in the stored document print process (part of step S302 in FIG. 18B).

In FIG. 41, the stored document read filter C7 sends a page information reading request to the stored document common service C8, together with a page ID (step S621), and acquires page information from the stored document common service C8 (step S622).

The stored document read filter C7 then confirms the condition ID (step S623), and performs the following process if the condition ID is changed.

Specifically, the stored document read filter C7 sends a condition restoration request notification to the copy activity C2, together with a document-based condition list (step S624).

The copy activity C2 sends a condition change request to the edit filter C4, together with serialized condition data and a block ID (step S625). The edit filter C4 performs condition restoration (step S626), and returns a response to the copy activity C2 (step S627).

Similarly, the copy activity C2 sends a condition change request to the print filter C5, together with serialized condition data and a block ID (step S628). The print filter C5 performs condition restoration (step S629), and returns a response to the copy activity C2 (step S630).

Thereafter, the stored document read filter C7 generates page data (step S631), and notifies the edit filter C4 about the writing of data in the page data (step S632). These processes are performed via pipes.

The edit filter C4 updates the condition (step S633), performs an edit process based on the updated edit condition (step S634), generates page data (step S635), and notifies the print filter C5 about the writing of data in the page data (step S636).

Thereafter, a similar process is performed by the print filter C5 (step S637) as in the case of the edit filter C4 (steps S633 to S636).

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The present application is based on the Japanese Priority Applications No. 2007-282454 filed Oct. 30, 2007, and No. 2008-109515 filed Apr. 18, 2008, the entire contents of which are hereby incorporated by reference.

What is claimed is:

1. An image processing apparatus comprising:
one or more input units configured to input image data that is subjected to image processing;
one or more output units configured to output a result of the image processing;
a first filter configured to control a process of inputting the image data from the input unit depending on the input unit;
a second filter configured to control an output to the output unit depending on the output unit, wherein an application is constructed by a connection of the first filter and the second filter;
a setting unit configured to set a setting condition for each of the first filter and the second filter;
an instructing unit configured to instruct a registration of a stored document;
an ID acquisition unit provided to each of the first filter and the second filter, wherein, in response to an instruction from the instructing unit to register the stored document, the ID acquisition unit notifies a data managing unit of the setting condition set by the setting unit, and acquires a condition ID that is assigned to the setting condition; and
a storing unit configured to store the condition ID acquired by the ID acquisition unit and the image data in association with one another,
wherein the first filter associates and stores the condition set for the first filter with the condition ID corresponding to the condition set for the first filter into a database, and the second filter associates and stores the condition set for the second filter with the condition ID corresponding to the condition set for the second filter into a database,
wherein when the condition set for at least one of the first filter and the second filter is changed before the imaging process starts, the at least one of the first filter and second filter associates and stores the changed condition with a respective new condition ID corresponding to the changed condition into the respective database, and
wherein at least the first filter reports the condition ID corresponding to the condition set for the first filter to a third filter using the condition, the third filter acquires the condition from the database that is associated and stored with the condition ID reported from the first filter, the third filter performs an imaging process on a page based on the condition acquired from the database, and the third filter stores information of the page on which the imaging process is performed and the condition ID associated with the condition of the imaging process of the page.

2. The image processing apparatus according to claim 1, wherein the setting condition includes an edit condition or a print condition concerning the image data.

3. The image processing apparatus according to claim 1, wherein the setting unit sets the setting condition on a page by page basis, and
the ID acquisition unit checks the setting condition for each of successively inputted pages, notifies the data managing unit of the setting condition only when there is a change in the setting condition, and acquires a condition ID.

4. The image processing apparatus according to claim 1, wherein the storing unit stores the condition ID on a page by page basis.

5. The image processing apparatus according to claim 1, further comprising:

an identifying unit configured to identify the image data stored in the storing unit;

a condition ID reading unit configured to read the condition ID associated with the image data from the image data;

a notifying unit configured to notify the first filter and the second filter of the condition ID read by the condition ID reading unit;

an acquisition unit provided to each of the first filter and the second filter and configured to notify the data managing unit of the condition ID of which each of the first filter and the second filter is notified by the notifying unit, and configured to acquire the setting condition attached to the condition ID; and a condition restoring unit configured to restore a setting based on the acquired setting condition.

6. An image processing apparatus comprising:

one or more input units configured to input image data that is subjected to image processing;

one or more output units configured to output a result of the image processing;

a first filter configured to control a process of inputting the image data from the input unit depending on the input unit;

a second filter configured to control an output to the output unit depending on the output unit, wherein an application is constructed by a connection of the first filter and the second filter;

a setting unit configured to set a setting condition for each of the first filter and the second filter;

an instructing unit configured to instruct a registration of a stored document;

a transforming unit provided to each of the first filter and the second filter and configured to convert the setting condition set by the setting unit into a general-purpose data sequence of condition data in response to an instruction by the instructing unit to register the stored document; and a storing unit configured to store the general-purpose data sequence of condition data generated by the transforming unit and the image data in association with one another, wherein the first filter associates and stores the condition set for the first filter with a condition ID corresponding to the condition set for the first filter into a database, and the second filter associates and stores the condition set for the second filter with a condition ID corresponding to the condition set for the second filter into a database, wherein when the condition set for at least one of the first filter and the second filter is changed before the imaging process starts, the at least one of the first filter and second filter associates and stores the changed condition with a respective new condition ID corresponding to the changed condition into the respective database, and wherein at least the first filter reports the condition ID corresponding to the condition set for the first filter to a third filter using the condition, the third filter acquires the condition from the database that is associated and stored with the condition ID reported from the first filter, the third filter performs an imaging process on a page based on the condition acquired from the database, and the third filter stores information of the page on which the imaging process is performed and the condition ID associated with the condition of the imaging process of the page.

7. The image processing apparatus according to claim 6, further comprising:

an identifying unit configured to identify the image data stored in the storing unit;

a condition data reading unit configured to read the condition data associated with the image data from the image data;

a notifying unit configured to notify the first filter and the second filter of the condition data read by the condition data reading unit; and a condition restoring unit provided to each of the first filter and the second filter and configured to restore the setting condition from the general-purpose data sequence of condition data of which each of the first and the second filter is notified.

8. An application executing method for an image processing apparatus comprising:

one or more input units configured to input image data that is subjected to image processing;

one or more output units configured to output a result of the image processing;

a first filter configured to control a process of inputting the image data from the input unit depending on the input unit; and a second filter configured to control an output to the output unit depending on the output unit, wherein an application is constructed by a connection of the first filter and the second filter, wherein the method comprises the steps of:

setting a setting condition for each of the first filter and the second filter;

instructing a registration of a stored document;

in response to an instruction to register the stored document, notifying a data managing unit of the setting condition from each of the first filter and the second filter, and acquiring a condition ID assigned to the setting condition; and storing the acquired condition ID and the image data in association with one another, wherein the first filter associates and stores the condition set for the first filter with the condition ID corresponding to the condition set for the first filter into a database, and the second filter associates and stores the condition set for the second filter with the condition ID corresponding to the condition set for the second filter into a database, wherein when the condition set for at least one of the first filter and the second filter is changed before the imaging process starts, the at least one of the first filter and second filter associates and stores the changed condition with a respective new condition ID corresponding to the changed condition into the respective database, and wherein at least the first filter reports the condition ID corresponding to the condition set for the first filter to a third filter using the condition, the third filter acquires the condition from the database that is associated and stored with the condition ID reported from the first filter, the third filter performs an imaging process on a page based on the condition acquired from the database, and the third filter stores information of the page on which the imaging process is performed and the condition ID associated with the condition of the imaging process of the page.

9. The application executing method according to claim 8, wherein the setting condition includes an edit condition or a print condition concerning the image data.

10. The application executing method according to claim 8, wherein the setting step includes setting the setting condition on a page by page basis, and the step of acquiring the condition ID includes checking the setting condition for each of successively inputted pages, notifying the data managing unit of the setting condition only when there is a change in the setting condition, and acquiring a condition ID.

11. The application executing method according to claim 8, wherein the storing step includes storing the condition ID on a page by page basis.

12. The application executing method according to claim 8, further comprising the steps of:
   identifying the image data that is stored;
   reading the condition ID associated with the image data from the identified image data;
   notifying the first filter and the second filter of the condition ID that is read;
   notifying the data managing unit of the condition ID of which each of the first filter and the second filter is notified in the notifying step, and acquiring the setting condition attached to the condition ID; and
   restoring a setting based on the setting condition that is acquired.

* * * * *